United States Patent [19]

Inaba et al.

[11] Patent Number: 5,249,947

[45] Date of Patent: Oct. 5, 1993

[54] INJECTION MOLDING MACHINE HAVING AN AUTOMATIC MOLD CHANGER

[75] Inventors: Yoshiharu Inaba, Kawasaki; Susumu Ito, Oshino; Takayuki Taira, Hachioji; Kikuo Watanabe; Akira Kouketsu, both of Oshino; Kenji Haga, Suginami; Kazunari Tokuda, Hachioji; Hitoshi Minegishi, Hachioji; Toshio Matsukura, Hachioji; Kaoru Maeda; Hiroshi Yonekubo, both of Kamiina, all of Japan

[73] Assignee: Fanuc Ltd, Yamanashi, Japan

[21] Appl. No.: 773,941

[22] PCT Filed: Mar. 22, 1991

[86] PCT No.: PCT/JP91/00377

§ 371 Date: Jan. 17, 1992

§ 102(e) Date: Jan. 17, 1992

[87] PCT Pub. No.: WO91/14560

PCT Pub. Date: Oct. 3, 1991

[30] Foreign Application Priority Data

| Mar. 22, 1990 | [JP] | Japan | 2-72977 |
| Jul. 31, 1990 | [JP] | Japan | 2-201396 |
| Jul. 31, 1990 | [JP] | Japan | 2-201397 |
| Jul. 31, 1990 | [JP] | Japan | 2-201398 |
| Jul. 31, 1990 | [JP] | Japan | 2-201399 |
| Aug. 31, 1990 | [JP] | Japan | 2-227938 |
| Sep. 7, 1990 | [JP] | Japan | 2-235732 |
| Sep. 27, 1990 | [JP] | Japan | 2-255242 |
| Sep. 27, 1990 | [JP] | Japan | 2-255243 |
| Sep. 28, 1990 | [JP] | Japan | 2-257527 |

[51] Int. Cl.⁵ .................................. B29C 45/80
[52] U.S. Cl. ............................. 425/150; 414/223; 425/190; 425/228; 425/574; 901/6
[58] Field of Search ............. 425/572, 547, 548, 144, 425/143, 228, 174.8, 150, 574, 575, 576, 185, 190, 191; 414/736, 223, 225; 901/6

[56] References Cited

U.S. PATENT DOCUMENTS

| 4,661,053 | 4/1987 | Yokota et al. | 425/174.8 |
| 4,759,703 | 7/1988 | Krebser et al. | 425/228 |
| 4,784,595 | 11/1988 | Halter | 425/144 |
| 4,902,454 | 2/1990 | Steinbichler et al. | 425/548 |

FOREIGN PATENT DOCUMENTS

| 70925 | 6/1981 | Japan . |
| 112645 | 7/1983 | Japan . |
| 81122 | 5/1984 | Japan . |
| 83607 | 5/1984 | Japan . |
| 129128 | 7/1984 | Japan . |
| 174331 | 10/1984 | Japan . |
| 107314 | 6/1985 | Japan . |
| 272120 | 12/1986 | Japan . |
| 279523 | 12/1986 | Japan . |
| 191113 | 8/1987 | Japan . |
| 191114 | 8/1987 | Japan . |
| 191115 | 8/1987 | Japan . |
| 30509 | 1/1990 | Japan . |

*Primary Examiner*—Tim Heitbrink
*Attorney, Agent, or Firm*—Staas & Halsey

[57] ABSTRACT

An injection molding machine of an automatic core change type includes a mold clamping section including stationary and movable platens fitted with first and second matrixes of a mold, respectively, a mold changing robot and a mold stocker severally attached to the mold clamping section and separately controlled by way of a control section, and a temperature controller for controlling the respective temperatures of the first and second matrixes and the mold stocker. As an arm and a chuck move and rotate, respectively, a first cavity unit, attached to the first matrix, is taken out from the first matrix, transported toward the mold stocker, and stored in its corresponding storage hole of the mold stocker. Then, another first cavity unit is taken out from the mold stocker, transported toward the mold clamping section, and attached to the first matrix, whereupon the replacement of the first cavity unit is completed. A second cavity unit is replaced in like manner, whereupon the mold replacement is completed.

37 Claims, 57 Drawing Sheets

| STORAGE HOLE | ROTATIONAL POSITION | CORE | TEMPERATURE | CONTROL CYCLE |
|---|---|---|---|---|
| Fc 1 | Q 1 | 414-1, 424-1 | Ts 1 | $t_P 1$ |
| Fc 2 | Q 2 | 414-2, 424-2 | Ts 2 | $t_P 2$ |
| ⋮ | ⋮ | ⋮ | ⋮ | ⋮ |
| Fc 7 | Q 7 | 414-7, 424-7 | Ts 7 | $t_P 7$ |

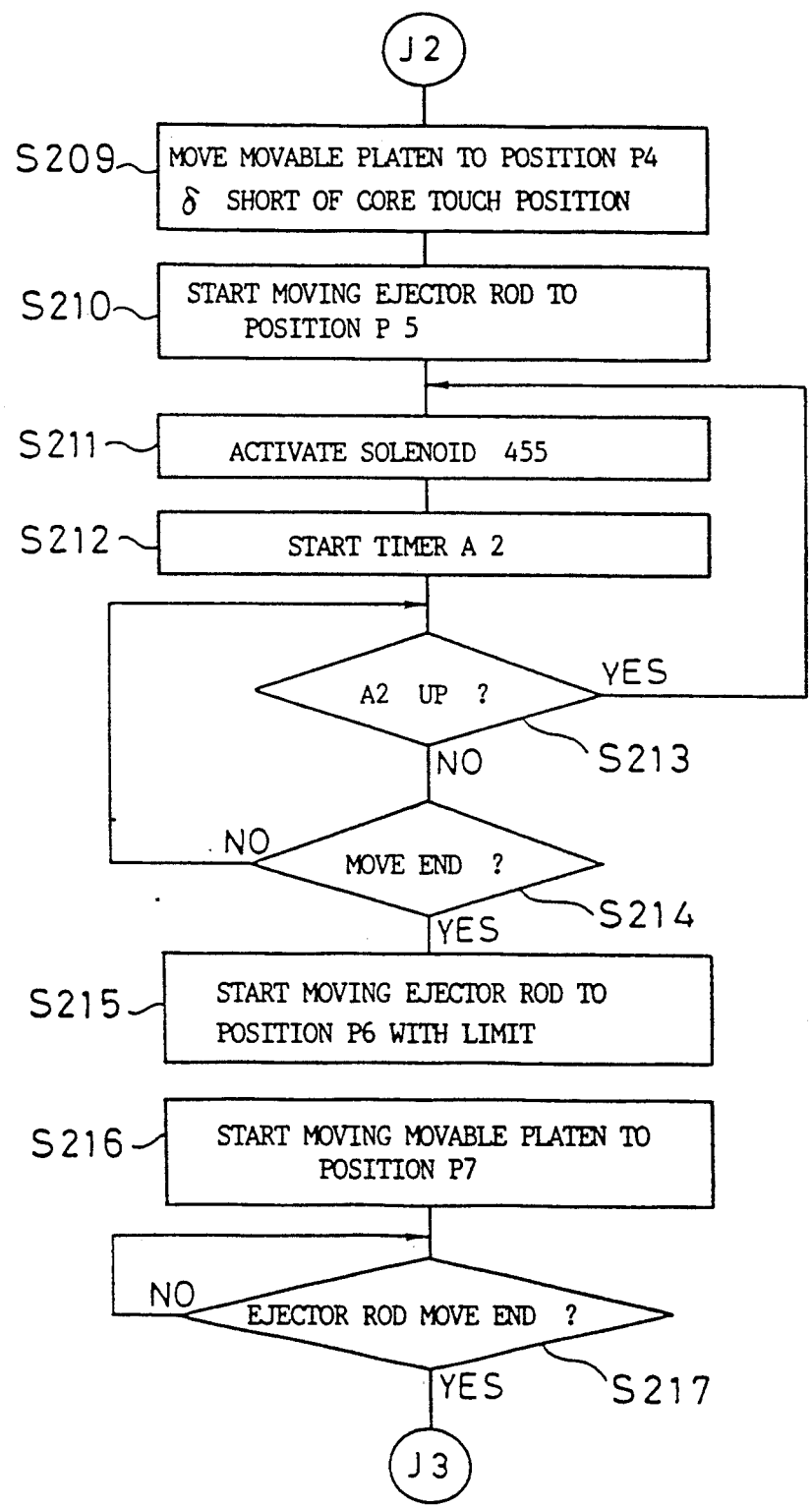

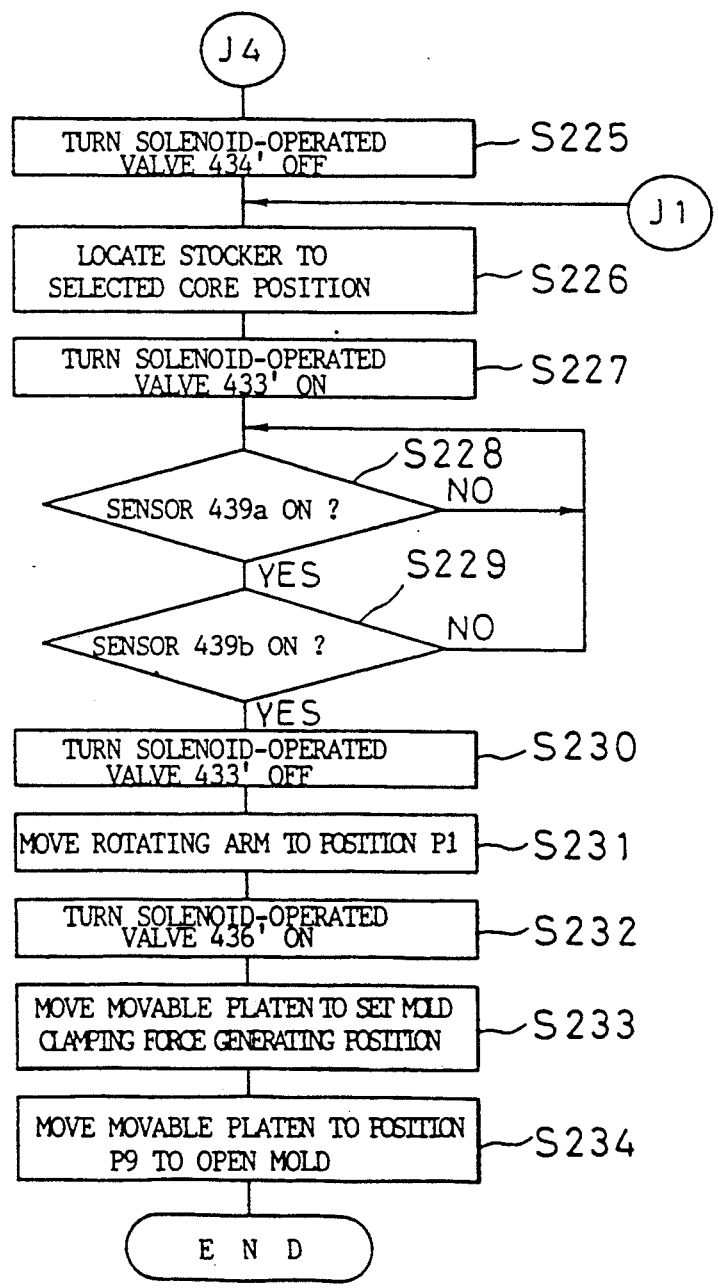

| STORAGE CHAMBER | MOLD | TEMPERATURE | CONTROL CYCLE |
|---|---|---|---|
| FC1 | M1 | Ts5 | tp5 |
| FC2 | M2 | Ts6 | tp6 |
| ⋮ | ⋮ | ⋮ | ⋮ |
|  | M9 | Ts13 | tp13 |

Tb'

INJECTION MOLDING MACHINE HAVING AN AUTOMATIC MOLD CHANGER

TECHNICAL FIELD

The present invention relates to an injection molding machine, and more particularly, to a mold changer for automatically replacing a mold or a core thereof.

BACKGROUND ART

In an injection molding machine, a molten resin is injected into a molding cavity defined in a mold, which is formed of a pair of mold halves attached individually to a stationary platen and a movable platen, and the molten resin is set in the cavity to obtain a molded piece. Further, various molds are used to manufacture molded pieces of various shapes, and the mold is replaced when the kind of the molded pieces to be manufactured is changed. It is known that an automatic mold changer is used to facilitate this mold replacement. In order to facilitate diverse, small-quantity production, mold replacement, etc., moreover, a mold formed of a matrix and a core sometimes may be used to manufacture small-sized products such as lenses, in particular. In replacing the mold, in this case, only the core is changed in general which is removably attached to the matrix, which is fixed to the platens, and serves to define the molding cavity. Furthermore, a mold temperature controller is used to adjust the mold temperature to a required temperature fit for the properties of the resin material.

A conventional automatic mold changer comprises, for example, a truck movable between a mold yard and the injection molding machine, and a hydraulic clamp mechanism attached to the injection molding machine, and a mold transported from the mold yard to the injection molding machine by means of the truck is attached to a mold mounting section of the injection molding machine by means of the hydraulic clamp mechanism (see Published Examined Japanese Utility Model Application No. 2-2576, for example). According to this automatic mold changer, however, a wide transportation space is required between the injection molding machine and the mold yard, and the mold transportation and the mold replacement take much time. Since the temperature of the mold temporarily heated in the mold yard drops during the transportation, moreover, the mold must be heated again.

When using a mold formed of a pair of matrix halves and a pair of core halves, furthermore, each core half conventionally is fixed to its corresponding matrix half by means of bolts, or is fixedly fitted in a recess formed in the joint surface (parting face) of the matrix half, with the aid of a spacer or the like. The mold of this type is often used for diverse, small-quantity production, so that core replacement is frequently performed. Nevertheless, the core is conventionally attached to or detached from the matrix by manual operation, so that the core replacement requires much labor, thus lowering the production efficiency of the injection molding machine.

In the conventional mold temperature controller, moreover, a liquid heated to a predetermined temperature is circulated between the temperature controller and the mold by means of a hose. With every mold replacement, therefore, it is necessary to take the trouble of removing the hose from the used mold and attaching it to the mold to be used next. Since the place for the arrangement of the hose must be selected in consideration of an operator's hose attachment and detachment work, moreover, the hose sometimes hinder the operator's various operations, especially when it is removed.

Before storing the used mold or core, furthermore, the joint surface and a molding cavity defining surface of the mold or core is manually cleaned, in general. Conventionally, in this manner, the storage of the mold, which follows the mold replacement, requires manual work, so that it is difficult to automate the mold replacement.

DISCLOSURE OF THE INVENTION

An object of the present invention is to provide an injection molding machine of high production efficiency capable of automatically replacing a mold, core of the mold, or the like.

Another object of the present invention is to provide an injection molding machine capable of quickly attaching and detaching a mold, core, or the like to and from a mold clamping section.

Still another object of the present invention is to provide an injection molding machine in which a core can be easily attached to and detached from a matrix of a mold so that the replacement of the core can be achieved by simple operation.

A further object of the present invention is to provide an injection molding machine in which a core can be attached accurately and firmly to a matrix.

An additional object of the present invention is to provide an injection molding machine which requires no wide space for the replacement of a mold, core, or the like.

Another object of the present invention is to provide an injection molding machine capable of subjecting a mold, core, or the like in storage to preliminary temperature control, and of starting an injection molding cycle immediately after the mold or the core is attached to the mold clamping section.

Still another object of the present invention is to provide an injection molding machine in which the supply of a temperature control fluid from a mold temperature controller to a mold, core, or the like can be automatically allowed or prevented in replacing the mold, core, or the like, and a temperature control fluid supply hose need not be attached to or detached from the mold, core, or the like.

A further object of the present invention is to provide an injection molding machine capable of automatically cleaning a mold, core, or the like at the time of replacement thereof.

In order to achieve the above objects, according to the present invention, there is provided an injection molding machine which has a mold clamping section including a stationary platen, removably fitted with a first mold half, and a movable platen removably fitted with a second mold half, which constitutes one mold in conjunction with the first mold half, and movable with respect to the stationary platen. The injection molding machine of the present invention comprises: a mold storage section for storing a plurality of mold elements, each formed of at least one of elements including one mold and a mold component, which constitutes part of the mold, in a reciprocally deliverable manner; a mold changing section for delivering an optional one of the plurality of mold elements from the mold storage section, transporting the one mold element thus delivered to the side of the mold clamping section to attach the element to the mold clamping section, removing the one mold element, attached to the mold clamping section, from the mold clamping section, and transporting the mold element thus removed to the side of the mold storage section to store the element in the mold storage section; and a control section for controlling the operations of the mold changing section and the mold clamping section.

Preferably, the first and second mold halves of each of the plurality of types of molds attached to the mold clamping section include first and second core halves, respectively, or include two core halves and first and second matrix halves fitted individually with the two core halves, respectively. Preferably, the core is delivered to or from the mold storage section, attached to or detached from the mold clamping section, and transported between the mold storage section and the mold clamping section in a manner such that the two core halves thereof are joined together. An operation is performed which includes a process for fitting or removing one or both of the joined core halves into or from a core mounting recess or recesses of one or both of the matrix halves through an outer opening end of the core mounting recess of one matrix half or the respective upper opening ends of the two matrix halves, whereby the core is fitted into or removed from the matrix. The core halves used may be each in the shape of a truncated cone. In this case, the core halves are press-fitted individually into core mounting recesses formed, each in the shape of a truncated cone, in the core halves or the platens, by mold clamping operation of the mold clamping section. In removing the core, the press-fitted core halves are ejected from the core mounting recesses by means of core ejector rods, individually. If each of the core halves and the core mounting recesses is provided with a projection, the core halves are rotated forwardly or reversely to establish or cancel unreleasable engagement between the projections, so that the core halves are attached to or detached from the matrix halves, individually. Further preferably, means is provided for locking the core halves individually to the matrix halves or the platens.

An electromagnet may be buried in one of the respective facing end portions of the matrix halves or the platens and the core halves. In this case, the electromagnet is energized and de-energized so that the core halves are attached to and detached from the matrix halves or the platens, individually, by means of an electromagnetic force. If recesses are arranged communicating individually with the core mounting recesses of the matrix halves or the platens so that a negative pressure is supplied thereto, the core halves are attached to or detached from the matrix halves or the platens by allowing or preventing the negative pressure supply.

In a vertical injection molding machine, that one (lower platen) of the stationary and movable platens which is disposed in a lower position is provided with core ejecting means and means for locking the core halves individually to the matrix halves, and the joined first and second core halves are attached to or detached from the distal end face of a core ejector rod in a core attachment/detachment position. The mold clamping section is caused to perform mold clamping operation to bring the core on the distal end face of the rod intimately into contact with the matrix, and the core is then locked to the matrix. In removing the core, the mold clamping section is caused to perform molding opening operation with the upper core half unlocked, and thereafter, the core is located in the core attachment/detachment position by means of the core ejector rod with the lower core half unlocked, and the core on the rod is taken out by means of the mold changing section.

Preferably, the mold storage section includes a storage section body, which has a plurality of storage chambers for individually storing the plurality of mold elements and is, for example, rotatable in a manner such that an optional storage chamber is located in a delivery position, and drive means which operates under the control of the control section and, for example, rotates the storage section so that a desired storage chamber is located in the delivery position. Further preferably, a heater and a temperature sensor are arranged in at least one of the storage chambers, and the heater is turned on and off under the control of the control section which operates in response to an output from the temperature sensor.

Preferably, the machine further comprises an automatic cleaner which operates under the control of the control section, whereby a cleaning fluid is jetted from a nozzle, located between the first and second core halves, against the core halves.

Preferably, a temperature control fluid from a temperature control fluid supplier is supplied to temperature control fluid passages formed in the stationary and movable platens. Alternatively, temperature control fluid passages are formed individually in the stationary and movable platens, a temperature control fluid passage communicating with the passages in the platens is formed in each of the matrix halves attached individually to the two platens, and the temperature control fluid is supplied to the passages in the matrix through the passages in the platens. Alternatively, moreover, temperature control fluid passages are formed individually in the stationary and movable platens, a temperature control fluid passage communicating with the passages in the platens is formed in each of the core halves attached individually to the two platens, and the temperature control fluid is supplied to the passages in the core through the passages in the platens. In removing the core or the matrix from the platens, or in removing the core from the matrix, the supply of the temperature control fluid is cut off.

According to the present invention, as described above, an optional mold element delivered from the mold storage section for storing the plurality of mold elements, each formed of one mold or a mold component, in a reciprocally deliverable manner, by means of the mold changing section which operates under the control of the control section, is transported toward the mold clamping section and attached to the mold clamping section by means of the mold changing section. Also, the one mold element attached to the mold clamping section is removed from the mold clamping section by means of the mold changing section, and the mold element thus removed is transported toward the mold storage section and stored in the mold storage section. Thus, the mold, core, or the like can be replaced automatically and speedily. In this manner, the temperature of the mold, core, or the like, subjected to, e.g., preliminary temperature control, can be prevented from lowering due to the replacement of the mold, core, or the like, and readjustment of the mold temperature or the like can be achieved in a short time.

Preferably, the delivery of the core to and from the mold storage section, attachment and detachment of the core to and from the mold clamping section, and transportation of the core between the mold storage section and the mold clamping section are performed in various manners such that the two halves of the core are joined together or separated from each other. Therefore, the core replacement can be speedily effected by simple operation, and the core can be attached accurately and firmly to the matrix which is independent of or integral with the platens. Since the entire mold is delivered to and from the mold storage portion in like manner, moreover, the mold replacement can be also effected easily, accurately, and speedily.

Preferably, the mold storage section has a plurality of storage chambers for individually storing the plurality of mold elements, the heater arranged in at least one of the storage chambers is turned on and off in response to the temperature sensor output, the temperature control fluid is supplied to the temperature control fluid passage formed in a desired one of the stationary and movable platens, matrix halves, and core halves, and the temperature control fluid supply is cut off when the core or the matrix is removed. Accordingly, the respective temperatures of the matrix, more, etc. can be suitably adjusted during the storage or the execution of an injection molding cycle, and moreover, the replacement of the mold or the matrix requires no trouble of attaching and detaching a temperature control fluid supply hose or the like, thus facilitating automatic replacement of the matrix or the core.

Preferably, the cleaning fluid is jetted from the nozzle of the automatic cleaner against the core halves, so that the core replacement and the core storage require no manual operation for the core cleaning, thus ensuring automatic core replacement.

BRIEF DESCRIPTION OF THE DRAWINGS

FIGS. 35A to 35D are flow charts showing a core replacement control process;

BEST MODE OF CARRYING OUT THE INVENTION

Figure 1:
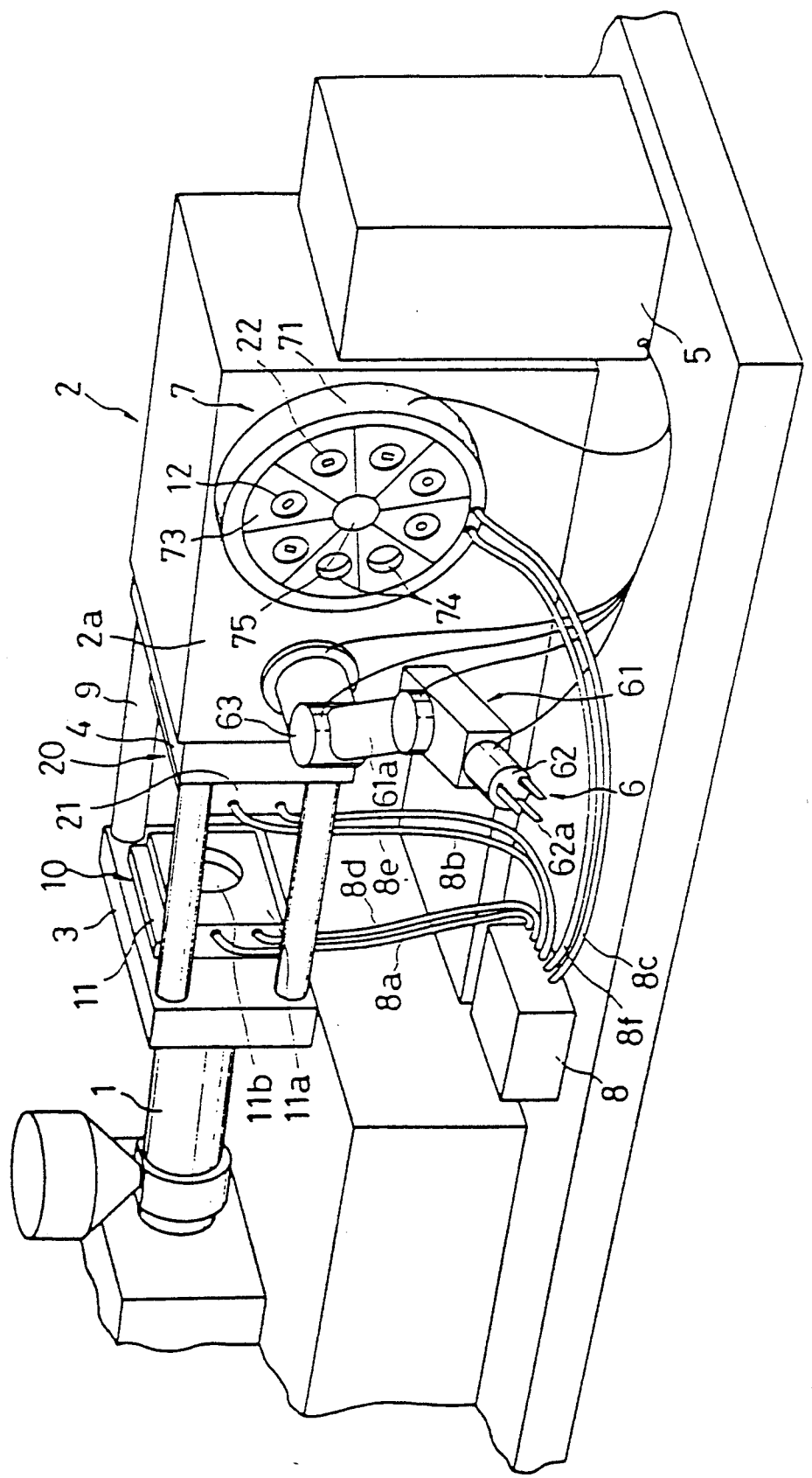
FIG. 1 is a schematic perspective view showing an injection molding machine according to a first embodiment of the present invention.

Referring to FIG. 1, an injection molding machine according to a first embodiment of the present invention comprises an injecting section 1 and a mold clamping section 2, and the mold clamping section 2 contains a mold clamping device (not shown) for driving a movable platen 4 along a tie bar 9 so that the movable platen 4 can move toward and away from a stationary platen 3. A mold mounted on the molding machine is composed of first and second mold halves (hereinafter referred to as first and second molds) 10 and 20. The first mold 10 includes a first matrix half (hereinafter referred to as first matrix) 11, which is removably mounted on the stationary platen 3, and a first cavity unit 12 which is removably mounted in a cylindrical recess 11b formed in a parting face 11a of the first matrix 11. Likewise, the second mold 20 includes a second matrix half (hereinafter referred to as second matrix) 21, which is removably mounted on the movable platen 4, and a second cavity unit 22 which is removably mounted in a recess 21b (FIG. 5) formed in a parting face 21a of the second matrix 21. The paired first and second matrixes 11 and 21 are used in common for molded pieces (cavity units) of various shapes, and the paired cavity units 12 and 22 define a cavity corresponding to one molded piece shape when the first and second molds 10 and 20 abut against each other.

Figure 2:
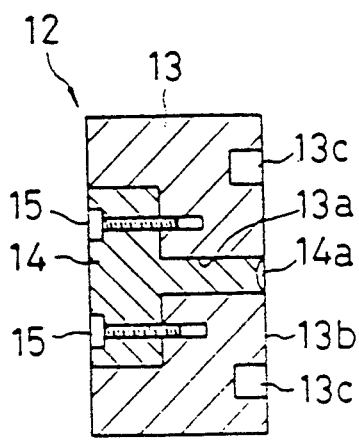
FIG. 2 is a longitudinal sectional view showing a stationary-side cavity unit shown in FIG. 1.
Figure 3:
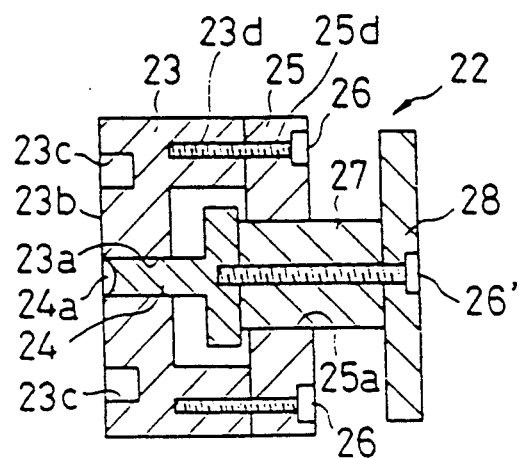
FIG. 3 is a longitudinal sectional view showing a movable-side cavity unit.
Figure 4:
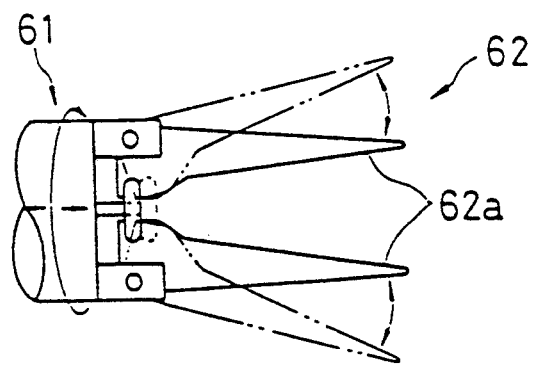
FIG. 4 is a partial side view showing a chuck of a mold changer shown in FIG. 1.

As shown in FIG. 2, the first cavity unit 12 is composed of a cylindrical first sleeve 13 and a first core half (hereinafter referred to as first core) 14 fitted in an axial hole 13a in the sleeve 13 and fixed to the sleeve 13 by means of bolts 15. An annular groove 13c to be utilized for cavity unit replacement is formed in a parting face 13b of the sleeve 13 so as to be coaxial with the axial hole 13a. As shown in FIG. 3, the second cavity unit 22 includes a second sleeve 23, having a parting face 23b and an annular groove 23c, and a second core half (hereinafter referred to as second core) 24 slidably fitted in an axial hole 23a of the sleeve 23 and having a second cavity defining surface 24a at the distal end thereof. A receiving plate 25 is fixed to an end face of the sleeve 23 opposite to the parting face thereof by means of bolts 26, and the second core 24, an ejector rod 27 slidably fitted in an axial hole 25a of the receiving plate, and an ejector plate 28 are fixed integrally to one another by means of a bolt 26'.

Further, the sleeve 23 and the receiving plate 25 of the second cavity unit 22 are formed with one or more sets of additional tapped holes 23e and 25e, respectively, in radial positions aligned with the annular groove 23c and in circumferential positions different from the positions where a plurality of sets of tapped holes 23d and 25d for threaded engagement with the individual bolts 26 are formed. The second matrix 21 and the second cavity unit 22 are releasably mounted on each other by means of a hexagon bolt 29 (FIG. 5) which is screwed in the tapped holes 23e and 25e and a tapped hole 21e in the second matrix 21. Likewise, the first cavity unit 12 have tapped holes (not shown) and a bolt (not shown) corresponding individually to the elements 23e, 25e and 29, and is releasably mounted on the first matrix 11 which is formed having a tapped hole (not shown) corresponding to the tapped hole 21e.

Referring again to FIG. 1, the injection molding machine comprises a control section 5, connected electrically to a host control section (not shown) for controlling the operation of the machine, and a mold changer 6 disposed on that portion of one side wall 2a of the mold clamping section 2 on the side of the movable platen 4 and used to replace the cavity units 12 and 22. The mold changer 6, which is formed of a multi-joint robot, for example, includes an arm 61, composed of a plurality of links 61a, and a chuck 62 having three contractible claws 62a and rotatably supported by means of the arm 61. In the mold changer 6, the chuck claws 62a spread or contract, the chuck 62 rotates, and the individual links 61a are rocked by means of a motor 63, under the control of the control section 5.

Figure 8:
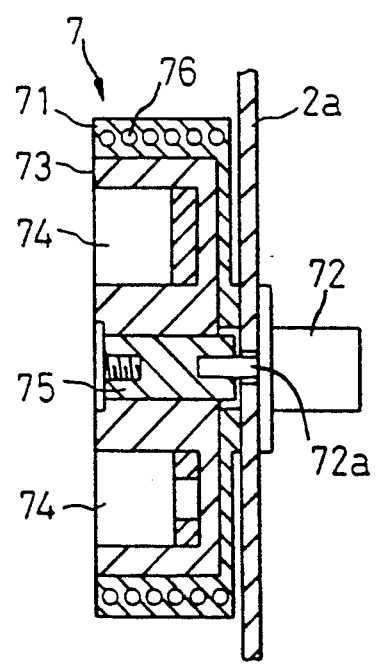
FIG. 8 is a partial side sectional view showing a mold stocker shown in FIG. 1.

The injection molding machine further comprises a mold stocker 7 which is located adjacent to the mold changer 6 at the mold clamping section 2, and serves to releasably contain a plurality of sets of first and second cavity units 12 and 22. As shown in FIGS. 1 and 8, the mold stocker 7 includes a cylindrical housing 71 fixed to the outer surface of the side wall 2a of the mold clamping section 2, a stepping motor 72 fixed to the inner surface of the side wall 2a and rotatable under the control of the control section 5, and a cavity unit storage section 73 arranged in the housing 71. The storage section 73 is formed with a plurality of storage holes (storage chambers) 74 for storing the plurality of sets of cavity units 12 and 22, the holes 74 corresponding in shape to various molded pieces and being arranged at regular intervals in the circumferential direction. This cavity unit storage section 73 is fixed to a supporting shaft 75, which is fixed to a motor output shaft 72a, so as to be rotatable integrally with the shaft 75. Reference numeral 76 denotes a temperature control pipe buried in the housing 71.

Furthermore, the injection molding machine comprises a temperature controller 8 for adjusting the temperatures of the matrixes 11 and 21, which are attached to the platens 3 and 4, respectively, and the cavity units 12 and 22 in the mold stocker 7 to their respective desired temperatures. The temperature controller 8 is connected to the first and second matrixes 11 and 22 by means of temperature control fluid supply tubes 8a, 8b and 8c and return tubes 8d, 8e and 8f, and is also connected to the temperature control pipe 76 in the mold stocker housing 71, so that a temperature control fluid (generally, heat exchange medium) is circulated between the elements 11, 22 and 76.

Figure 5:
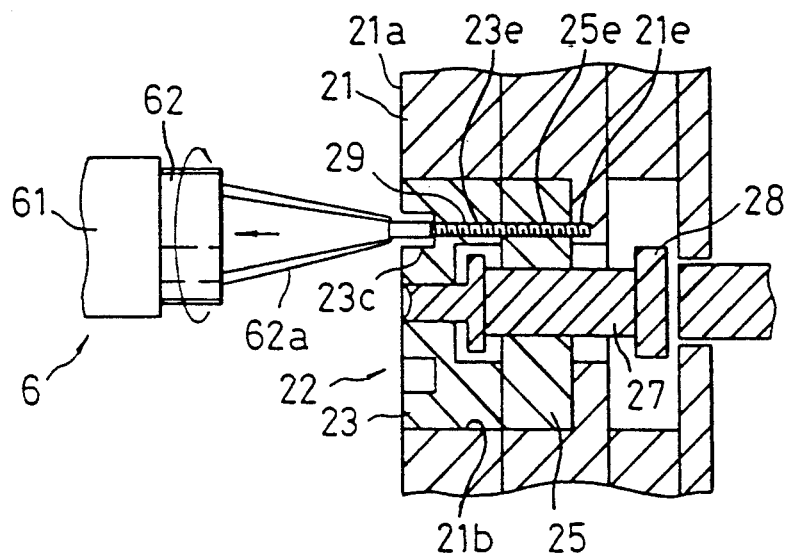
FIG. 5 is a partial longitudinal sectional view illustrating an operation for detaching the cavity unit from a matrix by means of the mold changer.
Figure 6:
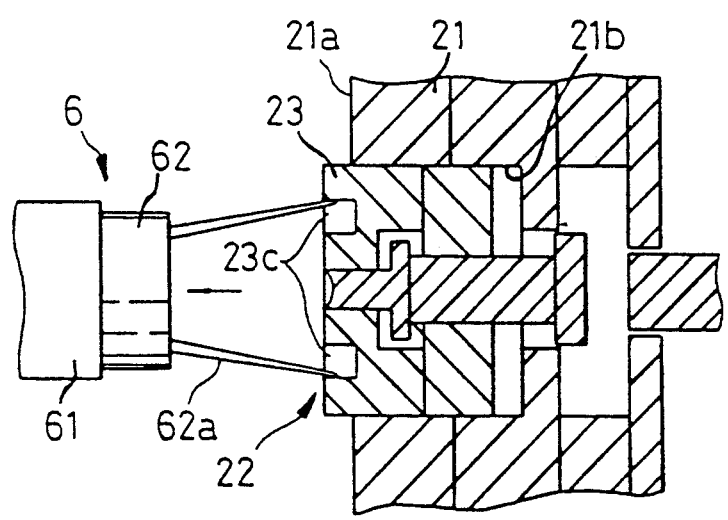
FIG. 6 is a view similar to FIG. 5.
Figure 7:
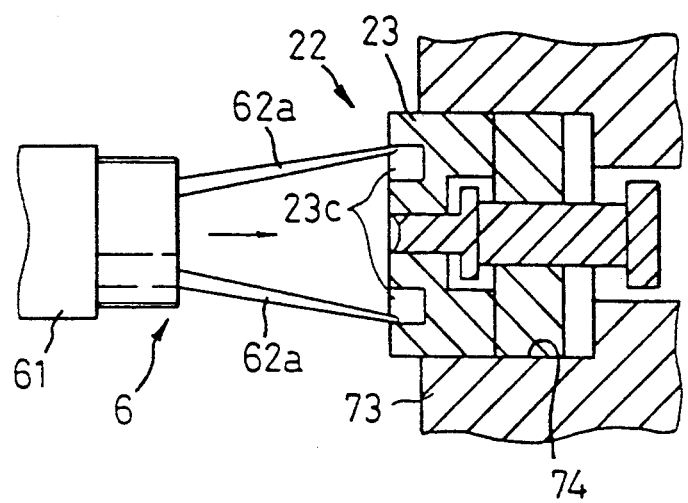
FIG. 7 is a partial longitudinal sectional view illustrating an operation for attaching the cavity unit to the matrix by means of the mold changer.

Referring now to FIGS. 5 to 7, mold replacing operation of the injection molding machine will be described.

In switching the operation to the manufacture of molded pieces of a different type, one set of cavity units 12 and 22 attached to the matrixes 11 and 21 are replaced with another set of cavity units, and the two cavity units 12 and 22 are replaced substantially in the same manner. The following is a description of the operation for the replacement of the second cavity unit 22 which corresponds to the movable platen 4.

When a mold replacement signal is delivered from the host control section to the control section 5 after the end of the manufacture of molded pieces of a certain type, the links 61a of the arm 61 of the mold changer 6 are individually driven by the motor 63 under the control of the control section 5, so that the chuck 62 moves toward the second matrix 21 from a delivery starting position where it faces the mold stocker 7. Then, the arm 61 is further activated so that the three chuck claws 62a, spread a little wider than the size of the head of the hexagon bolt 29, which connects the second matrix 21 and the second cavity unit 22, are inserted in the annular groove 23c of the cavity unit 22, in a circumferential position where the arm 61 faces the bolt 29. Then, after the head of the hexagon bolt 29 is chucked by means of the chuck claws 62a, the chuck 62 rotates with bolt head held in this manner (FIG. 5), whereby the bolt 29 is disengaged from the tapped hole 21e of the matrix 21 as it rotates. If the cavity unit 22 is fixed to the matrix 21 by means of a plurality of bolts 29, the individual bolts 29 are disengaged from the elements 21 and 22 following the same steps of procedure.

Then, after the three individual chuck claws 62a are inserted into the annular groove 23c at three different circumferential positions of the cavity unit 22, the chuck claws 62a are spread radially outward in the annular groove 23c so that the claws engage the outside inner peripheral surface of the annular groove, whereby the cavity unit 22 is held by means of the chuck claws 62a. Subsequently, the arm 61 is activated so that the chuck 62 retreats integrally with the cavity unit 22 in the recess 21b of the matrix 21, in the direction of the arrow, as shown in FIG. 6. Thereupon, the cavity unit 22 is removed from the matrix 21.

During or after the removal of the cavity unit 22, the stepping motor 72 of the mold stocker 7 is driven under the control of the control section 5, so that an empty one of the storage holes 74 of the cavity unit storage section 73, which corresponds to the cavity unit 22 removed from matrix 21, is located in a predetermined rotational position which faces the cavity unit delivery starting position. Then, the chuck 62, storing the cavity unit 22 removed from the matrix 21, is inserted into the empty storage hole 74, the chuck claws 62a are slightly closed to disengage the cavity unit 22 from the chuck 62, and the chuck 62 retreats from the storage hole 74 to the delivery starting position. Thereafter, the motor 72 is further driven, and the storage hole 74 storing the new cavity unit 22 to be attached to the matrix 21 is located in the predetermined rotational position. Thereupon, the arm 61 advances, and the individual chuck claws 62a spread in the annular groove 23c of the new cavity unit 22, thereby storing the cavity unit, as shown in FIG. 7. Then, the arm 61 retreats so that the cavity unit 22 is taken out from the storage hole 74.

Further, the arm 61 is activated to transport the new cavity unit 22 toward the matrix 21 so that the cavity unit 22 is fitted into the recess 21b of the matrix 21. After the arm 61 then retreats so that the three chuck claws 62a are disengaged from the annular groove 23c of the cavity unit 22, the three claws 62a are closed and moved to the position where they face the hexagon bolt 29 which is screwed in the tapped holes 23e and 25e of the cavity unit 22. With the bolt head held by means of the claws 62a in the annular groove 23c, furthermore, the chuck 62 rotates so that the bolt 29 is screwed into the tapped hole 21e of the matrix 21. As a result, the new cavity unit 22 is attached to the matrix 21, whereupon the replacement of the second cavity unit 22 is finished. The first cavity unit 21 is replacement in the same manner.

While the injection molding machine is operating, the temperature control fluid (generally, heat exchange medium), such as water or oil, is adjusted to a predetermined temperature (about 100° C. for PMMA), depending on the type of molding material, in the temperature controller 8. The temperature control fluid is circulated between the temperature controller 8, the first and second matrixes 11 and 21, and the housing 71 of the mold stocker 7 through the tubes 8a to 8f, whereby the respective temperatures of the elements 11, 21 and 71 are kept at predetermined temperatures.

According to the injection molding machine of the first embodiment described above, only the cavity units 12 and 22 of the mold are replaced, so that the mold changer 6 and the mold stocker 7 can be reduced in size, and therefore, the space can be saved. Since the mold changer 6 is disposed between the platens 3 and 4 and the mold stocker 7, moreover, the arm operating distance for the cavity unit replacement of the mold changer 6 can be shortened, and the operation can be performed speedily and accurately. Since the matrixes 11 and 21 and the mold stocker 7 are continually subjected to the temperature control by means of the temperature controller 8, furthermore, the mold temperature control operation after the cavity unit replacement can be accomplished by only fine adjustment. For this reason, as well as due to the speedy cavity unit replacement, the time required for the start of an injection molding cycle can be reduced.

The first embodiment can be modified variously.

Figure 9:
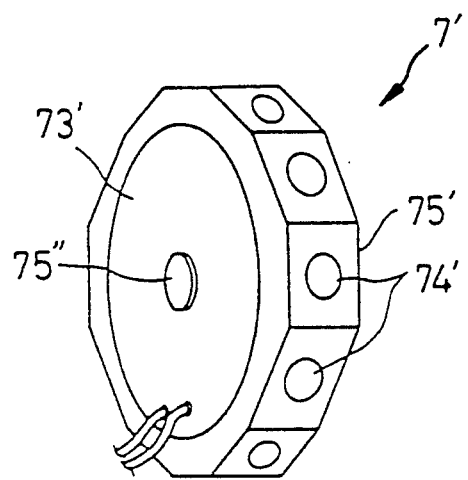
FIG. 9 is a schematic perspective view showing a modification of the mold stocker.
Figure 10:
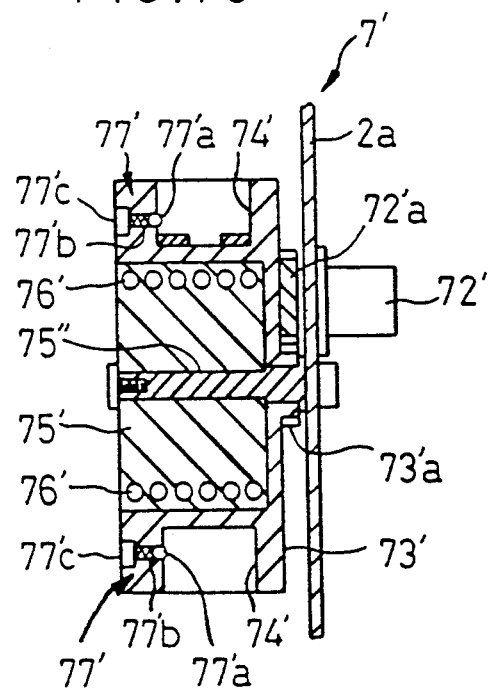
FIG. 10 is a partial side sectional view of the mold stocker shown in FIG. 9.

For example, an air suction chuck or electromagnetic chuck may be used in place of the contractible three-claw chuck 62. Although a temperature control fluid supply port of the mold stocker 7 is connected to the temperature controller 8 in the first embodiment, moreover, it may alternatively be connected to a return port of the matrix 21 or 22. Furthermore, a mold stocker 7' shown in FIGS. 9 and 10 may be used in place of the mold stocker 7.

The mold stocker 7' includes a cylindrical supporting body 75' fixed to the mold clamping section side wall 2a by means of a supporting shaft 75", a cavity unit storage section 73' rotatably supported by the supporting body 75', and a stepping motor 72' fixed to the mold clamping section side wall 2a, and a temperature control pipe 76' is buried in the supporting body 75'. The cavity unit storage section 73' is operatively connected to the motor 72' by means of gears 73'a and 72'a, and a required one of a plurality of storage holes 74', which are formed circumferentially at regular intervals on the outer peripheral surface of the storage section 73' and serve to hold the cavity units 12 and 22, is located in the predetermined rotational position which faces the cavity unit delivery starting position. Also, the cavity unit storage section 73' is provided with click mechanisms 77' as many as the storage holes 74'. Each click mechanism 77' includes an engaging ball 77'a adapted to releasably engage an engaging recess (not shown) which is formed in the outer peripheral surface of the sleeve of the cavity unit 12 or 22, a spring 77'b for urging the ball 77'a inward, and a spring retainer 77'c for preventing the spring 77'b from slipping out from the storage section 73'. While the storage section 73' is rotating, the engaging ball 77'a of the click mechanism 77' is fitted into the engaging recess of the cavity unit held in the storage hole 74', whereby the cavity unit is prevented from dropping. When the cavity unit is loaded into or unloaded from the storage section 73', the engaging ball 77'a is disengaged from the engaging recess, resisting the urging force of the spring 77'b.

Referring now to FIGS. 11 to 16, an injection molding machine according to a second embodiment of the present invention will be described.

The second embodiment, which is arranged so that a pair of core halves can be simultaneously attached to or detached from stationary and movable platens and a mold stocker, differs in the arrangement of a mold and the mold stocker, from the first embodiment in which the core halves are separately attached or detached. Instead of using the three-claw chuck 62 of the first embodiment, moreover, an electromagnetic chuck 262 (FIG. 15), which is connected electrically to a control section 5, is mounted on the distal end of an arm 61 of a mold changer 6. Since the other components are arranged in the same manner as in the first embodiment, like reference numerals are used to designate the elements common to the two embodiments, and a description of those elements is omitted.

Figure 11:
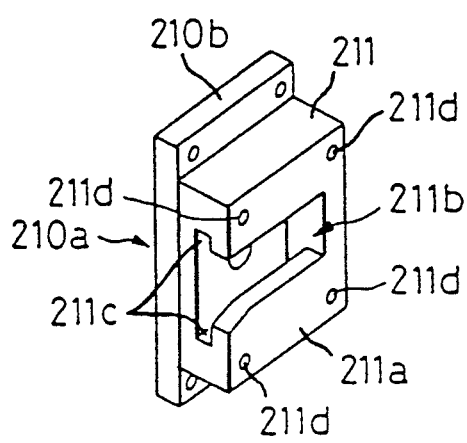
FIG. 11 is a perspective view showing a stationary-side matrix used in a second embodiment of the present invention.
Figure 12:
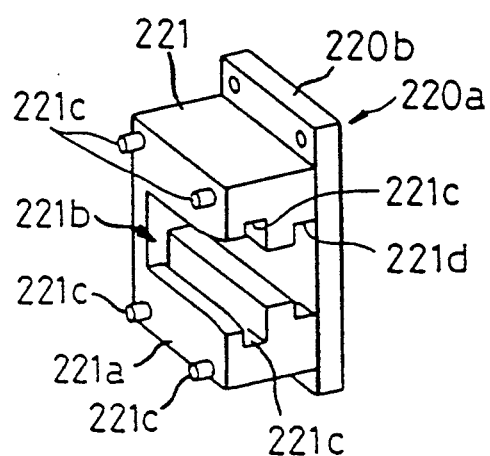
FIG. 12 is a perspective view showing a movable-side matrix.
Figure 13:
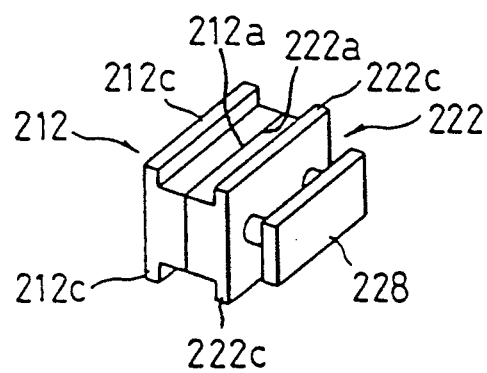
FIG. 13 is a perspective view showing stationary- and movable-side cavity units.
Figure 14:
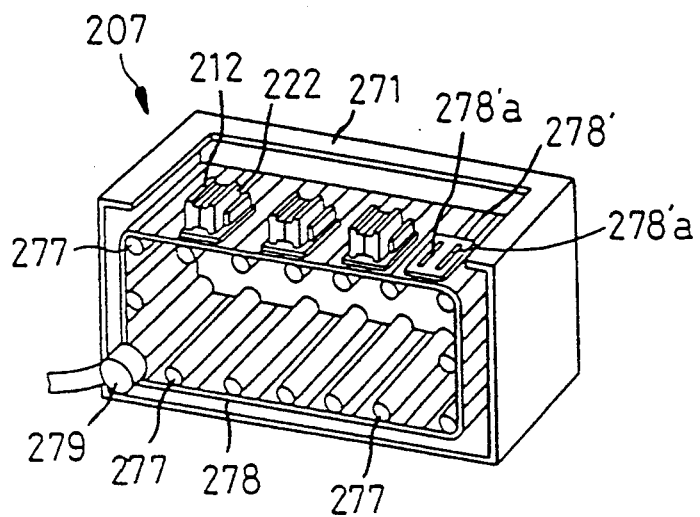
FIG. 14 is a perspective view of a mold stocker according to the second embodiment.
Figure 15:
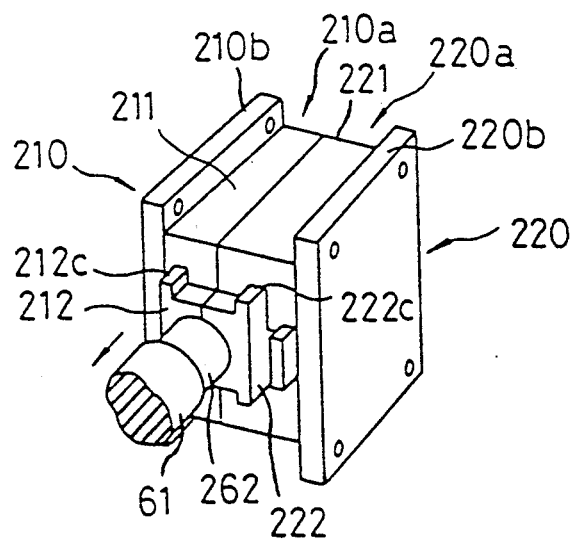
FIG. 15 is a partial perspective view illustrating an operation for attaching or detaching a core to or from the matrix by means of the mold changer.

The mold, which is constructed basically in the same manner as the mold of the first embodiment, is composed of a first mold half 210, which includes a first matrix half 210a and a first cavity unit 212, and a second mold half 220, which is formed of a second matrix half 220a and a second cavity unit 222 (see FIG. 15). A cavity (not shown) is formed in each of parting faces 212a and 222a of the two cavity units. The first matrix 210a includes a mounting plate 210b mounted on the stationary platen 3 and a matrix body 211 fixed to the plate 210b (FIG. 11). Likewise, the second matrix 220a includes a mounting plate 220b mounted on the movable platen 4 and a matrix body 221 fixed to the plate 220b (FIG. 12).

A parting face 211a of the first matrix body 211 is formed having a recess 211b in which the first cavity unit 212 is to be fitted, the recess 211b opening to one side face of the matrix body 211. Engaging grooves 211c, which open to the side face of the matrix body 211, are formed individually on the upper and lower sides of the inner peripheral surface of the recess 211b. Engaging projections 212c, which are arranged individually on the upper and lower edges of that side end portion of the first cavity unit 212 opposite to the parting face, can be releasably fitted in their corresponding engaging grooves 211c. Further, engaging holes 211d are bored through the parting face 211a of the first matrix body 211. Engaging pins 221c formed on the parting face 221a of the second matrix body 221 are adapted to be releasably fitted in the engaging holes 211d. The parting face 221a of the second matrix body 221 is formed having a recess 221b in which the second cavity unit 222 is fitted. The inner peripheral surface of the recess 221b is formed having engaging grooves 221c, in which are fitted engaging projections 222c arranged individually on the upper and lower edges of an end portion of the second cavity unit 222, and engaging grooves 221d in which the upper and lower edge portions of a projecting plate 228 of the cavity unit 222 are fitted individually.

The mold stocker 207 for storing the aforementioned molds comprises a frame body 271 fixed to a side wall 2a of a mold clamping section 2, a plurality of heater rollers 277 rotatably supported by means of the frame body 271 and each containing heating means (not shown) therein, a belt conveyor 278 stretched between the heater rollers, and a servomotor 279 for driving the belt conveyor 278 under the control of, for example, the control section 5. Further, the belt conveyor 278 includes a plurality of bearers 278' arranged side by side, and the paired cavity units 212 and 222 set on each bearer 278' are adjusted to a predetermined temperature (e.g., about 140° C. for PC as molding material). Each bearer 278' is formed with engaging grooves 278'a, in which the respective engaging projections 212c and 222c of the paired cavity units are fitted individually, and has an electromagnet (not shown) therein. While each bearer 278' is moving along the opposite side walls and bottom wall of the frame body 271, accompanying the operation of the belt conveyor 278, the electromagnet is excited to prevent the cavity unit from falling off the bearer 278'.

The following is a description of cavity unit replacing operation of the aforementioned injection molding machine.

In replacing the cavity units, the arm 61 of the mold changer 6 is activated under the control of the control section 5, so that the electromagnetic chuck 262 is driven from its cavity unit delivery starting position toward the mold. At this point of time, the mold is in a closed state such that the mold halves 210 and 220 are joined together. The first and second cavity units 212 and 222 to be simultaneously removed are fitted, respectively, in the recesses 211b and 221b of the first and second matrix half bodies 211 and 221, which are attached to the stationary and movable platens 3 and 4 by means of the mounting plates 210b and 220b, respectively, in a manner such that the engaging projections 212c and 222c are in engagement with their corresponding engaging grooves 211c and 221c.

Figure 16:
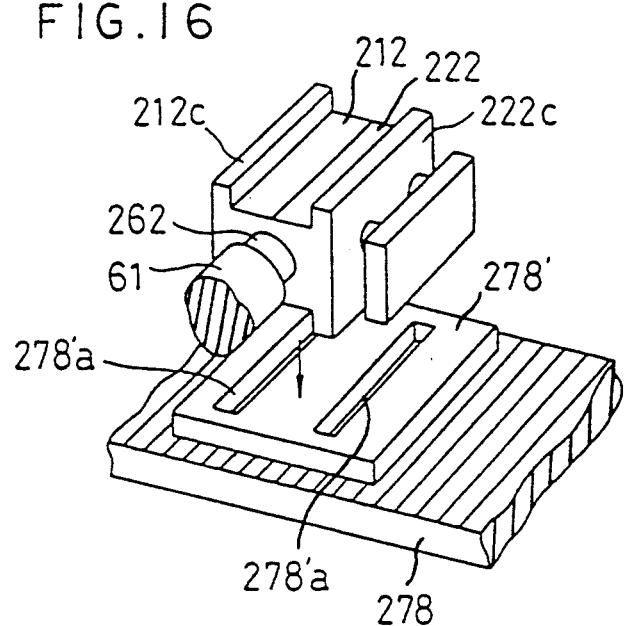
FIG. 16 is a partial perspective view illustrating an operation for storing the core in the mold stocker of FIG. 14.

Then, the arm 61 is further operated to cause the electromagnetic chuck 262 to abut against the respective side faces of the paired cavity units 212 and 222. The electromagnetic chuck 262 is actuated under the control of the control section 5, and attracts and holds the paired cavity units simultaneously by means of its electromagnetic force of attraction. Subsequently, the arm 61 retreats so that the paired cavity units are simultaneously drawn out from their corresponding matrix bodies 211 and 221. On the other hand, the servomotor 279 is driven under the control of the control section 5, thereby moving the empty bearer 278' corresponding to the paired cavity units drawn out from the matrix bodies to a predetermined position where the bearer 278' is opposed to the delivery starting position of the chuck 262 and faces a top opening the mold stocker 207. Then, the arm 61 is moved downward integrally with the cavity units, as shown in FIG. 16, and the cavity units 212 and 222 are set on the bearer 278' in a manner such that the engaging projections 212c and 222c are caused to engage the engaging grooves 278'a, individually. Then, after the electromagnetic chuck 262 is deenergized to cause the cavity units to be disengaged from the electromagnetic chuck, the chuck is retreated to the delivery starting position.

When the bearer 278' carrying thereon the paired cavity units 212 and 222 to be attached to the matrix bodies 211 and 221 next is located in the predetermined position, the electromagnetic chuck 262 attracts and holds a new pair of cavity units. Subsequently, the new pair of cavity units 212 and 222 are attached to the matrix bodies 211 and 221, respectively, substantially oppositely following the aforesaid steps of procedure for the removal of the cavity units, whereupon the replacement of the cavity units is finished.

According to the second embodiment described above, the paired cavity units are replaced simultaneously, so that the time required for the replacement of the cavity units can be shortened. Since the paired cavity units are replaced in a state such that they are joined together with the aid of the engaging pins and the engaging holes, moreover, the two cavity units cannot be deviated in position from each other. Furthermore, the cavity units are subjected to temperature control independently of the matrixes of the mold. Even if the optimum temperature of the presently used mold and the optimum temperature of the mold to be used next are different, therefore, the next-use mold can be adjusted to the optimum temperature, and injection molding can be started immediately after the mold replacement.

The above-described second embodiment can be further modified.

Figure 17:
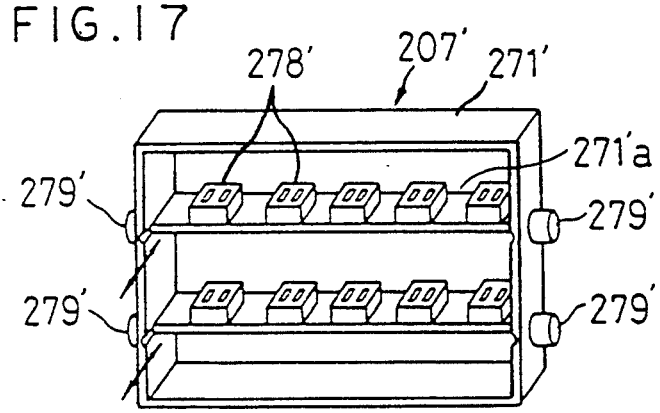
FIG. 17 is a perspective view showing a modification of the mold stocker of FIG. 14.
Figure 18:
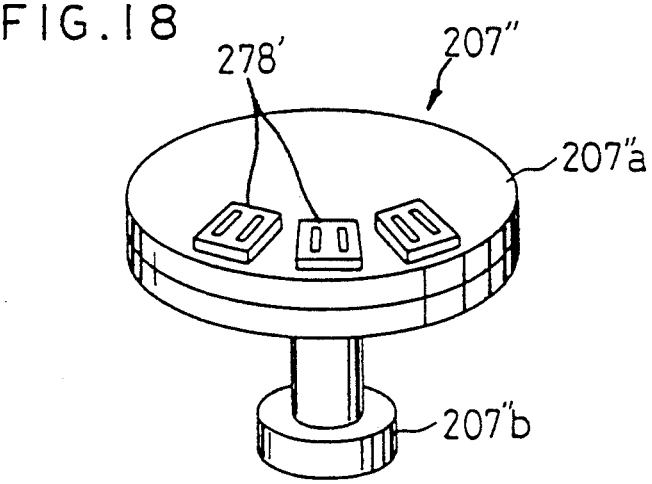
FIG. 18 is a perspective view showing another modification of the mold stocker.

For example, a mold stocker 207' shown in FIG. 17 or a mold stocker 207" shown in FIG. 18 may be used in place of the mold stocker 207. The mold stocker 207' comprises a plurality of shelves individually supported for reciprocation by a frame body 271' and a plurality of motors 279' operatively connected to the shelves 271'a, and the bearers 278' are arranged side by side on each shelf 271'a. On the other hand, the mold stocker 207" comprises a rotating table 207"a having the bearers 278' circumferentially arranged thereon and a leg 207"b supporting the table for rotation.

In the second embodiment described above, moreover, a pair of cavity units are replaced. Alternatively, however, a pair of matrixes fitted the paired cavity units may be replaced. In this case, it is necessary only that the stationary and movable platens 3 and 4 be formed having recesses in which the matrixes are removably fitted, and that the bearers 278' of the mold stocker 207 be large-sized.

The following is a description of a third embodiment of the present invention.

The present embodiment is designed so that heat produced in an injecting section 1 of an injection molding machine is effectively utilized for the temperature control of a mold stocker, thereby achieving energy conservation, and differs from the first embodiment mainly in that the temperature control of the mold stocker can be effected without necessarily connecting the mold stocker to a temperature controller 8.

Figure 19:
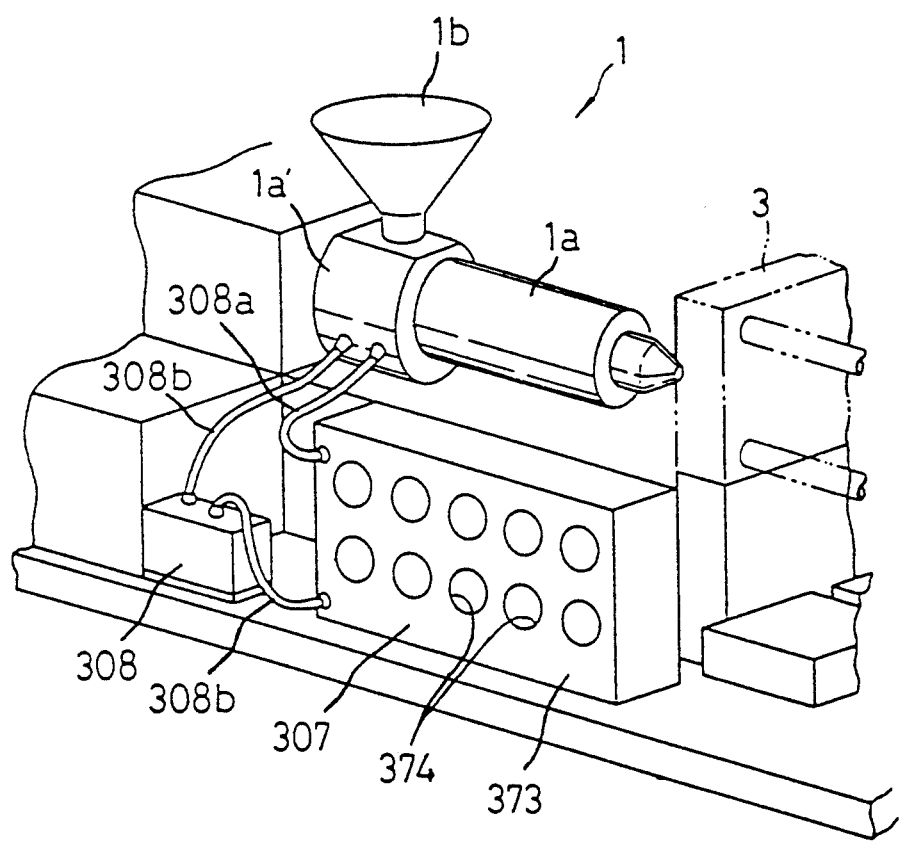
FIG. 19 is a partial schematic perspective view showing the principal part of an injection molding machine according to a third embodiment of the present invention.

As shown in FIG. 19, the mold stocker 307 is located under a heating cylinder 1a of an injecting section 1. A heater (not shown) for heating and softening a molding material supplied from a hopper 1b is contained in a proximal end portion 1a' of the heating cylinder, and cooling water for temperature control is introduced into the proximal end portion 1a' of the cylinder to keep it at about 80° C. A heat transfer medium, such as oil, water, or air, heated in the proximal end portion 1a' of the cylinder is circulated through a heat transfer medium supply tube 308a and a return tube 308b having a pump unit 308 in the middle, between the proximal end portion 1a' of the cylinder and a temperature control pipe (not shown) buried in the mold stocker 307, whereby the temperature of the mold stocker 307 is adjusted to 60° C. or more. If necessary, moreover, the mold stocker 307 is connected to the temperature controller 8, and its temperature is adjusted to 80° C. or more. In FIG. 19, reference numerals 373 and 374 denote a cavity unit storage section and storage holes (storage chambers) therein, respectively.

The following is a description of an injection molding machine according to a fourth embodiment of the present invention.

The present embodiment is designed so that cores are automatically replaced, and are automatically cleaned when they are replaced, and moreover, the cores in storage are preheated to shorten the time required for the start of a molding cycle after the replacement of the cores.

Figure 20:
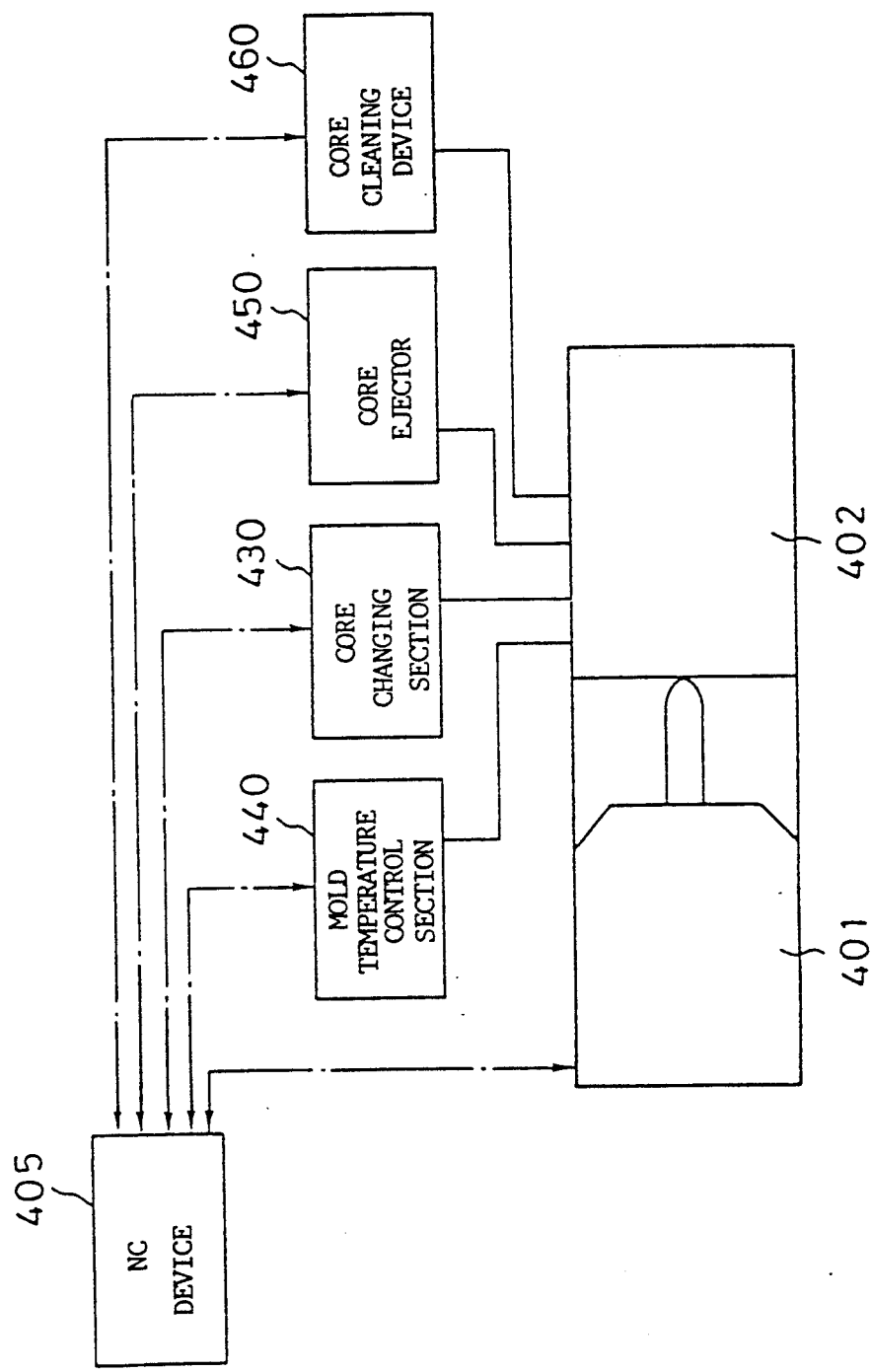
FIG. 20 is a schematic block diagram showing a general configuration of an injection molding machine according to a fourth embodiment of the present invention.

Referring to FIG. 20, the injection molding machine comprises an injecting section 401, a mold clamping section 402, which is provided with a core changing section 430, a mold temperature control section 440, a product/core ejector 450, and a mold cleaner 460, and a numerical control (NC) device 405 which combines the respective functions of the control section 5 and the host control section of the first embodiment. The injecting section 401 and the mold clamping section 402 constitutes the body of the injection molding machine.

Figure 21:
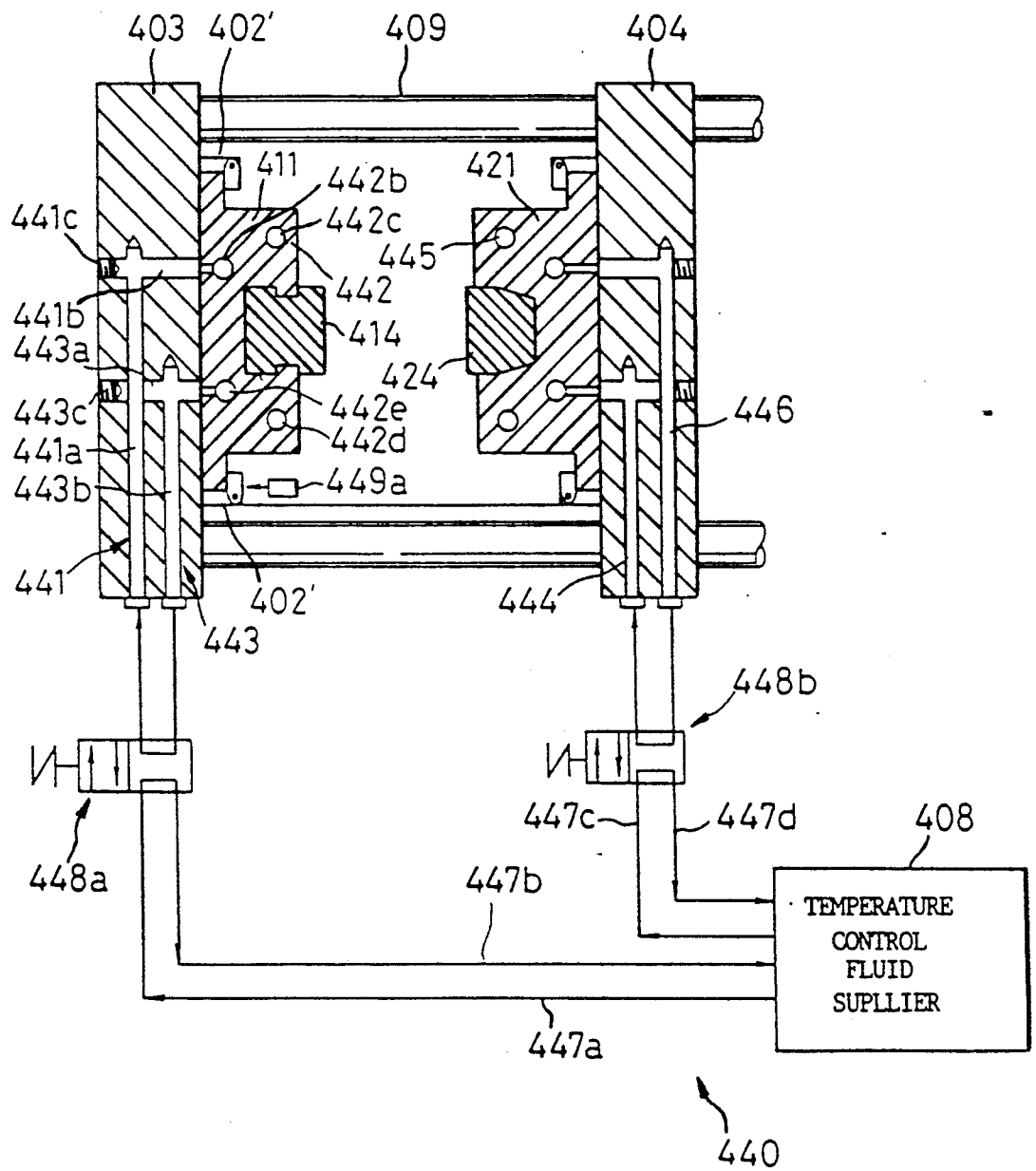
FIG. 21 is a horizontal sectional view showing a mold temperature control section shown in FIG. 20.

As shown in FIG. 21, a mold is removably attached to the injection molding machine by means of a mold clamping device which includes mold retaining members 402'. The mold includes a first core 414 removably attached to a first matrix 411, which is mounted on a stationary platen 403, and a second core 424 removably attached to a second matrix 421 which is mounted on a movable platen 404, and a molding cavity for, e.g., a lens, is formed in the joint surface of each core. Engaging pins 414c (FIG. 28) are formed on a parting face 424a of the second core 424, while engaging holes 424c (FIG. 29) to receive the engaging pins 414c are formed in a parting face 424a of the second core 424, the two cores being transportable integrally with each other.

Figure 25:
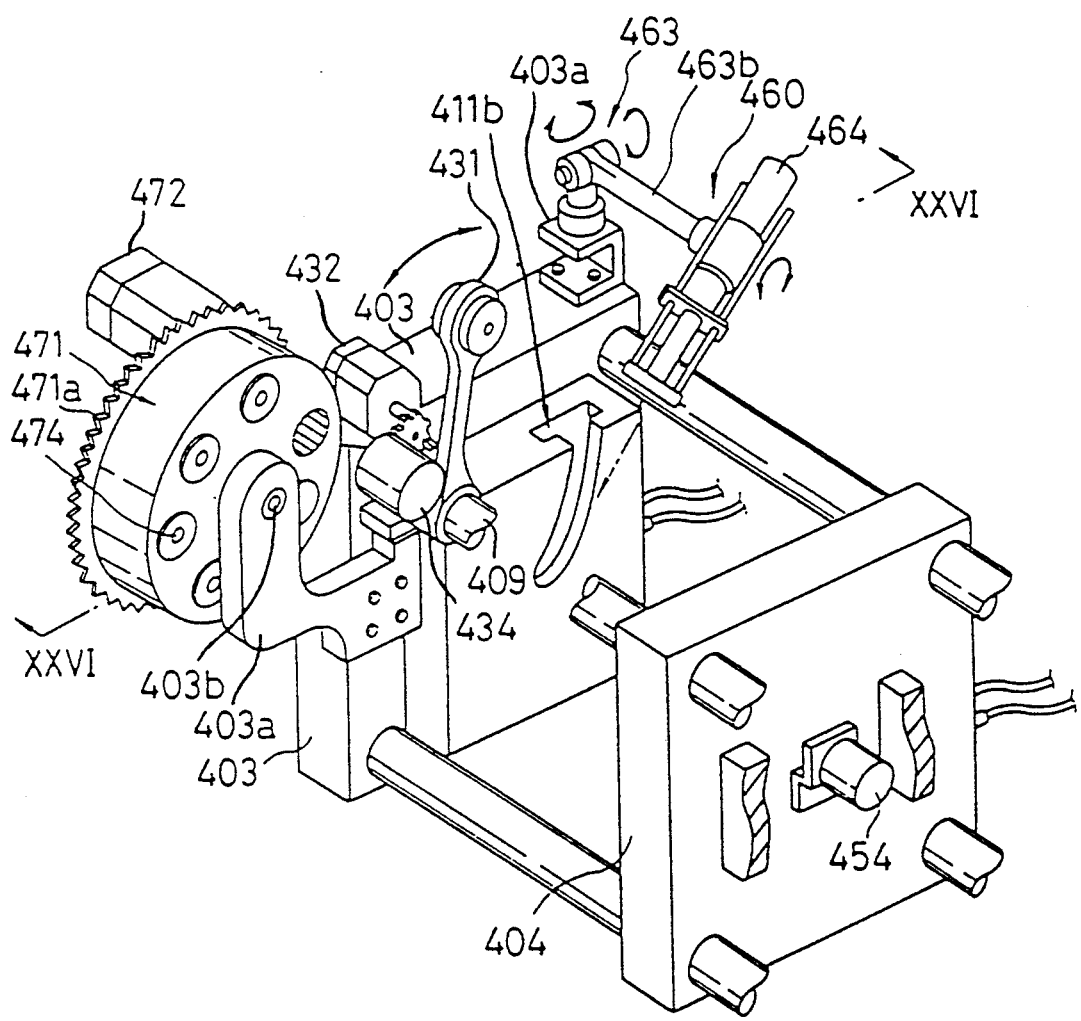
FIG. 25 is a perspective view showing the core changer and its peripheral elements.
Figure 26:
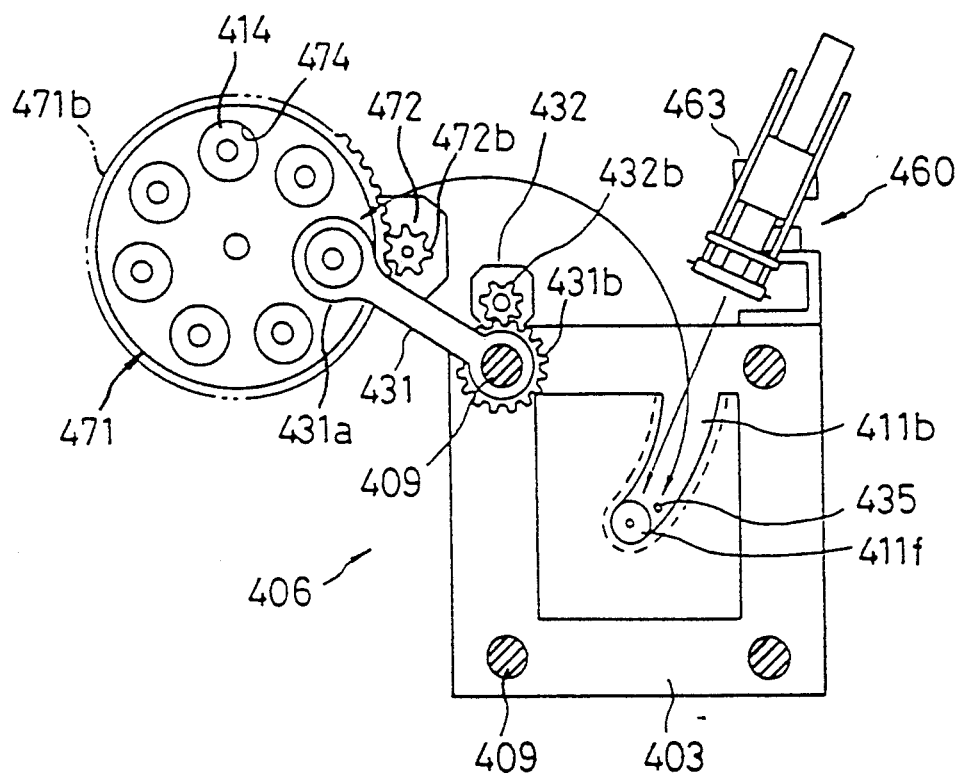
FIG. 26 is a fragmentary view taken in the direction of the arrow along line XXVI—XXVI.
Figure 27:
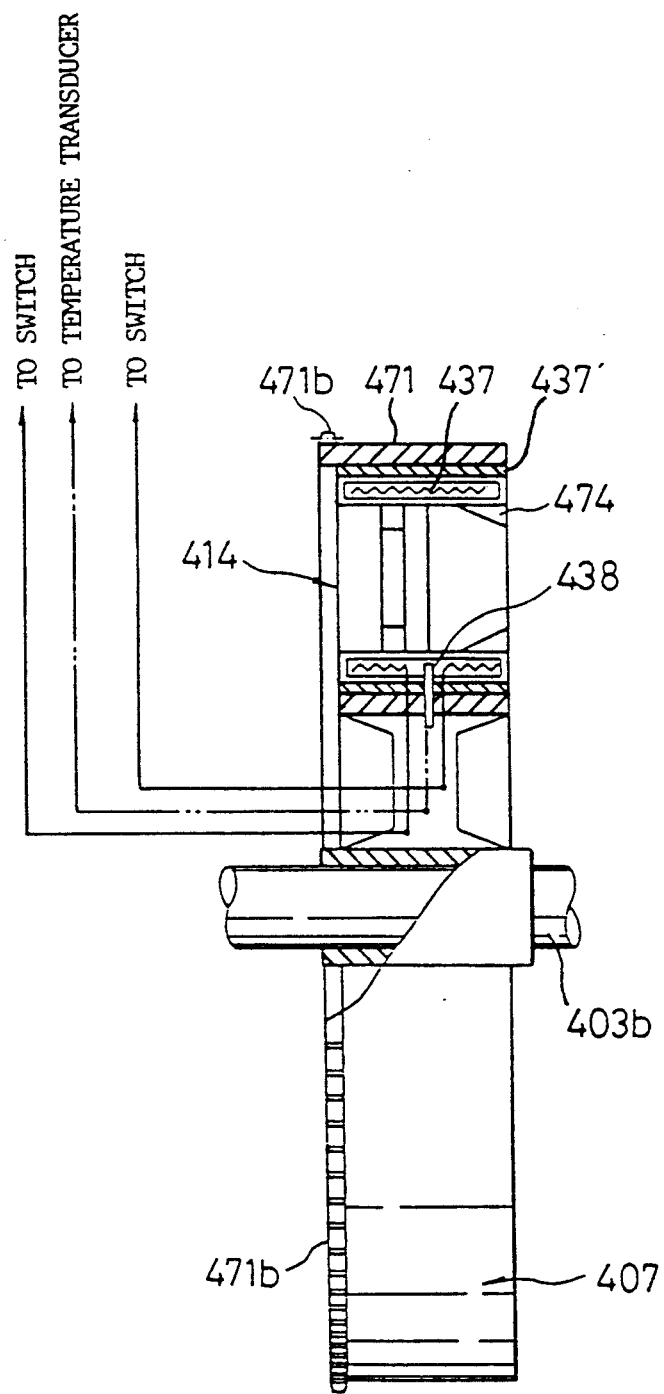
FIG. 27 is a front view, partially in longitudinal section, showing a core stocker.
Figure 29:
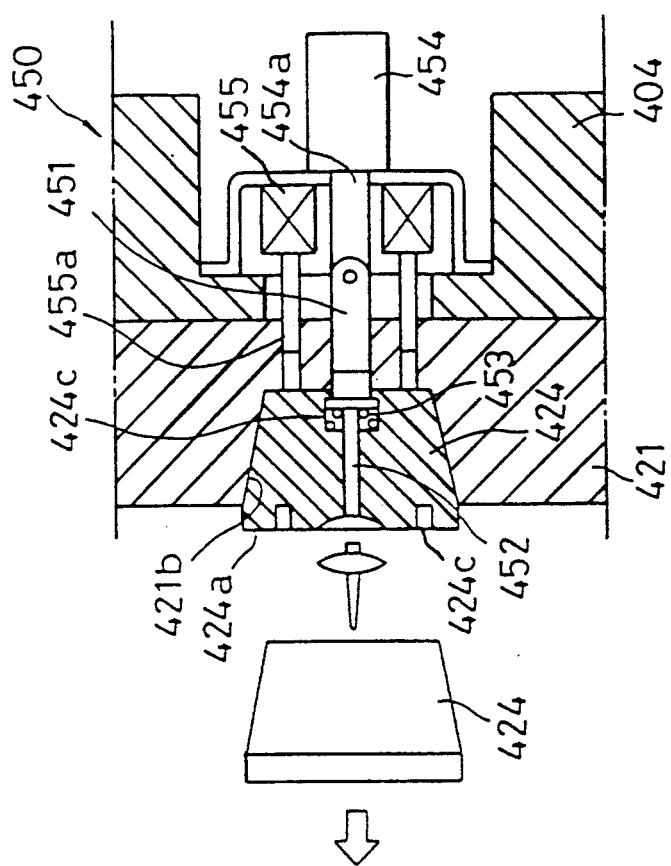
FIG. 29 is a partial front view, partially in section, showing a core ejector.
Figure 28:
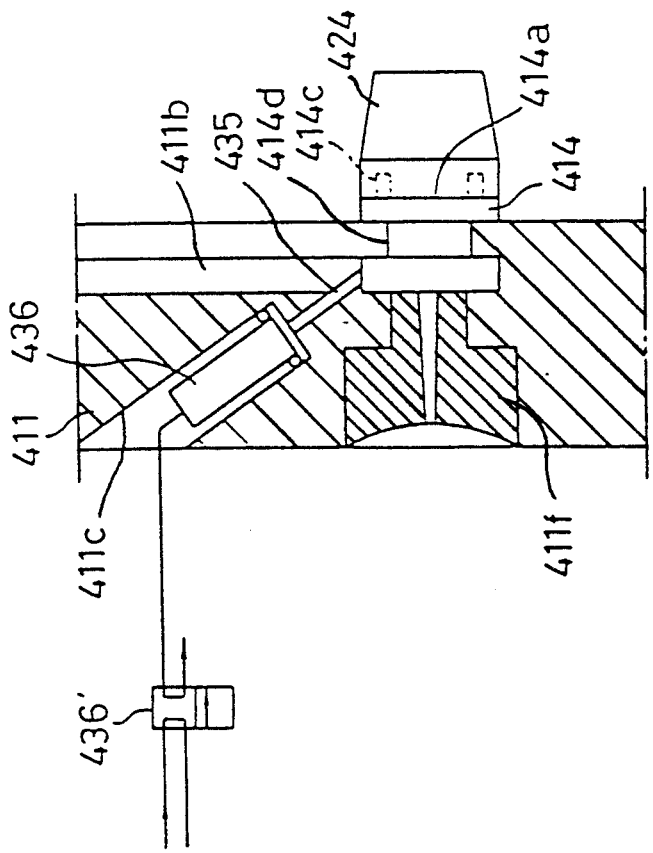
FIG. 28 is a partial front view, partially in longitudinal section, showing a core holding stopper of the core changer and its peripheral elements.

Referring to FIGS. 25, 26 and 28, a spool bush 411f is arranged in the central portion of the first matrix 411, and a core mounting recess (groove) 411b with a T-shaped horizontal section is formed in that end face of the matrix 411 on the core mounting side, so as to extend in an circular arc along the path of transfer of a rotating arm of a core changer, which will be mentioned later. The recess 411b extends from the top face of the matrix to the central portion of the matrix, and the size of its horizontal section is larger than that of the cross section of the core on its top end opening side, and is substantially equal to that of the cross section of the core on the bottom side, so that the first core 414 can be closely fitted in the bottom portion of the recess 411b. An annular groove 414d (FIG. 28) is formed on the outer peripheral surface of the middle portion of the first core 414 with respect to the axial direction, so that the core 414 has an I-shaped cross section, and therefore, is prevented from being disengaged horizontally outward from the matrix recess 411b. Also, the core 414 is formed having a resin passage (not shown) which communicates with a resin passage of the spool bush 411f. As shown in FIG. 29, moreover, a recess 421b to receive the second core 424 is formed in the central portion of that end face of the second matrix 421 on the core mounting surface side. The recess 421b is tapered so that the size of its profile is larger on the recess opening side and smaller o the recess bottom side.

Referring to FIG. 21, the mold temperature control section 440 comprises a temperature control fluid supplier (mold temperature controller) 408, first to sixth temperature control fluid passages 441 to 446 formed individually in the stationary platen 403, first matrix 411, movable platen 404, and second matrix 421, and temperature control fluid tubes 447a to 447d which connect the temperature controller 408 and their corresponding passages. A temperature control fluid at a predetermined temperature of, e.g., 50° to 150° C. is circulated through these passages and tubes between the temperature controller 408 and the matrixes 411 and 421, whereby the matrixes and the cores 414 and 424 are kept at a predetermined temperature. First and second solenoid-operated selector valves 448a and 448b, which open and close under the control of the NC device 405, are arranged in the middle of the tubes 447a and 447b and in the middle of the tubes 447c and 447d, respectively, whereby the circulation of the temperature control fluid can be prevented.

Figure 23:
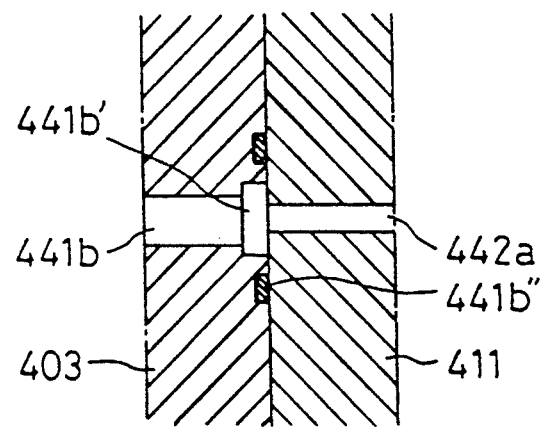
FIG. 23 is a partial enlarged sectional view showing a junction between temperature control fluid passages on the stationary platen side and the matrix side.

More specifically, the first passage 441 includes an inlet port connected to a supply port of the temperature controller 408 by means of the supply tube 447a, a hole 441a communicating with this inlet port and horizontally extending in the direction of the platen width in the stationary platen 403, and a hole 441b communicating with the hole 441a and horizontally extending in the direction of the platen thickness. An outer open end of the hole 441b is closed by means of a screw plug 441c. As shown in FIG. 23, an inner end 441b' of the hole 441b has a larger diameter, and an O-ring 441b" is arranged on a mold mounting surface of the stationary platen 3 so as to be in alignment with the hole 441b. This O-ring has a thickness such that the mold can be mounted without hindrance.

Figure 22:
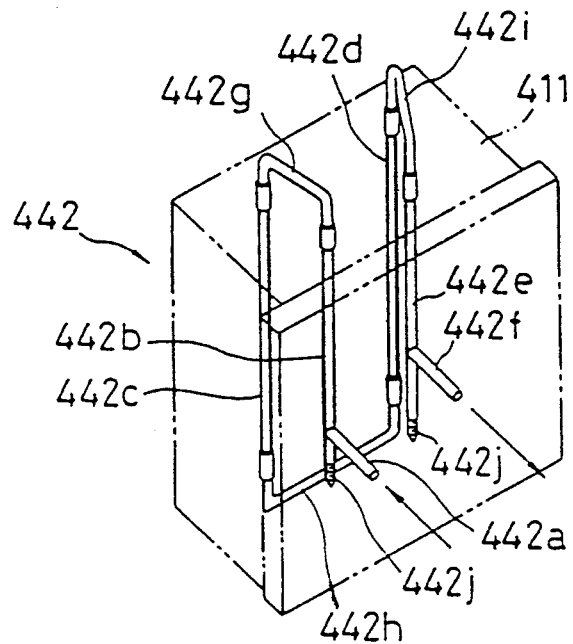
FIG. 22 is a perspective view showing a temperature control fluid passage formed in the stationary-side matrix.

As is best seen from FIG. 22, the second passage 442 includes a hole 442a horizontally extending in the first matrix 411 so as to be in alignment with the hole 441b, four holes 442b to 442e vertically extending in the matrix 411, a hole 442f communicating with the hole 442e and horizontally extending in the matrix 411, and tubes 442g to 442i connecting the respective upper open ends of the holes 442b and 442c, the respective lower open ends of the holes 442c and 442d, and the respective upper open ends of the holes 442d and 442f, respectively. The respective lower open ends of the holes 442b and 442e are closed individually by means of screw plugs 442j. As is best seen from FIG. 23, the hole 442a is in alignment with the hole 441b, and has a diameter smaller than that of the inner end 441b' of the hole 441b.

The third passage 443 includes a hole 443a horizontally extending in the direction of the platen thickness in the stationary platen 403 so as to be in alignment with the hole 442f, a hole 443b communicating with the hole 443a and horizontally extending in the direction of the platen width, and an outlet port communicating with the hole 443b and communicating with a return port of the temperature controller 408 by means of the return tube 447b. The outer open end of the hole 443a is closed by means of a screw plug 443c. Like the hole 441b, the hole 443a has an inner end larger in diameter than the hole 442f, and is surrounded by an O-ring.

The fourth to sixth passages 444 to 446 are constructed in the same manner as the first to third passages 441 to 443, respectively.

The following is a description of the operation of the mold temperature control section 440.

When the matrixes 411 and 421 are mounted on the stationary and movable platens 403 and 404, respectively, by means of the mold clamping device, the respective inner ends of the second passage holes 442a and 442f are connected in a watertight manner to the facing ends of the first passage hole 441b and the third passage hole 443a, respectively, and the opposite ends of the fifth passage 445 are connected in a watertight manner to the facing ends of the fourth and sixth passages 444 and 446, respectively. Also, the attachment of the mold is detected by means of a sensor 449a, and a mold attachment completion signal is delivered from this sensor to the NC device 405. In response to this, the first and second solenoid-operated selector valves 448a and 448b are shifted to the temperature control fluid supply side under the control of the NC device 405. As a result, the supply port of the temperature controller 408 communicates with the respective inlet ports of the first and fourth passages 441 and 444 by means of the supply tubes 447a and 447c, respectively, and the return port of the temperature controller 408 communicates with the respective outlet ports of the third and sixth passages 443 and 446 by means of the return tubes 447b and 447d, respectively. Thus, the temperature control fluid circulates between the temperature controller 408 and the matrixes 411 and 421, thereby keeping both matrixes and the cores 414 and 424 at the predetermined temperature.

When the matrixes 411 and 421 are removed, on the other hand, the solenoid-operated valves 448a and 448b are shifted to the temperature control fluid supply prohibition side under the control of the NC device 405 which operates in response to a detection output from the sensor 449a. As a result, the temperature controller 408 is cut off from the passages 441, 443, 444 and 446. Also, the supply tube 447a and the return tube 447b are connected by means of the solenoid-operated valve 448a, the tubes 447c and 447d are connected by means of the solenoid-operated valve 448b, and the temperature control fluid circulates in these tubes. Thus, the supply of the temperature control fluid is automatically allowed or prevented as the matrixes are attached to or detached from the platens, and the tubes connecting the temperature controller and the platens need not be manually attached or detached. Since the tubes need not be attached or detached, they can be arranged in neat order without hindering an operator's operation.

Referring now to FIGS. 24 to 27, a core changing section, which comprises the core changer and a core stocker, will be described.

The core stocker 407 of the core changing section 430 (FIG. 20) comprises a stocker body 471 rotatably supported by means of a shaft 403b, which is fixed to the stationary platen 403 by means of a stator 403a, and a servomotor 472 for rotating the stocker body 471 under the control of the NC device 405. A plurality of storage holes (storage chambers) 474 for storing a plurality of pairs of cores 414 and 424 are formed in the stocker body 471 so as to be arranged in the circumferential direction. A sheathed heater 437, sealed in a metal cylinder, and a thermocouple (temperature sensor in general) 438 are arranged in each storage hole 474 (FIG. 27), and are subjected to preliminary core temperature control mentioned later. An adiabatic member 437′ is interposed between each storage hole defining surface of the stocker body 471 and the heater 437 corresponding thereto, whereby thermal interference between the storage holes 474 is reduced. Further, a gear 471b, which is formed on the outer peripheral surface of the rear portion of the stoker body 471, is in mesh with a gear 472b which is fixed to the output shaft of the servomotor 472.

The core changer 406 of the core changing section 430 includes the rotating arm 431 for attaching and detaching the paired cores 414 and 424 to and from the matrixes 411 and 421, respectively, and transporting them between the matrixes and the core stocker 407, and a servomotor 432 fixed to the upper surface of the stationary platen 403 and used to drive the rotating arm 431 under the control of the NC device 405. The rotating arm 431 is located close to the stationary platen 403, and is rockably supported at its proximal end portion by means of one upper tie bar 409. An axial hole having a diameter a little larger than the outside diameter of the cores is formed penetrating a core holding ring 431a, which is provided at the distal end portion of the rotating arm 431, and the inner peripheral surface of the axial hole is covered by a soft metal, such as brass, in order to protect the cores. The thickness of the core holding ring 431a is shorter than the distance between the opposed surfaces of the matrixes 411 and 421 measured at the time of mold clamping. Further, a gear 431, which is fixed to the outer peripheral surface of the proximal end portion of the rotating arm 431, is in mesh with a gear 432b which is fixed to the output shaft of the servomotor 432.

The core changer 406 further includes a stopper 435 for pressing the outer peripheral surface of the first core 414, which is attached to the recess 411b of the first matrix 411, thereby maintaining the attachment of the core, a pneumatic actuator 436 for driving the stopper, and a solenoid-operated selector valve 436′ for allowing or preventing the supply of compressed air to the actuator 436 under the control of the NC device 405 (FIG. 28). The stopper 435 and the actuator 436 are arranged in a stepped hole 411c which is formed diagonally penetrating the matrix 411, from the upper portion of that end face of the matrix on the side remoter from the core toward the core mounting recess 411b.

Figure 24:
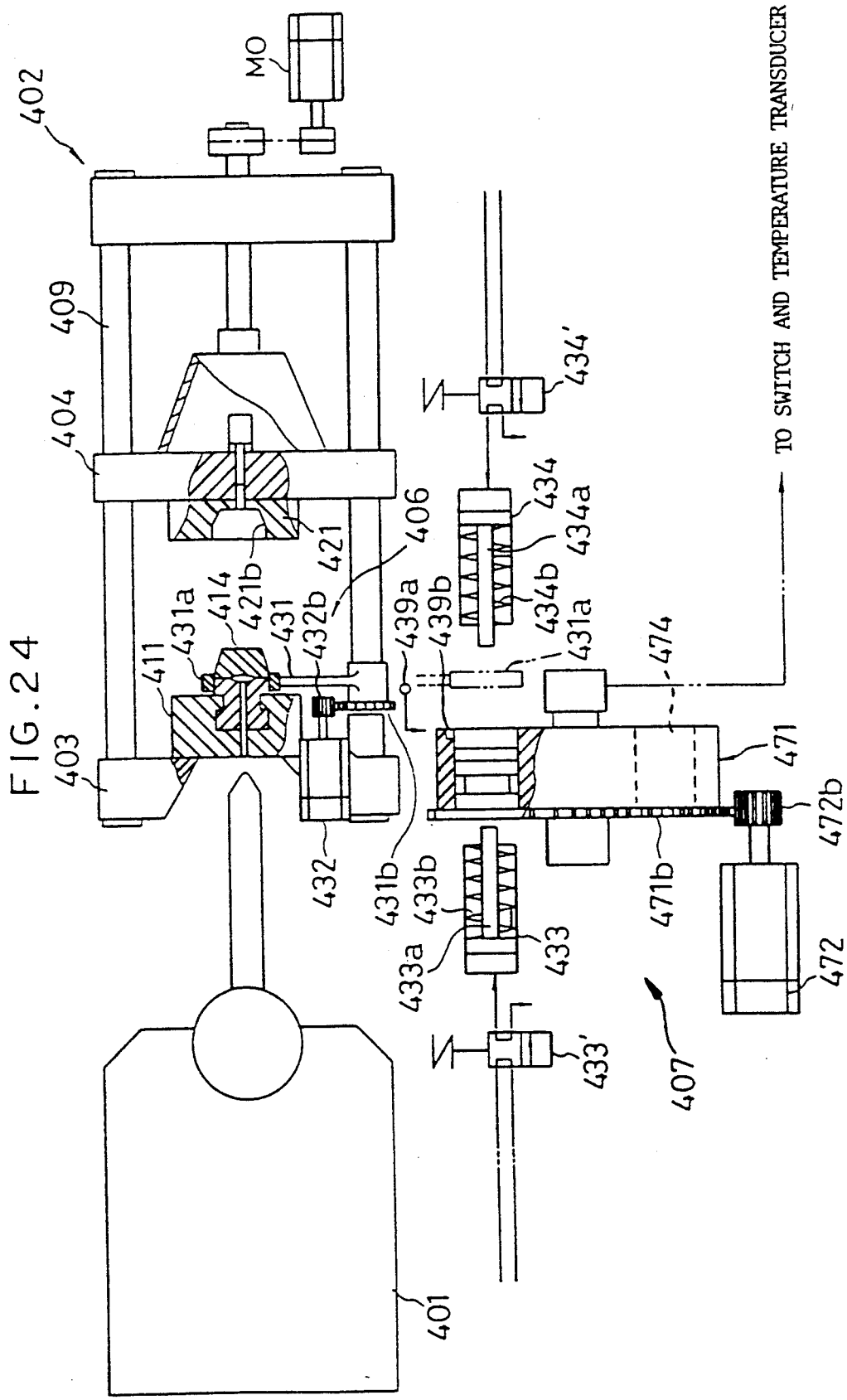
FIG. 24 is a plan view, partially in horizontal section, showing a core changer of the injection molding machine shown in FIG. 20 and its peripheral elements.

The core changer 406 further includes pneumatic extrusion/return actuators 433 and 434 for moving the paired cores between the storage hole 474 in its core delivery position and the core holding ring 431a in its core delivery position, and solenoid-operated selector valves 433′ and 434′ interposed individually between a compressed air source (not shown) and the two actuators (FIG. 24). The actuators 433 and 434, which are arranged individually on the opposite sides of the core stocker 407 and the rotating arm 431, include pistons 433a and 434a and return springs 433b and 434b, respectively. When the solenoid-operated valve 433′ or 434′ is shifted to the compressed air supply side under the control of the NC device 405, moreover, the piston 433a or 434a advances against the urging force of the spring 433b or 434b, thereby moving the paired cores from its corresponding one element, out of the storage hole 474 and the core holding ring 431a, to the other. When the solenoid-operated valve is shifted to the compressed air supply prohibition side, on the other hand, the piston is retreated by the urging force of the spring.

A photoelectric sensor 439a, which is located facing the core delivery position, is adapted to be switched on when there are no paired cores in the gap between the core holding ring 431a and the core stocker 407. Further, a magnetic sensor 439b, which is located at the entrance to each storage hole 474, is adapted to be switched on when there are paired cores in the storage hole.

Referring now to FIGS. 25 and 29, the core ejector will be described.

The product/core ejector 450 comprises an ejector rod 451, which extends penetrating the second matrix 421 along the axis thereof and is fitted in a large-diameter portion of a stepped axial hole 424c, and an ejecting pin 452 slidable in the axial hole 424c, the ejector pin 452 being urged toward the ejector rod 451 by means of a return spring 453. A through-type servomotor 454, which is fixed to that end face of the movable platen 404 on the side remoter from the mold, includes a ball nut (not shown) rotatable integrally with a rotor (not shown) and a motor output shaft 454a formed of a ball screw movable only in the axial direction. Under the control of the NC device 405, the ejector rod 451, which is connected directly to the output shaft 454a, is axially moved toward the mold to cause the ejector pin 45 to eject a product from the molding cavity, and the ejector rod 451 is further axially moved to cause the second core 424 to be disengaged from the second matrix 421. A pneumatic servomotor capable of two-stage operation or the like may be used in place of the through-type servomotor 454. The ejector 450 further includes solenoids 455 arranged individually on the opposite sides of the motor output shaft 454a. Each solenoid operates so that a plunger 455a abuts against the core 424 for a short period of time, thus functioning as a kind of electromagnetic hammer.

Figure 30:
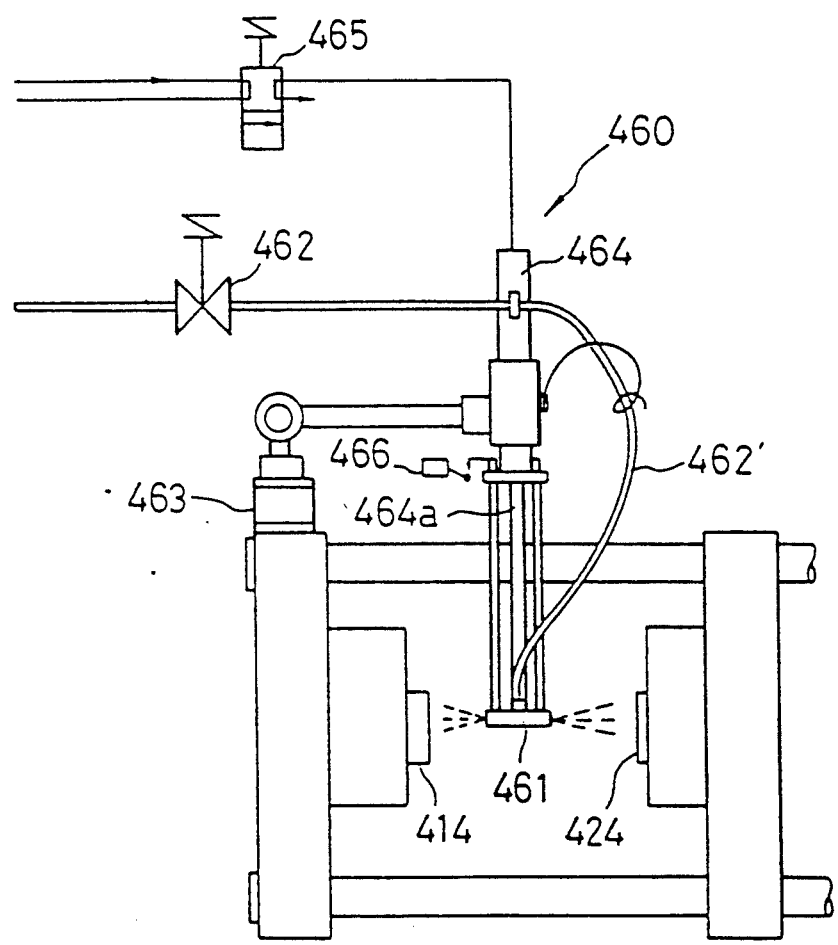
FIG. 30 is a front view showing a mold cleaning device.

Referring to FIGS. 25, 26 and 30, the mold cleaner 460 comprises a nozzle 461 for injecting a cleaning fluid toward the respective cavity defining surfaces of the cores 414 and 424. The nozzle 461 is connected to a cleaning fluid supply source (not shown) by means of a hose 462', in the middle of which is arranged a solenoid-operated valve 462 which is controlled by means of the NC device 405. A pneumatic actuator 464, which is used to move the nozzle 461 between a retreated position and a cleaning position, is connected to the compressed air source (not shown) through a solenoid-operated valve 465 which is controlled by means of the NC device 405. The nozzle 461 is attached to the distal end of a piston 464a of the actuator, and the piston 464a is urged toward its retreated position by means of a return spring (not shown) contained in the actuator so that it returns to the retreated position when the supply of the compressed air is cut off. When the nozzle 461 is in the cleaning position, it is detected by means of a sensor 466. A stand 463 (FIG. 25), which has a base 463a fixed to the upper surface of the stationary platen 403, includes an arm 463b which is turnable with respect to the base and bendable in the middle, and the actuator 464 is attached to the distal end of the arm so as to be swingable with respect to the arm. The moving direction of the nozzle 461 can be suitably set by manually adjusting the turning angle, bending angle, and swing angle.

Figure 31:
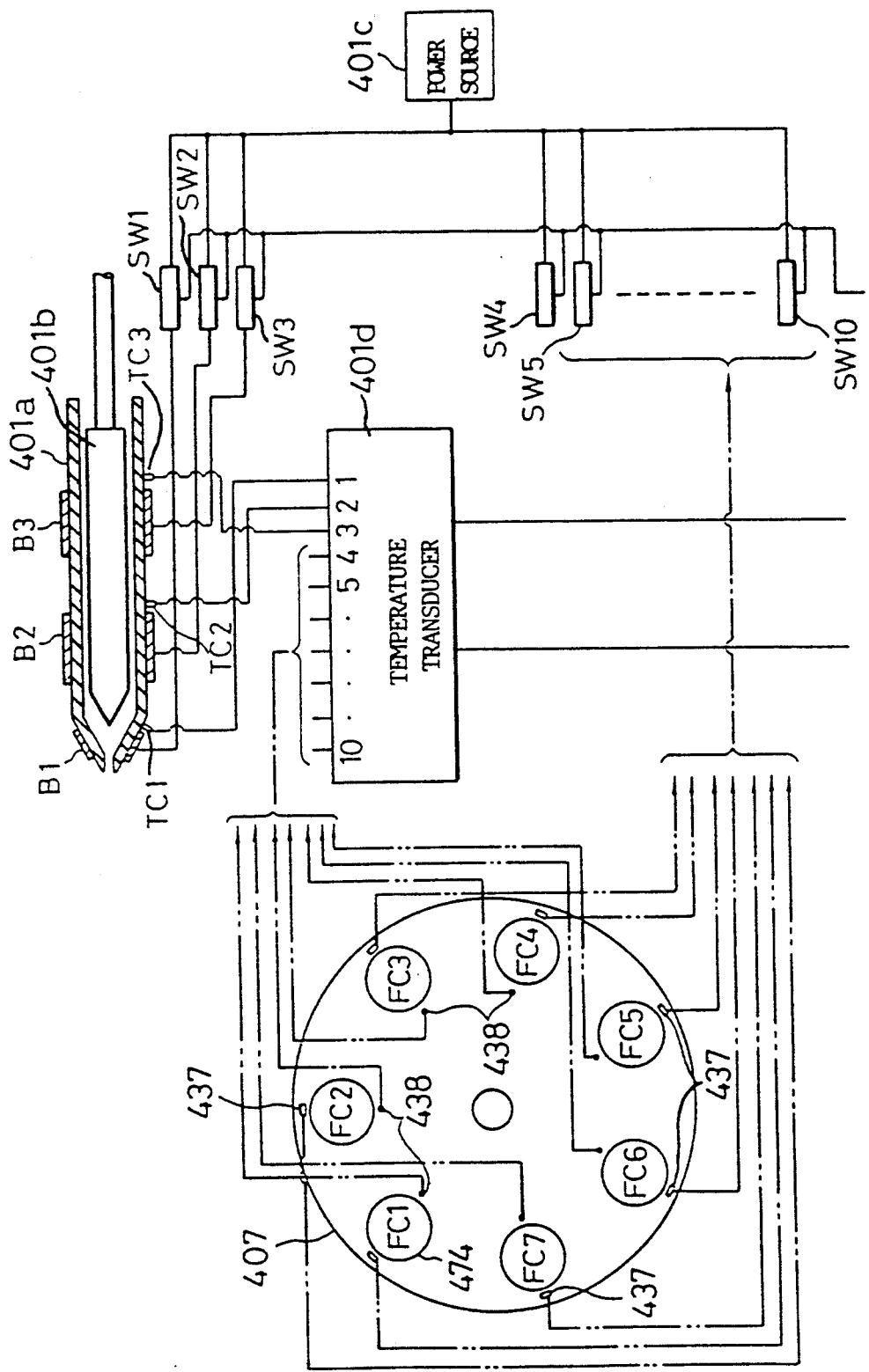
FIG. 31 is a schematic view showing a heating cylinder and the core stocker of the injection molding machine along with the temperature control section.

As shown in FIG. 31, the injection molding machine comprises a heating cylinder 401a which contains a screw 401a'. Three heating zones of the heating cylinder 401a are provided, respectively, with band heaters B1 to B3, which are connected to a power source 401c through switches SW1 to SW3 on-off controlled by means of the NC device 405, and thermocouples TC1 to TC3 for detecting the temperature of the heating zones.

The thermocouples TC1 to TC3 are connected to first to third input terminals of a temperature transducer 401d, respectively, thermocouples 438 (FIG. 27) corresponding individually to the seven storage holes 474 of the core stocker 407 are connected individually to fourth to tenth input terminals of the transducer 401d, and the respective outputs of the individual thermocouples are converted into digital signals in the transducer 401d. In FIG. 31, symbols FC1 to FC7 designate codes indicative of the seven storage holes 474, and SW4 to SW10 designate switches which are interposed between the heaters 437 corresponding individually to the seven storage holes 474 and the power source 401c, and are on-off controlled by means of the NC device 405.

Figures 32, 33:
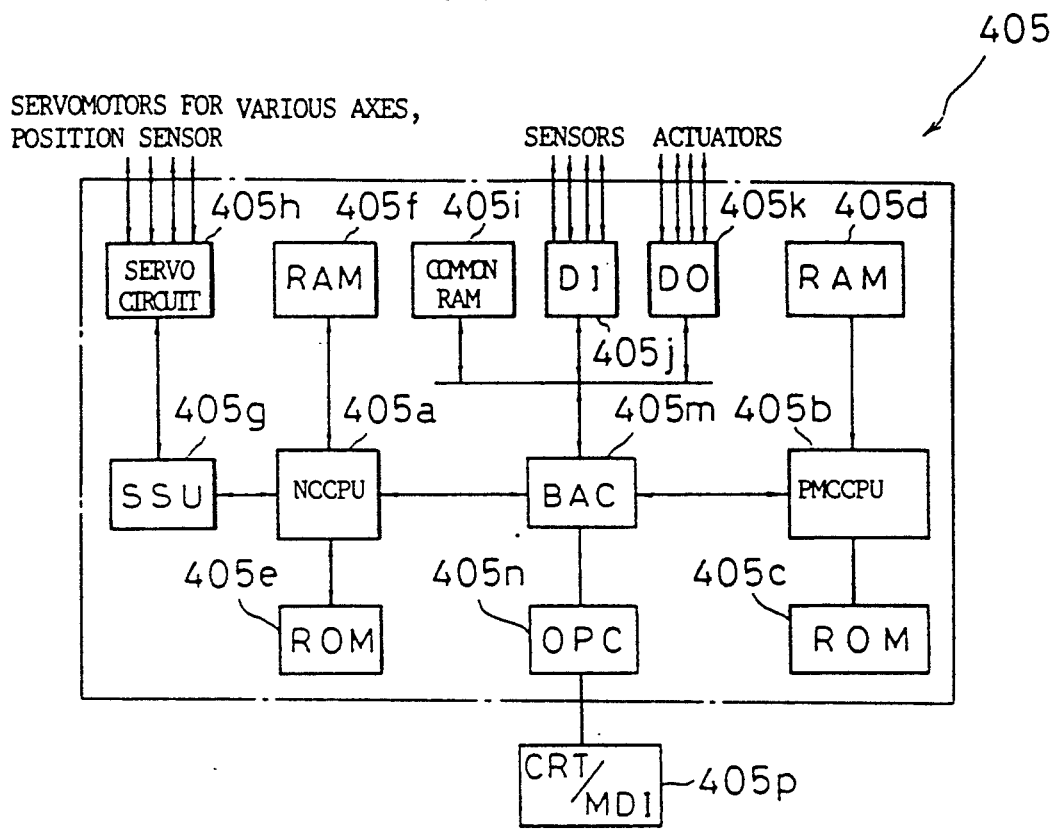
FIG. 32 is a block view showing an NC device.
FIG. 33 is a diagram showing a lookup table for preliminary core temperature control/core replacement.

Referring to FIG. 32, the NC device 405 comprises a microprocessor (hereinafter referred to as NCCPU) 405a for numerical control and a microprocessor (hereinafter referred to as PMCCPU) 405b for a programmable machine controller. The PMCCPU 405b is connected with a read-only memory (ROM) 405c stored with sequence programs and the like used for the sequence control of the injection molding machine and a random access memory (RAM) 405d used for the temporary storage of data and the like. The NCCPU 405a is connected with a ROM 405e stored with a management program for generally controlling the injection molding machine and a RAM 405f used for the temporary storage of data and the like. Further, a plurality of servo circuits (one of which is denoted by reference numeral 405h) for individually driving servomotors for various axes for injection, mold clamping, screw rotation, rotating arm drive for the core replacement, core stocker drive, ejector, etc., are connected to the NCCPU 405a through a servo interface 405g. The servo circuit is connected with a position sensor, e.g., a pulse coder (not shown), which is attached to the servomotor, and the position and speed of the servomotor is controlled by means of the servo circuit.

The NC device 405 further comprises a common RAM 405i, an input circuit 405j, an output circuit 405k, and a bus arbiter controller (BAC) 405m. The common RAM 405i, which is formed of a nonvolatile memory, such as a bubble memory or CMOS memory, includes a memory section for storing NC programs for controlling various operations of the injection molding machine and a set memory section for storing various set values, parameters, and macro variables. The input circuit 405j is connected to the various sensors, mold temperature controller 408, and temperature transducer 401d. The output circuit 405k is connected to the various solenoid-operated valves, electromagnetic solenoids, mold temperature controller, switches, temperature transducer, and servo circuit. The BAC 405m is connected with the respective buses of the NCCPU, PMCCPU, common RAM, and input and output circuits, and the bus to be used is controlled by means of the BAC. Further, a manual data input device (CRT/MDI) 405p with a CRT display unit, which is connected to the BAC 405m through an operator panel controller 405n, includes various operation keys, such as soft keys, ten-keys, etc., for the entry of various commands and set data.

In the NC device 405 constructed in this manner, the injection molding machine is sequence-controlled by means of the PMCCPU 405b in accordance with the NC programs, sequence programs, and various molding condition parameters, and pulses are distributed to the servo circuits for the various axes by means of the NCCPU 405a. Thus, injection molding cycles for metering, mold clamping, injection, dwell, cooling, mold opening, product ejection, etc. are executed in the conventional manner.

The following is a description of preliminary core temperature control operation executed under the control of the NC device 405.

In storing the plurality of pairs of cores 414 and 424 in the individual storage holes 474 of the core stocker 407, the operator operates the CRT/MDI 405p to cause a preliminary core temperature setting picture to be displayed on the CRT screen, and then to set the respective names (core codes) 414-1 and 424-1 to 414-7 and 424-7 of, e.g., seven pairs of cores stored in the storage holes 474, target preheating temperatures Ts1 to Ts7 of the individual core pairs (storage holes), and on-off control cycles (temperature control cycles) tp1 to tp7 of the storage hole heaters 437, corresponding individually to the storage hole indication codes FC1 to FC7. As a result, the common RAM 405i is loaded with a lookup table Tb for preliminary core temperature control and core replacement shown in FIG. 33. In setting the control cycles tp1 to tp7 at the same value, this value can be fixedly set beforehand as a default value. Symbols Q1 to Q7 in the table Tb represent target rotational positions of the core stocker drive servomotor 472 (FIG. 24) for locating the individual storage holes 474 in the core delivery position. The rotational positions Q1 to Q7 are previously set, for example, during the manufacture of the injection molding machine, so that they need not be set anew, and are not displayed on the CRT screen. When target temperatures and target control cycles (on-off control cycles) for the individual heating zones of the heating cylinder 401a and target mold temperatures are individually manually set, moreover, the individual set temperatures are stored in the common RAM 405i, and the temperature control cycles are stored in a work memory.

Figure 34A:
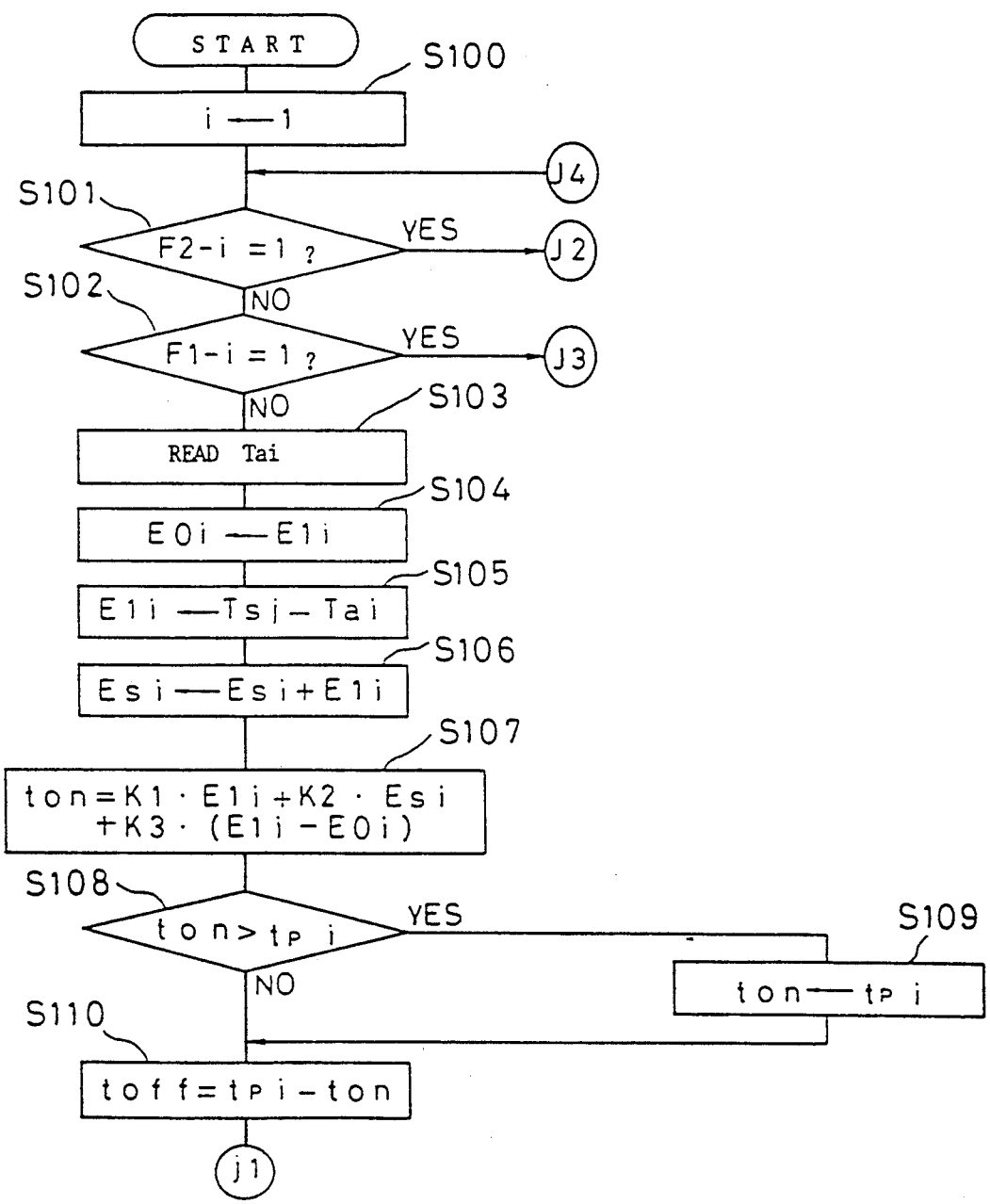
FIGS. 34A and 34B are flow charts showing a temperature control process executed by means of the NC device.
Figure 34B:
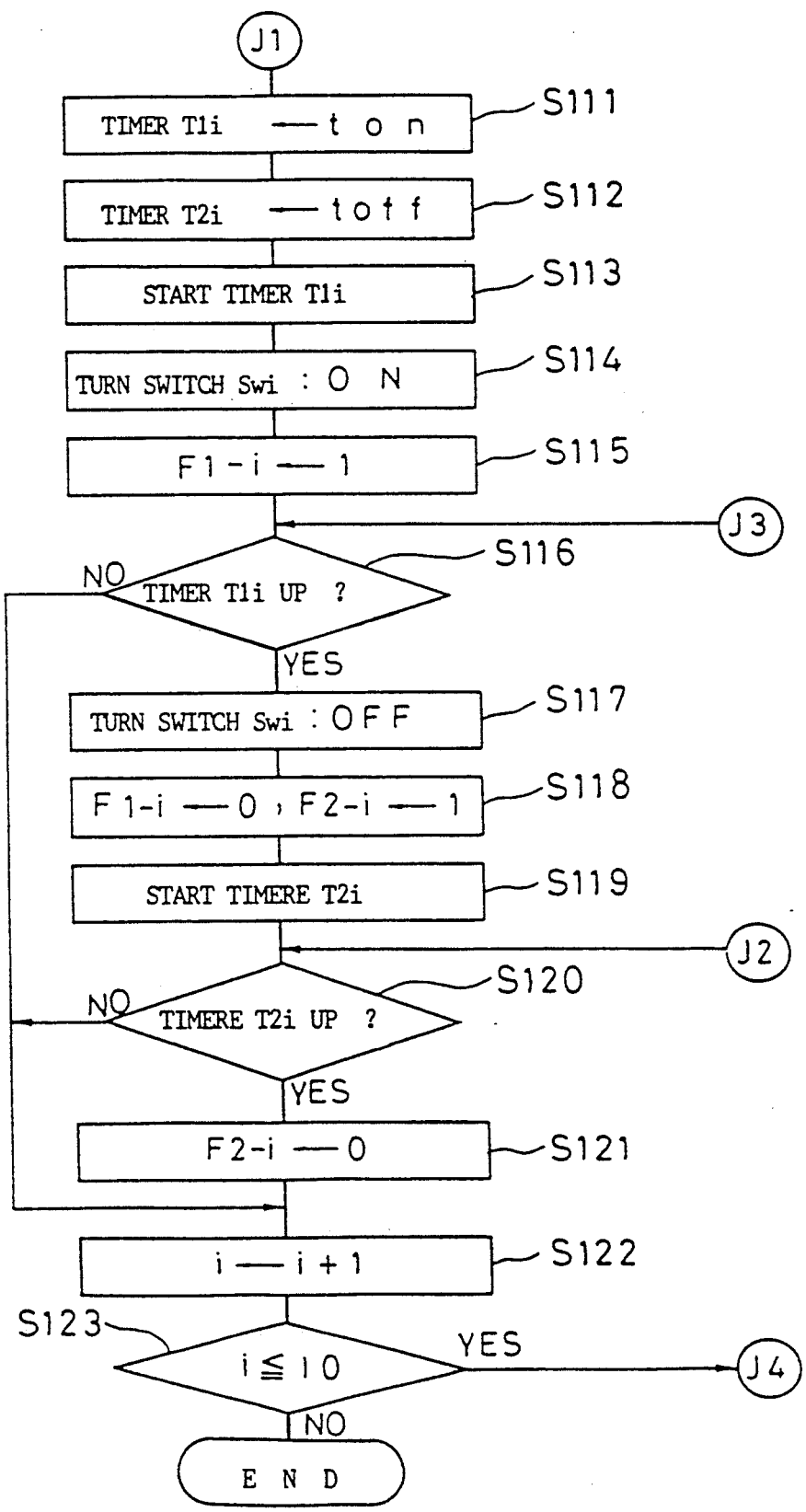
Figure 35A:
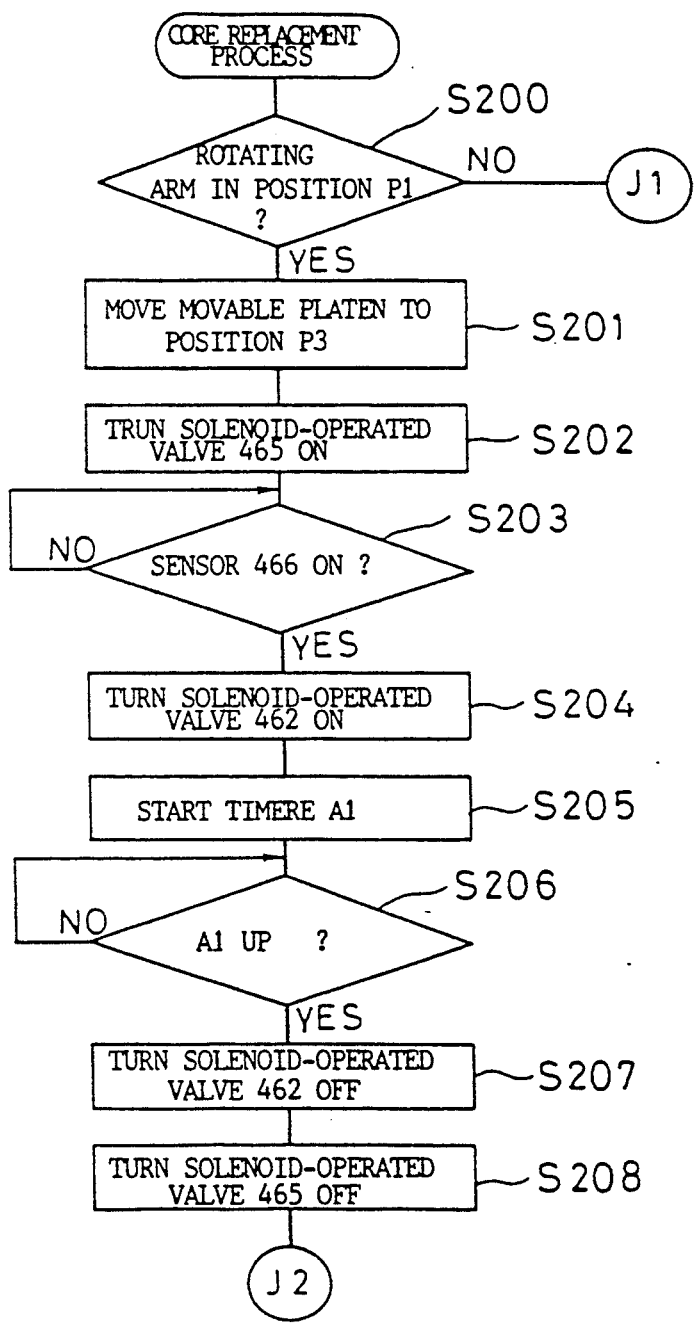
Figure 35C:
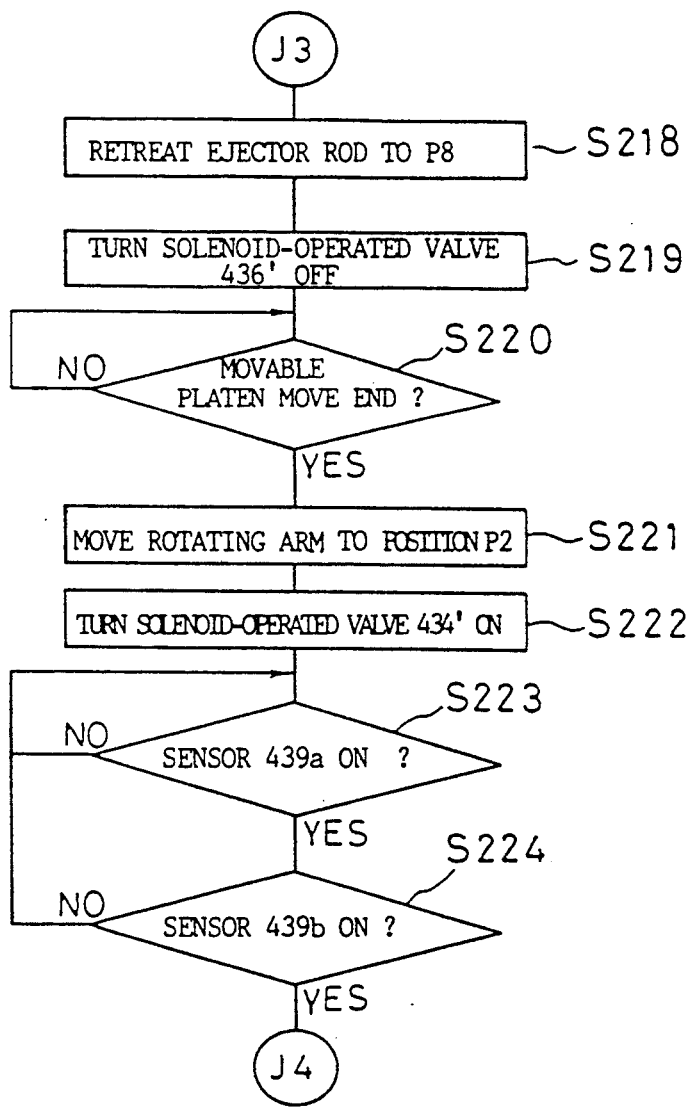

In accordance with the table Tb set in this manner, a temperature controller process shown in FIGS. 34A and 34B is repeatedly executed at cycles shorter enough than the on-off control cycles of the band heaters B1 to B3 and the storage hole heaters 437 by means of the PMCCPU 405b.

Referring to FIGS. 34A and 34B, the PMCCPU 405b sets an index i to "1" in each temperature control process cycle (Step S100), and determines whether or not each of flags F2-i and F1-i corresponding to the index i, among flags F2-1 to F2-10 and flags F1-1 to F1-10 corresponding individually to the band heaters B1 to B3 and the seven storage hole heaters 437 and each reset to "0" by initial setting, is set to "1" (Steps S101 and S102). If neither of the flags F2-i and F1-i is at "1," the CPU delivers a command for thermocouple output selection to the temperature transducer 401d via the output circuit 405k, and reads a detected temperature Tai, which corresponds to the thermocouple output applied to an i'th input terminal of the temperature transducer 401d corresponding to the index i, through the input circuit 405j (Step S103).

Then, the CPU 405b loads a register E0i with a stored value in a register E1i, which is indicative of a deviation between a target temperature Tsi of the heater (heating zone or storage hole) corresponding to the i'th input terminal of the transducer 401d and the detected temperature Tai obtained when the heater concerned is turned on in the preceding cycle (Step S104), obtains a temperature deviation on the basis of a deviation between the target heater temperature Tsi and the detected temperature Tai read in Step S, and loads the register E1i with the obtained deviation (Step S105). Then, the CPU 405b adds the temperature deviation obtained in Step S105 to a stored value in a register Esi, which is indicative of an integrated value of the temperature deviation (Step S106), and further calculates an on-time ton according to equation (1) as follows (Step S107):

$$ton = K1 \cdot E1i + K2 \cdot Esi + K3 \cdot (E1i - E0i), \tag{1}$$

where K1, K2 and K3 represent proportional, integral, and differential gains for temperature control, respectively, and E1i, Esi and E0i represent register values indicative of the present-cycle detected temperature deviation, integrated temperature deviation, and preceding-cycle detected temperature deviation, respectively.

Further, it is determined whether or not the value of the on-time ton calculated in Step S107 is greater than that of a temperature control cycle tpi for the heating zone or storage hole corresponding to the i'th input terminal, set in the work memory or table Tb (Step S108). If the calculated value ton is greater than the value of the set cycle tpi, the set cycle tpi is set as the on-time ton, whereupon the entire period of the temperature control cycle (on-off cycle) is used as the on-time (Step S109). Then, the on-time ton is subtracted from the temperature control cycle tpi to obtain an off-time toff (Step S110), and the on-time ton and the off-time toff are set in timers T1i and T2i, respectively (Steps S111 and S112).

Then, the CPU starts the timer T1i, and turns on that one of the switches SW1 to SW10 which corresponds to the index i, thereby switching on the corresponding ones of the heaters B1 to B3 and the seven storage hole heaters 437, and thereafter, sets the flag F1i to "1," and determines whether or not the preset time of the timer T1i is up (Steps S113 to S116). Initially, the preset time of the timer T1i is not up, so that the index i is incremented by "1" (Step S122), and it is then determined whether or not the updated index i is not higher than the total number "10" of the heating zones and the storage holes (Step S123). If the index i is not higher than "10," the program returns to Step S101.

In the control process cycle immediately after the start of the temperature control, the other flags F2-2 to F2-10 and F1-1 to F1-10 than those flags F2-1 and F1-1 which correspond to the band heater B1 are left reset to "0," so that the same processes as aforesaid are executed for the other band heaters B2 and B3 and each of the seven storage holes 747. As a result, the heating cylinder 401a and the seven pairs of cores 414 and 424 are individually heated. If it is concluded in Step S101 that the index i has exceeded "10," the temperature control process for the present cycle ends.

In the next process cycle, the index i is set to "1," in Step S100, and it is concluded in Step S101 that the flag F2-i (F2-1 in this case) is "0." Since the flag F1-i is set to "1," the result of decision in Step S102 is positive. Thereupon, the CPU 405b determines whether or not the preset time of the timer T1i is up (Step S116). If the preset time of the timer is not up, the index i is incremented by "1" (Step S122), and it is determined whether or not the updated index i is not higher than "10" (Step S123). Thereafter, a series of processes including Steps S101, S102, S116, S122 and S123 is repeated so that the index i exceeds "10." When the index i exceeds "10," the temperature control process for the present cycle ends.

The same processes are repeated also in each of the subsequent cycles. If it is concluded in Step S116 of a certain cycle that the preset time of the timer T1$i$ is up, the CPU delivers a command to turn off a switch SW$i$, which corresponds to the index i, to this switch through the output circuit 405$k$ (Step S117), and then resets and sets the flags F1-$i$ and F2-$i$ to "0" and "1," respectively (Step S118). Then, the CPU starts the timer T2$i$ for measuring the off-time toff set in Step S112 of the preceding cycle, thereby starting the measurement of the off-time (Step S119), and determines whether or not the preset time of this timer is up (Step S120). If the preset time of the timer T2$i$ is not up, the index i is incremented by "1" (Step S122), and it is determined whether or not the incremented index i is not higher than "10" (Step S123). If the result of decision is positive, the program returns to Step S101. In this manner, the switch whose on-time is up is turned off, and measurement of the off-time of this switch is started.

In each of the subsequent cycles, the same processes are repeated for the on-state switches. For the off-state switches, on the other hand, the program proceeds from Step S101 to Step S120, whereupon it is determined whether or not the preset time of the timer T2$i$ is up. If it is concluded in Step S120 of a certain cycle that the preset time of the timer T2$i$ is up, the corresponding flag F2-$i$ is reset to "0" (Step S121). When both the flags F2-$i$ and F1-$i$ are reset in this manner, the switches associated with these two flags are turned on again in Step S103 and its subsequent steps. After all, proportional, integral, and differential control operations for the band heaters B1 to B3 and the seven storage heaters 437 are performed so that the respective temperatures of the three heating zones and the seven pairs of cores are controlled for the set temperatures.

When the operator operates the CRT/MDI 405$p$ to set or monitor temperature conditions for injection molding, a temperature setting/monitoring picture is displayed on the CRT screen. At this time, the PMCCPU 405$b$ reads a set mold temperature and set heating zone temperature from the common RAM 405$i$, and causes them to be displayed on the CRT screen. Further, the thermocouples TC1 to TC3 and the seven thermocouples 438 are successively assigned through the output circuit 405$k$, the respective current temperatures of the heating zones and the core pairs detected by means of the individual thermocouples are successively read through the input circuit 405$j$, and are displayed on the CRT screen.

In the temperature control described above, the core temperature is controlled simultaneously with the heating cylinder temperature. Since the preliminary core temperature control in the core stocker 407 does not require such a high control accuracy for the heating cylinder temperature, however, the preliminary core temperature control may be executed separately from the heating cylinder temperature control at intervals longer than those for the heating cylinder temperature control.

Referring now to FIGS. 35A to 35D, core replacement control will be described.

When a code indicative of the core to be used and a core replacement command are manually inputted or read out from a program after various molding conditions, such as the mold temperature, heating cylinder temperature, mold clamping force, injection speed, dwell, shot, etc., are set, the PMCCPU 405$b$ executes a core replacement control process shown in FIGS. 35A to 35D.

First, the PMCCPU 405$b$ reads from the common RAM 405$i$ the rotational position of the servomotor 432, among the respective rotational positions of the servomotors for the various axes, which are read from the servo circuits 405$h$ for the individual axes through the servo interface 405$g$ and written in the common RAM by the NCCPU 405$a$. Then, based on the rotational position of the servomotor 432, the CPU 405$b$ determines whether or not the rotating arm 431 is situated in a rotational position P1 which indicates that the core pair is attached to the matrixes (Step S200). If it is concluded that the rotating arm 431 is situated in the rotational position P1 so that the first and second cores 414 and 424 are attached to the first and second matrixes 411 and 421, respectively, the PMCCPU 405$b$ delivers a move command for locating the movable platen 404 to a move position P3, which corresponds to a predetermined distance between the first and second cores 414 and 424, to the NCCPU 405$a$ through the common RAM 405$i$, in order to keep the second core 424 at the predetermined distance from the first core 414 to facilitate the cleaning of the respective cavity defining surfaces of the first and second cores (Step S201). In response to this move command, the PMCCPU 405$a$ distributes pulses to the servo circuit corresponding to a servomotor MO for mold clamping shown in FIG. 24, thereby moving the movable platen 404. If it is concluded, on the basis of a position detection signal from a position sensor attached to the servomotor MO, that the movable platen 404 has reached an in-position range which contains the command position P3, the CPU 405$a$ transmits a positioning completion signal to the PMCCPU 401$b$ through the common RAM 405$i$.

In response to the positioning completion signal, the CPU 401$b$ turns on the solenoid-operated selector valve 465 of the mold cleaner 460 through the output circuit 405$k$ (Step S202). As a result, the compressed air is supplied to the pneumatic actuator 464 of the cleaner 460 through the solenoid-operated valve 465, so that the nozzle 461 moves integrally with the piston 464$a$. When the nozzle 461 reaches the cleaning position on the axis of the cores 414 and 424, as shown in FIG. 30, the sensor 466 is turned on. When it is concluded in Step S203 that the sensor 466 is on, the CPU 405$b$ turns on the solenoid-operated on-off valve 462, and starts a timer A1 (Steps S204 and S205). As a result, the cleaning fluid is supplied to the nozzle 461 through the solenoid-operated valve 462, and is jetted from the nozzle toward the cores 414 and 424, whereby the cores are cleaned. If it is concluded in Step S206 that the preset time of the timer A1 is up so that a set cleaning time is up, the CPU 405$b$ turns off the solenoid-operated valves 462 and 465 (Steps S207 and S208). As a result, the jet of the cleaning fluid from the nozzle stops, and the nozzle 461 moves up to its retreated position.

Then, the CPU 405$b$ delivers a move command for locating the movable platen 404 in a platen move position P4 (gap $\delta$ short of a mold touch position), such that a narrow gap $\delta$ is formed between the two cores 414 and 424 (Step S209), to the CPU 405$a$. When a signal indicative of the completion of the location in the position P4 is delivered from the CPU 405$a$, the CPU 405$b$ delivers a move command for locating the ejector rod 451 in an ejector rod move position P5, such that a narrow gap is formed between the cores, to the servo circuit associated with the ejector rod drive servomotor 454 (Step S210). Further, the CPU 405b activates the electromagnetic solenoids 455 for a short period of time, and starts a timer A2 (Steps S211 and S212). As a result, an impact force, which acts so as to disengage the second core 424 from the second matrix 421, is applied to the second core by the plungers 455a which are driven by means of the solenoids 455.

The CPU 405b determines whether or not the preset time of timer A2 is up, and also determines whether or not a positioning completion signal indicative of the arrival of the ejector rod at the command position P5 is delivered from the NCCPU 405a (Steps S213 and S214). If it is concluded that the preset time of the timer A2 is up before the delivery of the positioning completion signal so that the core 424 is not disengaged from the matrix 421 yet, the CPU 405b activates the solenoids 455 again to apply an impact force again to the core 424 (Step S211). If it is concluded, on the other hand, that the positioning completion signal is delivered so that the core 424 is disengaged from the matrix 421, the CPU 405b delivers a torque limit value through the output circuit 405k to the servo circuit associated with the ejector rod, and also delivers a move command for locating the ejector rod 451 to an ejector rod move position P6, such that the core 424 is entirely disengaged from the matrix 421, to the CPU 405a (S215). As a result, the core 424 is ejected from the matrix 421 by means of the ejector rod 451 in a manner such that the output torque of the ejector rod drive servomotor 454 is restricted to a level not higher than a torque corresponding to the torque limit value. The moment the move command for the position P6 is delivery, the CPU 405b delivers a move command for locating the movable platen 404 to a core replacement position P7, at a moving speed a little lower than the core ejecting speed, to the CPU 405a (Step S216). As a result, the movable platen 404 retreats so that the mold is opened. Since the second core 424 moves at a speed higher than the movable platen moving speed, and that the output torque of the ejector rod drive servomotor 454 is limited, moreover, the second core 424 is kept intimately in contact with the first core 414.

If it is concluded in Step S217 that a positioning completion signal indicative of the completion of the location of the ejector rod 451 in the position P6 is delivered, the CPU 405b delivers a move command for retreating the ejector rod 451 to its original retreated position P8 (Step S218). Even though the force from the ejector rod 451 to press the second core 424 is removed as the ejector rod retreats, the first core 414 and the second core 424, whose engaging holes receive the engaging pins of the first core 414 in a fit manner, are intimately in contact with each other, and both cores are held by means of the first matrix 411. Further, the solenoid-operated selector valve 436' is turned off by the CPU 405b (Step S219), whereby the compressed air supply through the solenoid-operated valve 436' to the actuator 436 is cut off, so that the first core 414 is released from the engagement with the first matrix 411 locked by means of the stopper 435.

If it is concluded in Step S220 that a signal indicative of the completion of the location of the movable platen 404 in the core replacement position P7 is delivered, the CPU 405b delivers a move command for locating the rotating arm 431 in a rotational position P2 (FIG. 26) which faces a desired storage hole 474 of the core stocker 407 (Step S221). As a result, the rotating arm 431 is rotated by means of the servomotor 432 which is controlled by the CPU 405a. After the cores are removed, on the other hand, the core stocker 407 is prevented from rotating before the removed cores are stored therein again. Thus, when the rotating arm 431 is located in the position P2, the core holding ring 431a of the rotating arm is aligned with the storage hole 474 from which is removed the core currently held by means of the ring. Thereupon, when a signal indicative of the completion of the location of the rotating arm 431 in the position P2 is delivered, the CPU 405b turns on the solenoid-operated selector valve 434' (Step S222). As a result, the compressed air is supplied to the return actuator 434 through the valve 434', thereby causing the piston 43a of the actuator to advance, and the paired cores 414 and 424 held in the core holding ring 431a are moved toward the storage hole 474. In the meantime, the CPU 405b determines whether or not the photoelectric sensor 439a is on, and then determines whether or not the magnetic sensor 439b is on (Steps S223 and S224). If both these sensors are on, then it indicates that no cores are in the gap between the core holding ring 431a and the core stocker 407, and that the cores are in the storage hole 474, that is, the cores are entirely stored in the storage hole.

Thereupon, if it is concluded that both the sensors are on, the CPU 405b turns off the solenoid-operated valve 434' (Step S225). As a result, the compressed air supply to the return actuator 434 is cut off, so that the piston 434a of the actuator is returned by means of the urging force of the return spring 434b. Then, the CPU 405b reads, from the table Tb of FIG. 33, a target rotational position Qj of the core stocker drive servomotor 472 corresponding to a core code which indicates a pair of cores 414-j and 424-j (j=1 to 7) to be used next, and delivers a move command for locating the servomotor 472 in the position Qj (Step S226). As a result, the core stocker 407 is rotated by means of the servomotor 472, which is controlled by the NCCPU 405a, so that the storage hole 474 stored with the core to be used next is located in the core delivery position.

When a signal indicative of the completion of the location of the servomotor 472 in the position Qj is delivered from the NCCPU 405a, the PMCCPU 405b turns on the solenoid-operated selector valve 433' (Step S227). As a result, the compressed air is supplied to the extrusion actuator 433 to cause the piston 433a of the actuator to advance, so that the paired cores 414 and 424 held in the storage hole 474 are moved toward the core holding ring 431a. In the meantime, the CPU 405b determines whether or not the photoelectric sensor 439a is on, and determines whether or not the magnetic sensor 439b is off after the photoelectric sensor is turned on (Steps S228 and S229). While the cores are moving, the photoelectric sensor 439a is off at the beginning, while the magnetic sensor 439b is on as long as any part of the cores remains in the storage hole 474. Thereupon, the magnetic sensor is turned off after the photoelectric sensor is turned on. If it is concluded that the paired cores 414 and 424 are entirely held by means of the core holding ring 431a, therefore, the CPU 405b turns of the solenoid-operated valve 433' (Step S230). As a result, the compressed air supply to the extrusion actuator 433 is cut off, so that the piston 433a of the actuator is returned by means of the urging force of the return spring 433b.

Then, the CPU 405b delivers a move command for locating the rotating arm 431 in the core mounting position P1 (Step S231). As a result, the rotating arm 431 is rotated by means of the servomotor 432 which is controlled by the CPU 405b. When a signal indicative of the completion of the location of the rotating arm in the position P1 is delivered from the CPU 405a, the solenoid-operated selector valve 436' is turned on by the CPU 405b (Step S232). Thereupon, the compressed air is supplied to the actuator 436 through the solenoid-operated valve 436', so that the first core, and therefore, the paired cores, are locked to the first matrix 411 by means of the stopper 435. Further, the CPU 405b delivers a move command for locating the movable platen 404 in a set mold clamping force generating position (Step S233). As a result, the movable platen 404 moves as the servomotor MO for mold clamping, controlled by the NCCPU 405a, rotates. When the movable platen 404 reaches the mold clamping force generating position, the second core 424 is fitted in the core mounting recess 421b of the second matrix 421, so that the first and second cores are fixed to the first and second matrixes, respectively. When a signal indicative of the completion of the location of the movable platen in the mold clamping force generating position is then delivered, the CPU 405b delivers a move command for locating the movable platen in a mold opening position P9 (Step S234), whereupon the core replacement process ends.

If the core replacement command is inputted without any cores attached to the matrixes, it is concluded in Step S200 of the core replacement process that the rotating arm 431 is not in the rotational position P1, which corresponds to the core attachment state, so that the cores need not be removed from the matrixes. In this case, the processes of Step S226 and its subsequent steps are executed in order to deliver the cores to be mounted next from the core stocker. If a core removal command, not the core replacement command, is inputted, moreover, only the processes of Steps S200 to S225, which are associated with the removal of the cores, are executed.

The fourth embodiment described above may be variously modified.

Figure 36:
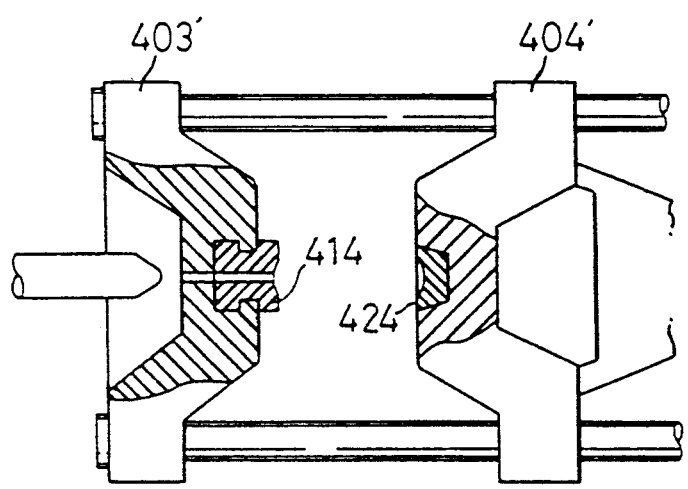
FIG. 36 is a partial plan view, partially in section, showing a mold configuration according to a first modification of the fourth embodiment.

In the fourth embodiment, for example, the matrixes 411 and 421 are removably attached to the stationary and movable platens 403 and 404. As shown in FIG. 36, however, both platens may be modified so as to function as matrixes, as shown in FIG. 36. In other words, according to this first modification, the first and second cores 414 and 424 are removably attached to stationary and movable platens 403' and 404', respectively, which are formed integrally with first and second matrixes. The first modification is suited for the manufacture of small-sized molded pieces, such as lenses, which requires only the cores to be replaced and hardly requires matrix replacement.

Figure 37:
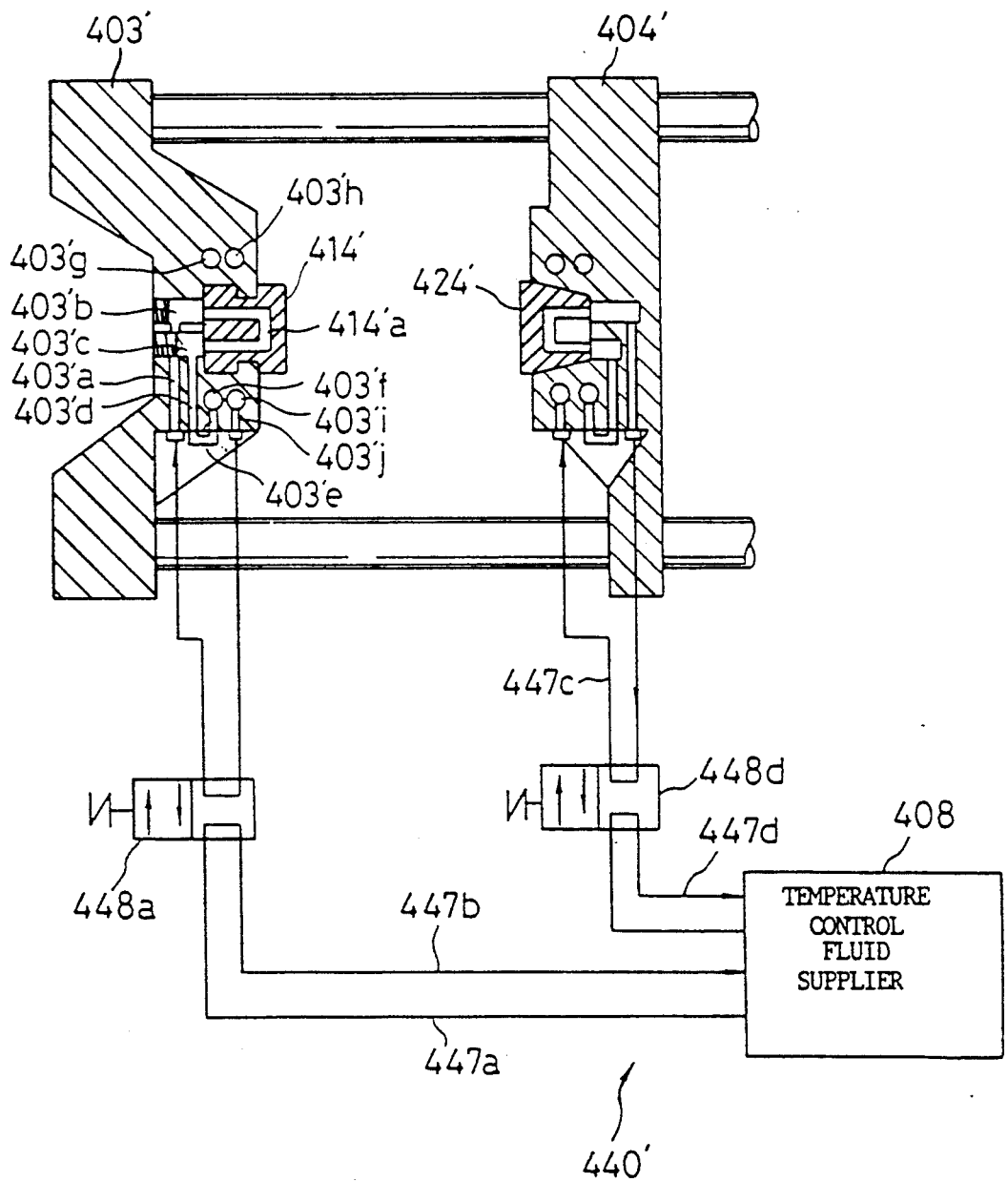
FIG. 37 is a sectional front view, partially in block, showing a mold temperature control section according to a second modification of the fourth embodiment.

FIG. 37 shows a mold temperature control section 440' according to a second modification which is mounted in an injection molding machine of the first modification. The stationary platen 403' is formed with temperature control fluid passages 403'a to 403'j. The passage 403'a communicates with the temperature controller 408 by means of the inlet port and the tube 447a, the passage 403'j communicates with the temperature controller by means of the outlet port and the tube 407b, and the solenoid-operated valve 448a is arranged in the middle of the tubes 447a and 447b. The passage 403'd is connected to the passage 403'e by means of a tube, and each two adjacent ones of the passages 403'f to 403'i are connected by means of a tube (not shown). When the first core 414' is attached to the stationary platen 403', moreover, the respective inner open ends of the passages 403'b and 403'c communicate individually with the opposite ends of a temperature control fluid passage 414'a, which is formed in the core 414', so that the temperature control fluid from the temperature controller 408 circulates along a path which is composed of the tube 447a, inlet port, passages 403'a, 403'b, 414'a, and 403'c to 403'j, outlet port, and tube 447b. Likewise, the movable platen 404' is formed with temperature control fluid passages corresponding individually to the passages 403'a to 403'j, a second core 424' is formed with a temperature control fluid passage corresponding to the passage 414'a, and the temperature control fluid circulates along these passages. Thus, the core temperature is directly adjusted to facilitate speedy temperature control of the cores.

In order to make the attachment of the cores to the platens smooth, O-rings having a small thickness and smooth surface are arranged at the junctions between the platen-side passages and the core-side passages. Prior to the replacement of the cores, moreover, the operations of the solenoid-operated selector valves 448a and 448b are controlled so as to prevent the temperature control fluid supply to the two platens. In the second modification, furthermore, each core may be formed having a polygonal cross section in order to accurately align the platen-side passages and the core-side passage. In this case, the storage holes of the core stocker and the hole of the core holding ring are formed having the same cross sectional shape of the cores.

Figure 38:
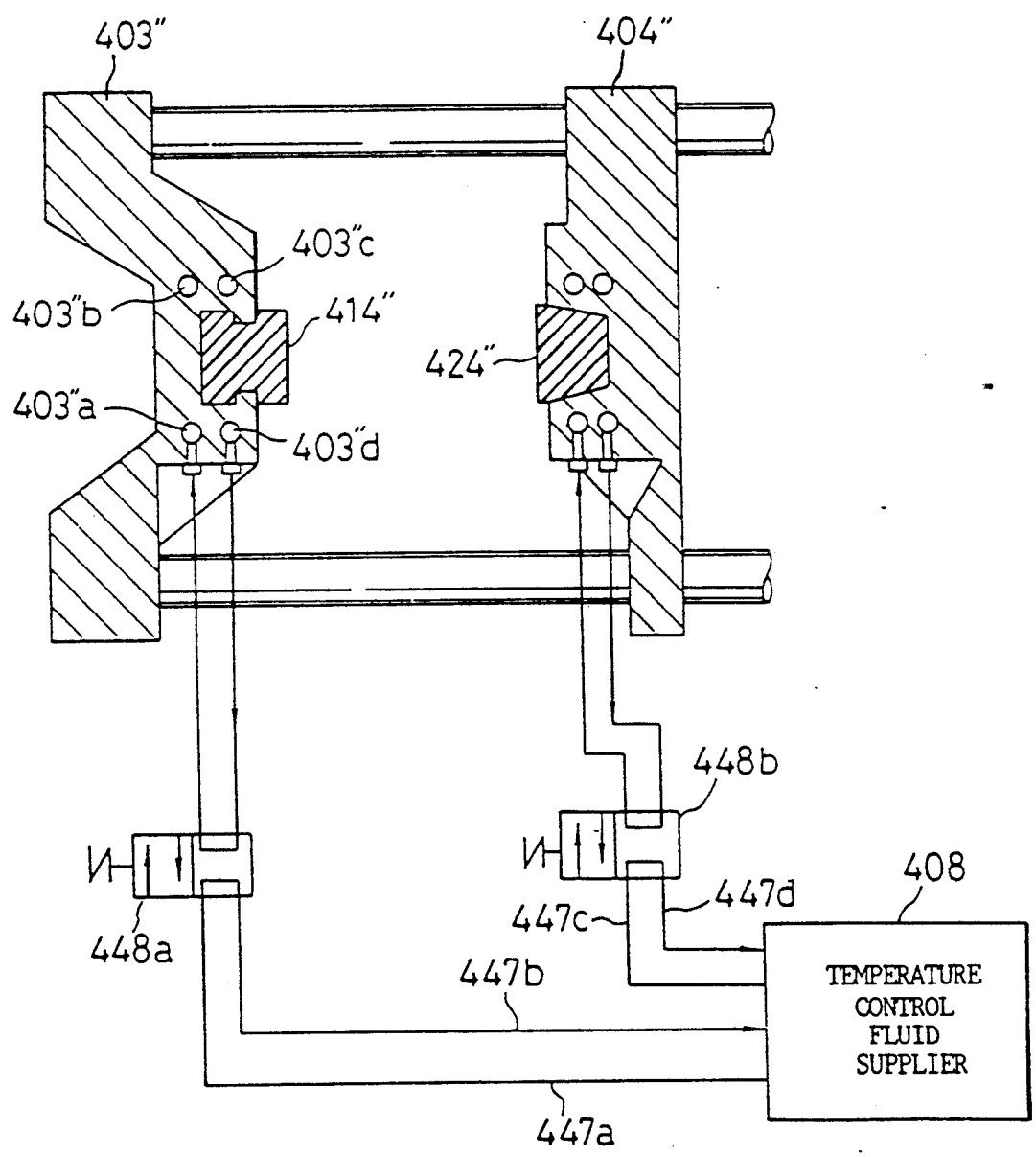
FIG. 38 is a view similar to FIG. 37, showing a mold temperature control section according to a third modification of the fourth embodiment.

FIG. 38 shows a third modification of the fourth embodiment. This modification is a version obtained by removing the core temperature control fluid passages from the second modification. More specifically, temperature control passages 403"a to 403"d, which correspond to the passages 403'f to 403'j of FIG. 37, are formed in a stationary platen 403". The passages 403"a and 403"d are connected to the inlet and outlet ports, respectively, and each two adjacent ones of the passages 403"a to 403"d are connected by means of a tube (not shown). The movable platen 404" is formed with temperature control fluid passages corresponding individually to the passages 403"a to 403"d.

Figure 39:
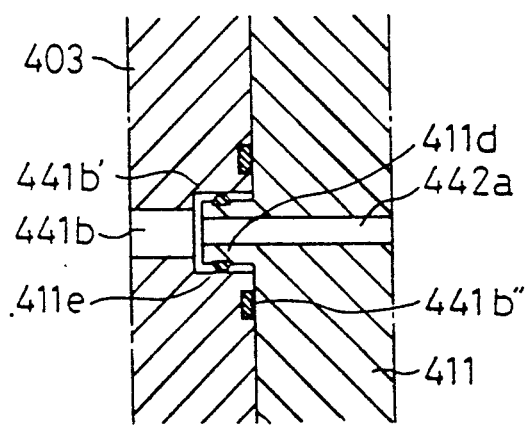
FIG. 39 is a partial enlarged sectional view showing a junction between temperature control fluid passages according to a fourth modification of the fourth embodiment.
Figure 40:
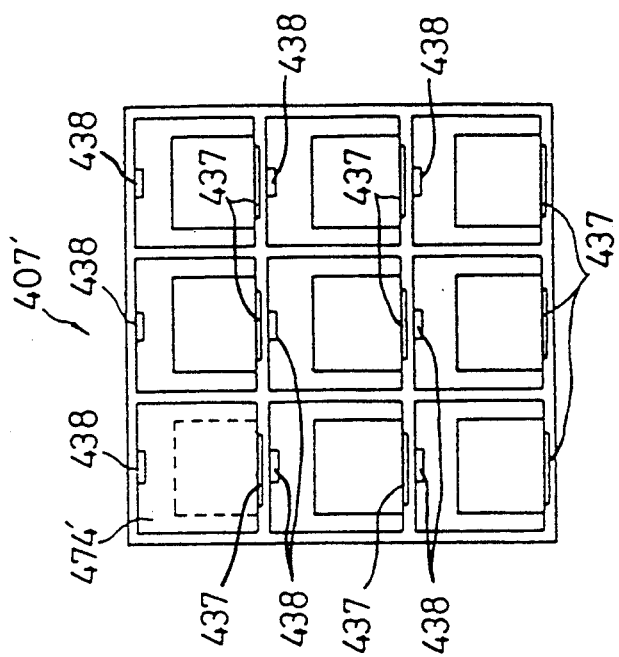
FIG. 40 is a schematic front view showing a core stocker according to a fifth modification of the fourth embodiment.
Figure 41:
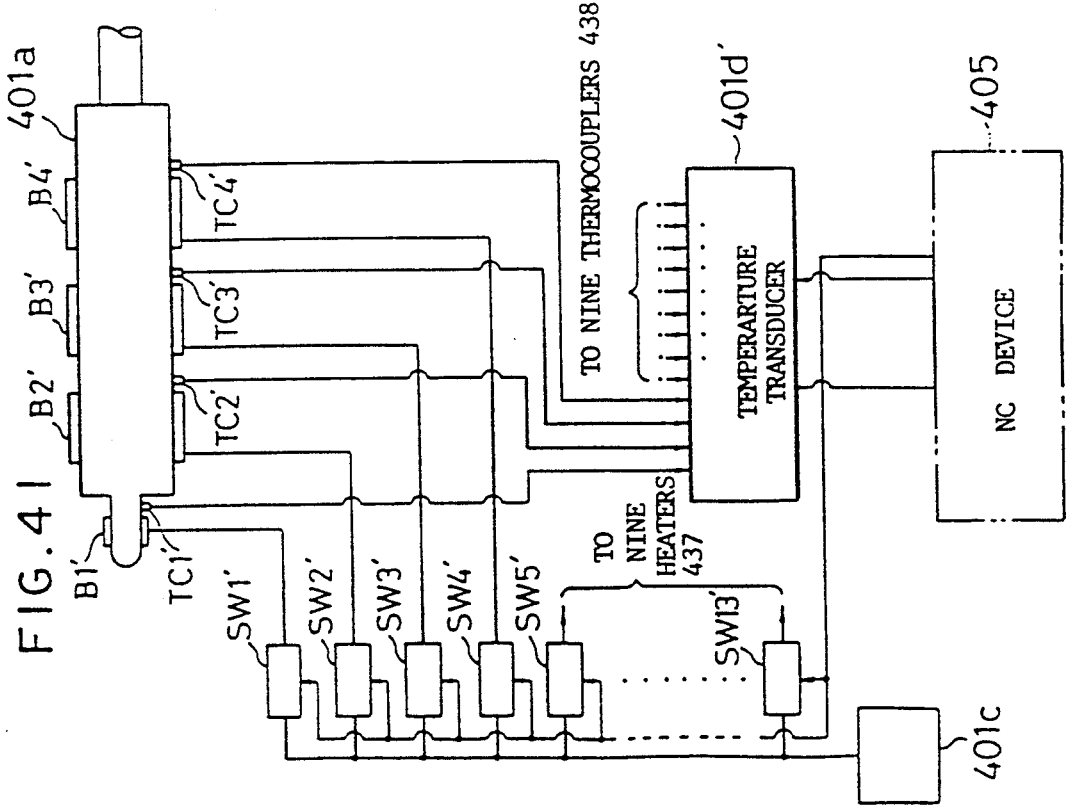
FIG. 41 is a schematic view showing a heating cylinder/core temperature control section according to the same modification.

FIG. 39 shows a modification associated with the mold temperature control section of the fourth embodiment. This fourth modification is characterized in that each of temperature control fluid passage defining portions of the respective platen-side end faces of first and second matrixes is formed with a projection which is fitted in a large-diameter portion of a corresponding one of temperature control fluid passages formed in the platens, and that an O-ring is disposed on the outer peripheral surface of each projection. For example, a projection 411d is formed on the stationary-platen-side end face of the first matrix 411, and a temperature control fluid passage 442a of the matrix 411 extends penetrating the projection 411d. The projection 411d is adapted to be removably fitted in a large-diameter portion 441b' of the temperature control fluid passage 41b. Also, an O-ring 411e is disposed on the outer peripheral surface of the projection 411d.

FIGS. 40 to 43 show another modification associated with the mold temperature control section of the fourth embodiment. A core stocker (mold stocker in general)

407' according to this fifth modification includes nine storage chambers 474' with a rectangular profile for individually storing core pairs 414-1, 424-1, . . . , and 414-9, 424-9 (each core pair is illustrated in the form of a rectangle for convenience' sake), and the heater 437 and the thermocouple (temperature sensor in general) 438 are arranged in each storage chamber. The storage chambers are divided from one another by means of adiabatic members (not shown) so that heat transfer between the storage chambers is prevented.

Figures 42, 43:
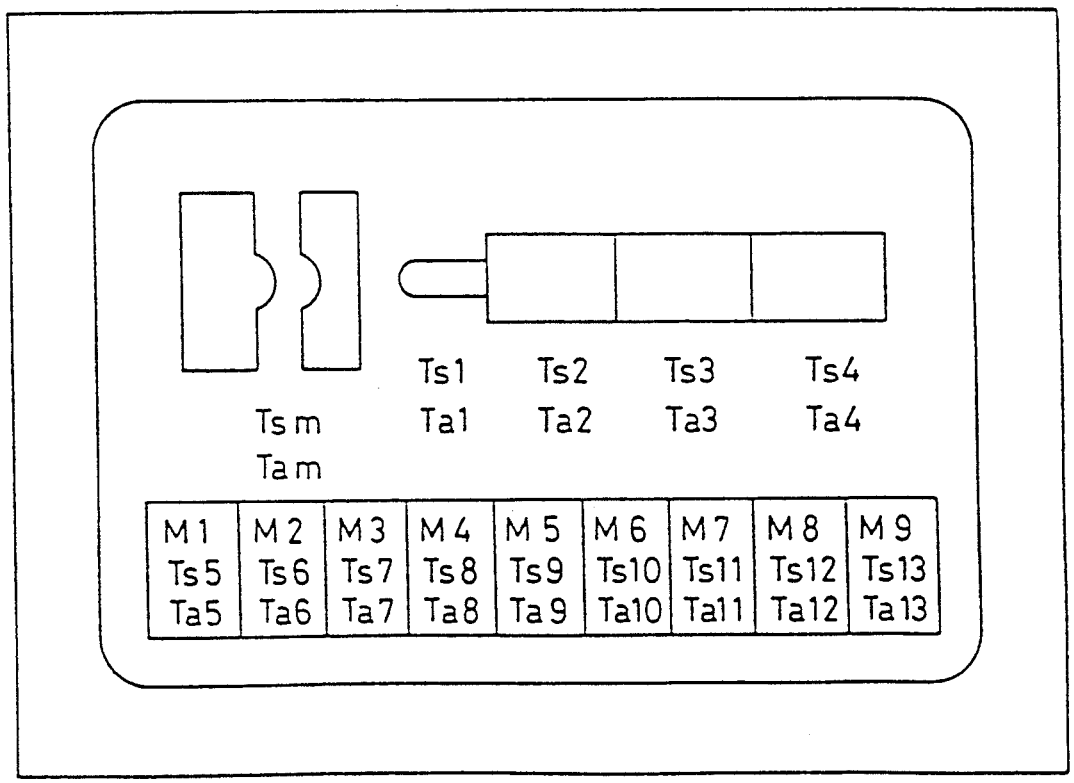
FIG. 42 is a diagram showing a lookup table for core temperature control used in the same modification.
FIG. 43 is a diagram showing a temperature setting-/monitoring screen according to the same modification.

The nine heaters 437 are connected individually to the power source 401c through switches SW5' to SW13', and band heaters B1' to B4', which are provided individually in four heating zones of the heating cylinder 401a, are connected to this power source through switches SW1' to SW4'. Further, the nine thermocouples 438 are connected individually to fifth to thirteenth input terminals of a temperature transducer 401d', and thermocouples TC1' to TC4' for detecting the respective temperatures of the heating zones are connected individually to first to fourth input terminals of the transducer. Further, the switches SW1' to SW13' and the temperature transducer 401d' are severally connected to the NC device 405 shown in FIG. 32. The common RAM of the NC device is loaded with a table Tb' for preliminary core temperature control shown in FIG. 42. In FIG. 42, symbol M1 represents a core name indicative of the paired cores 414-1 and 424-1, and symbols M2 to M9 individually represent their corresponding core names in like manner.

A temperature control process for each of the four heating zones and the nine pairs of cores is executed by means of the NC device 405, following the same step of procedure as the ones shown in FIG. 34. FIG. 43 shows a temperature setting/monitoring picture which is displayed on the CRT screen when the CRT/MDI of the NC deice 405 is manually operated in order to set or monitor the temperature conditions for the injection molding. Graphic forms representing the mold and the heating cylinder are displayed in the picture, and also, the core names M1 to M9 and set preliminary temperatures Ts5 to Ts13 and detected temperatures Ta5 to Ta13 for the individual storage chambers are severally displayed.

Although the cores are subjected to temperature control in the fifth modification of the fourth embodiment, a mold of a type without cores may be also subjected to temperature control. In the fifth modification, moreover, the preliminary control temperatures of the cores are set in the table Tb' as in the fourth embodiment. Alternatively, however, the same temperatures as the target core (mold) temperatures for the execution of molding cycles may be set. In this case, the arrangement may be such that the temperature is automatically set in response to the entry of the core name (mold name or mold code). If the order of use of the individual core pairs or molds is determined in advance, moreover, the temperature control may be executed for only one of the storage chambers, instead of effecting the preliminary temperature control for all the storage chambers. In this case, the core pair or mold to be used next is stored in the storage chamber which is subjected to the preliminary temperature control. For the other storage chambers, bimetals, which are adapted to be turned on or off in accordance with the storage chamber temperature, may be arranged between the power source and heaters, which are disposed individually in the storage chambers, so that the heaters can be turned on or off, in order to effect simple temperature control. Moreover, only that storage chamber which is subjected to the preliminary temperature control may be surrounded by means of an adiabatic member.

The fourth embodiment may be further modified. In the fourth embodiment, for example, the matrix is formed with the core mounting recess 411b in the form of an arcuate groove. Alternatively, however, a core mounting recess (not shown) in the form of a straight groove may be formed on the matrix or platen. In this case, a core changer having an arm (not shown) capable of straight movement is used for the attachment to or detachment from the core mounting recess and the transportation of the cores between the mold and the core stocker. In the fourth embodiment, moreover, the core stocker body is rotated in order to locate the desired cores in the core delivery position. In an injection molding machine which is provided with the core stocker shown in FIG. 40 and the core changer having the arm capable of straight movement, however, the desired cores can be located in the core delivery position by moving the arm of the core changer or the stocker body in the horizontal direction or in the height direction. In this case, the delivery of the cores is performed on the front face side of the stocker body, as in the case of the fourth embodiment, or on the lateral or top face side of the stocker body.

The following is a description of a fifth embodiment of the present invention.

The fifth embodiment differs from the fourth embodiment mainly in the arrangement of the core changing section. More specifically, in the fourth embodiment, the rotating arm of the core changer, which is only rotatable, is rotated to attach to or detach the cores from the matrix, utilizing the core mounting recess thereof in the form of an arcuate groove, and to transfer the cores between the mold and the core stocker, and the cores are delivered between the rotating arm and the core stocker by means of the return actuator. In the fifth embodiment, on the other hand, cores are attached to or detached from matrixes by moving a rotating arm, which is rotatable and movable in the axial and radial directions of a mold and can hold the cores, in the axial direction of the mold while holding the cores by means of the rotating arm, the cores are transferred between the mold and a stocker by advancing or retreating the rotating arm in the radial direction of the mold and also rotating it, and the cores are delivered between the rotating arm and the core stocker by moving the rotating arm in the axial direction of the mold.

Figure 44:
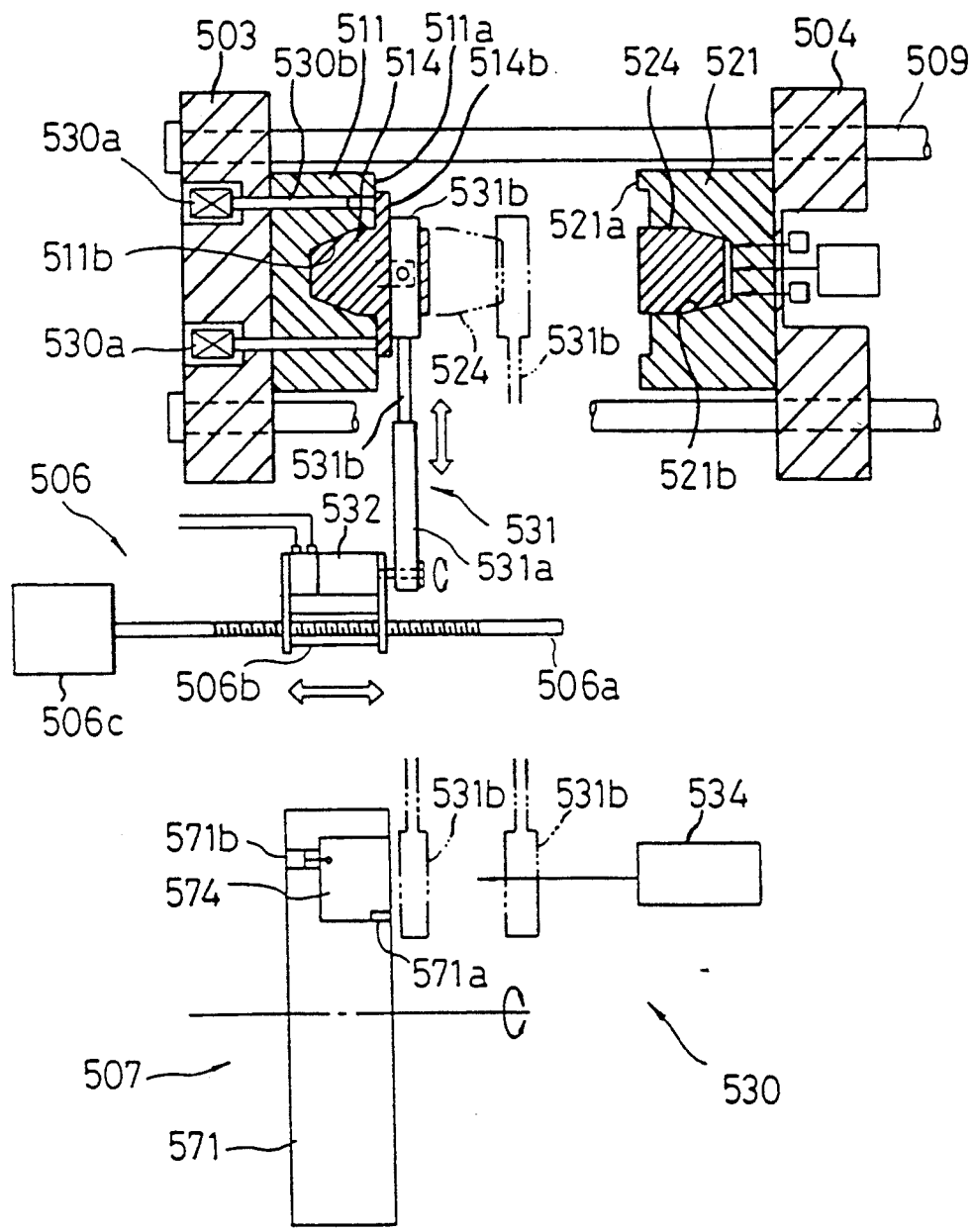
FIG. 44 is a schematic plan view, partially in section, showing a mold clamping section and a core replacing section according to a fifth embodiment of the present invention.
Figure 45:
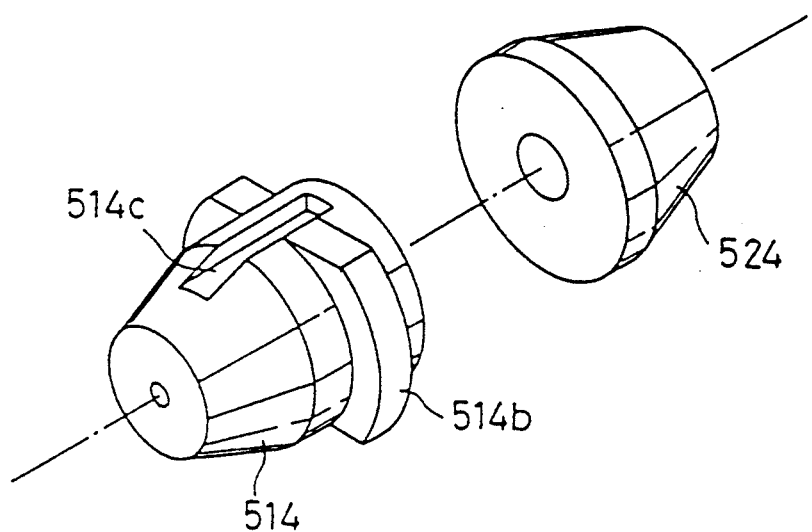
FIG. 45 is a perspective view showing a pair of cores attached to the mold clamping of FIG. 44.

The mold used in the fifth embodiment differs from the one used in the fourth embodiment in that it has no core mounting recess in the form of an arcuate groove. More specifically, core mounting recesses 511b and 521b, which correspond to the recess 421b of the fourth embodiment, are formed in parting faces 511a and 521a of first and second matrixes 511 and 521, respectively, and first and second cores 514 and 524 fitted individually in the two recesses are each in the form of a truncated cone, as shown in FIGS. 44 and 45. A flange portion 514b, which is provided on the parting-surface side of the core 514, is fitted in a large-diameter portion of the recess 521b so that the two matrixes can be joined together on their respective parting faces. Formed on the outer peripheral surface of the upper portion of the core 514, moreover, is an engaging groove 514c for core replacement which is open on the side opposite to the parting face.

Figure 46:
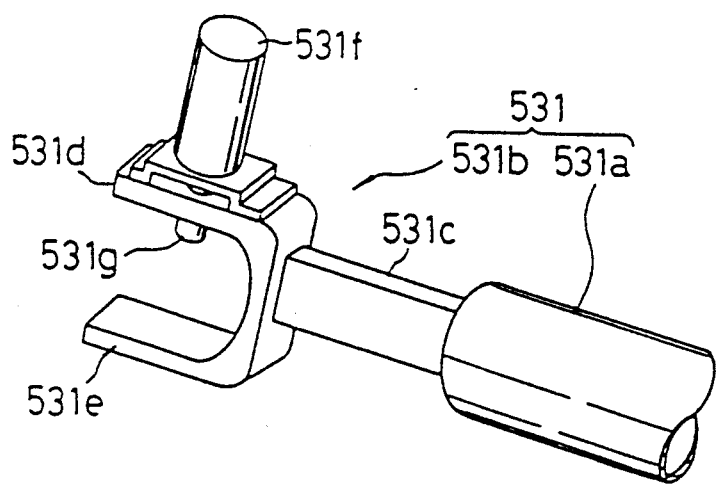
FIG. 46 is a partial perspective view showing a rotating arm of the core changer of FIG. 44.

Referring to FIGS. 44 and 46, a core changer 506 of a core changing section 530 according to the fifth embodiment comprises a ball screw 506a extending parallel to tie bars 509, a ball nut 506b threadedly engaged with the ball screw, a servomotor 506c for rotating the ball screw, and a rotating arm 531, and a servomotor 532 is fixed to the ball nut 506b. The rotating arm 531 includes a pneumatic actuator 531a, which is rocked by means of the servomotor 532, and core holding means 531b. The core holding means 531b, which is fixed to the distal end of the piston 531c which can advance and retreat with respect to the cylinder of the actuator 531a and is nonrotatable, includes first and second fingers 531d and 531e, and the first core 514 is adapted to be inserted between the two fingers. A solenoid 531f is fixed to the first finger 531d, and a plunger 531g, which is advanced and retreated by means of the solenoid, extends through the first finger toward the second finger, and can be removably fitted in the engaging groove 514c of the first core.

The core changing section 530 further includes solenoids 530a, severally arranged in the first matrix 511, and plungers 530b which are driven individually by means of the solenoids, the plungers serving to apply an impact force to the inner end face of the flange portion 514b of the core 514. Also, the core changing section comprises a core stocker 507 and a return actuator 534. Storage holes (storage chambers) 574 of a core stocker body 571 is each in the form of a bottomed cylinder as deep as the core mounting recess 511b formed in the core 511. A positioning ridge 571a, which is adapted to be fitted in the engaging groove 514c of the core 514, is formed in a storage hole defining surface of the stocker body 571. A sensor 571b for detecting the core storage state is located at that part of the storage hole defining surface which corresponds to the bottom of each storage hole.

The following is a description of a core replacement process according to the fifth embodiment.

Basically, the core replacement process, like the one according to the fourth embodiment, is executed following the steps of procedure shown in FIG. 35, under the control of a PMCCPU of an NC device (not shown) which corresponds to the NC device 405. More specifically, the PMCCPU first determines whether or not the cores 514 and 524 are attached to the matrixes 511 and 521, respectively. This decision is made with reference to a flag which is set to "1" when the cores are attached to the matrixes, as mentioned later. If it is concluded that the flag is set to "1," and therefore, the cores are attached to the matrixes, the CPU executes the process of Steps S201 to S218 of FIG. 35. As a result, the cores are cleaned, and the second core 534 is disengaged from the second matrix 514. The second core 524 is held by means of the first core 514. Since no extrusion actuator is provided in the fifth embodiment, it is then determined whether or not the location of a movable platen in the core replacement position is completed (Step S220), without executing the process of Step S219 associated with the extrusion actuator.

When the CPU activates the actuator 531a after the completion of the positioning, the piston 531c advances, so that the plunger 531g of the core holding means 531b at the distal end of the piston faces the engaging groove 514c of the first core 514. When the solenoid 531f is then energized under the control of the CPU, the plunger enters the engaging groove, so that the core 514 is held by means of the core holding means. Then, under the control of the CPU, the servomotor 506c is rotated with its output torque limited. As the servomotor rotates in this manner, the ball screw 506a rotates, the rotating arm 513 moves integrally with the ball nut 506b and the motor 532 in the axial direction of the mold, and the core 514, held by means of the core holding means 531b of the rotating arm, is disengaged from the matrix 511. In disengaging the core from the matrix, moreover, an impact force is applied to the core 514 by means of the plungers 530b, which is driven by means of the solenoids 530a, in the same manner as in Steps S211 to S214 of FIG. 35.

When the core 514 is entirely disengaged from the matrix 511, the piston 531c retreats under the control of the CPU, and the servomotor 532 is driven to rotate the rotating arm 531 to the side of the core stocker 507. Then, the piston 531c is driven to advance, so that the paired cores 514 and 524, held by means of the core holding means 531b, face their corresponding storage hole 574 of the core stocker. Subsequently, the servomotor 506c is driven reversely, so that the rotating arm 513 moves in the axial direction of the mold toward the core stocker, and the core 514, held by means of the rotating arm, is fitted into the storage hole. At this time, the engaging groove 514c of the core 514 engages the ridge 571a of the stocker body, thereby preventing the core from rotating in the storage hole. When the core 514 is inserted to a predetermined depth in the storage hole, the solenoid 531f is de-energized, so that the core 514 is disengaged from the core holding means 531b. After the piston 531c is then retreated, the motor 532 is rotated to move the rotating arm 531 to its retreated position. Under the control of the CPU, the return actuator 534 is activated to move the paired cores 514 and 524 further toward the bottom of the storage hole. When the inner end face of the first core 514 reaches the bottom of the storage hole so that the sensor 571b is turned on, the return actuator returns, so that the flag is reset to the value "0" which is indicative of the completion of the removal of the cores from the matrixes. The paired cores are stored in the storage hole 574 in a manner such that the flange portion 514b of the first core 514 and the second core 524 in engagement with the first core are located outside the storage hole.

In attaching the cores to the matrixes, on the other hand, the stocker body 571 is located in a rotational position such that the storage hole 574 stored with the paired cores (selected cores) to be attached to the matrixes is situated in the core delivery position, and the rotating arm 531 is rotated toward the core stocker. Then, after the piston 531c is driven to advance so that the core holding means 531b is fitted on the flange portion 514b of the first core, which is situated outside the storage hole 574, the plunger 531g of the core holding means is caused to engage the engaging groove 514c of the first core. Further, the rotating arm 531 is moved away from the core stocker body 571, and the selected cores are drawn out from the storage hole 574.

Subsequently, the rotating arm is rotated toward the mold, and the first and second cores 514 and 524 are positioned so that the two cores are arranged in alignment with the core mounting recesses 511b and 521b of the first and second matrixes, respectively. Then, after the rotating arm 531 is moved toward the first matrix to cause the core 514 to penetrate to a predetermined depth of the recess 511b, a movable platen 504 is advanced toward a stationary platen 503 to cause the second core 524 to penetrate to a predetermined depth of the recess 521*b* of the second matrix. Thus, the respective outer end portions of the first and second cores are supported by means of the first and second matrixes, respectively. Then, after the plunger 531*g* of the core holding means is retreated to disengage the rotating arm 531 and the core 514 from each other, the rotating arm is moved to the retreated position by being retreated and rotated. Further, the movable platen is moved to the set clamping force generating position, and the cores 514 and 524 are fitted and fixed in the matrix recesses 511*b* and 521*b*, respectively. Then, the flag is set to the value "1" which is indicative of the completion of the attachment of the cores to the matrixes, whereupon the core mounting process ends.

The fifth embodiment may be variously modified.

Figure 47:
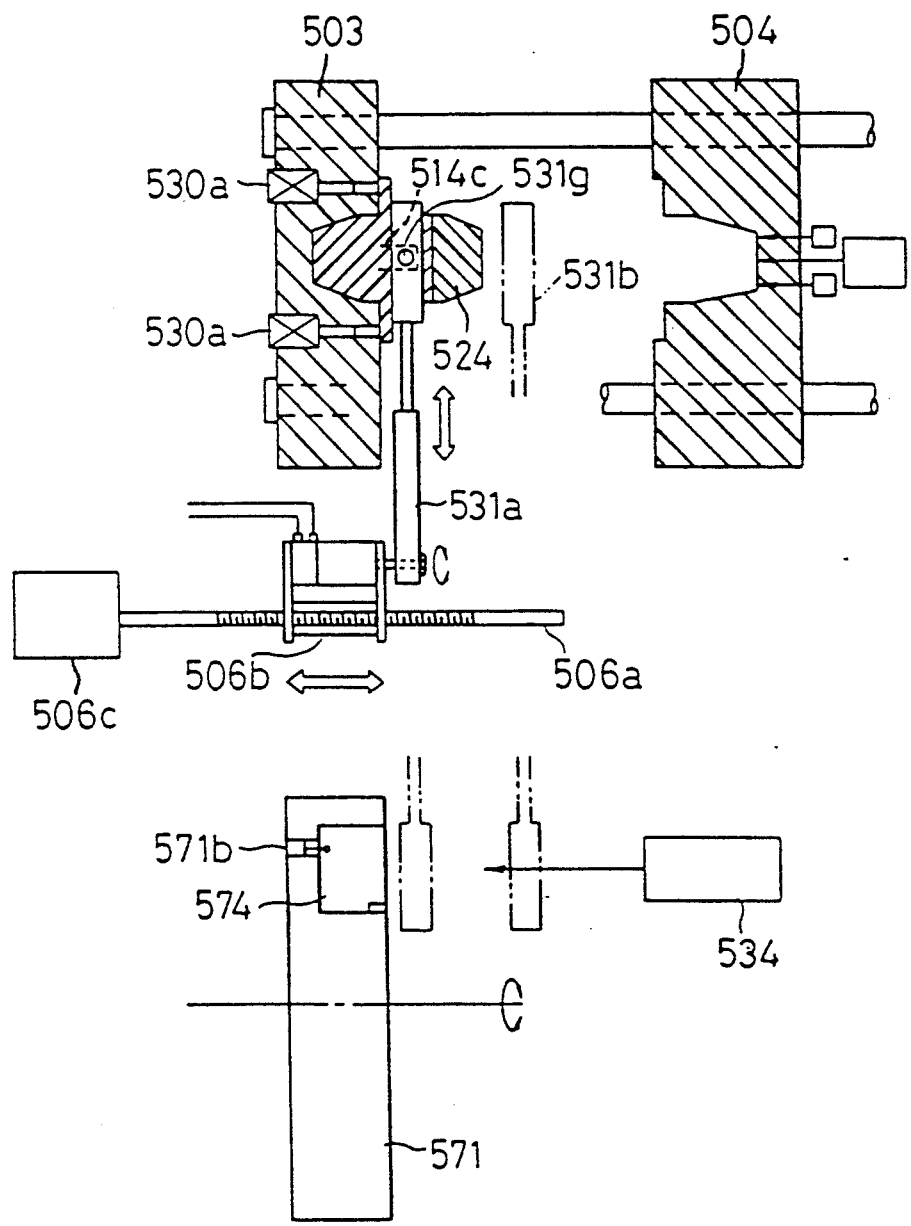
FIG. 47 is a view similar to FIG. 44, showing a core replacing section according to a first modification of the fifth embodiment.

In connection with the fifth embodiment, for example, a case has been described such that the core changing section is mounted in an injection molding machine which uses the mold (FIGS. 44 and 45) composed of the cores and the matrixes. However, the fifth embodiment may be also applied to an injection molding machine which uses a mold composed substantially of cores only. FIG. 47 shows a core changing section according to a first modification of the fifth embodiment, which is mounted in the injection molding machine of this type.

Figure 48:
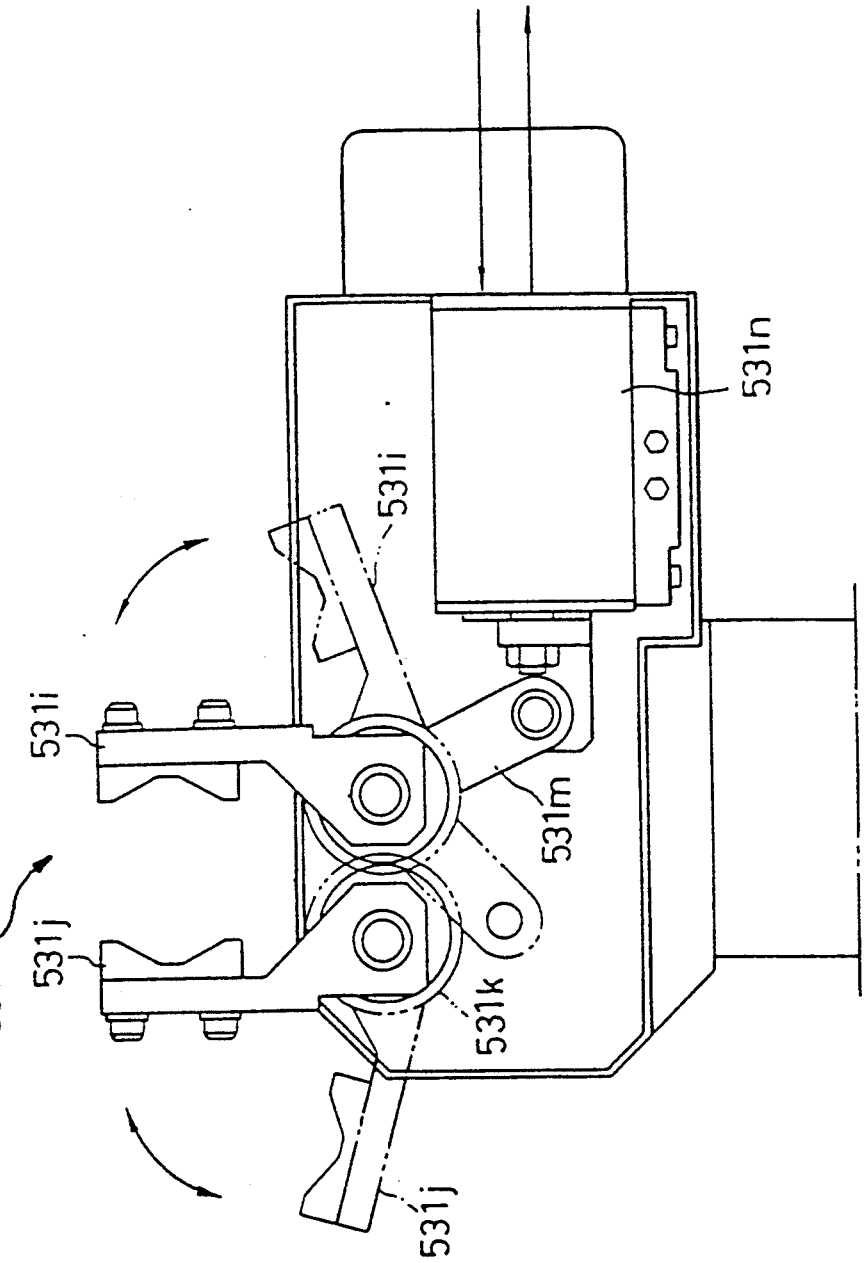
FIG. 48 is a partial plan view showing core holding means according to a second modification of the fifth embodiment.

Instead of using the core holding means 531*b* (FIG. 46) according to the fifth embodiment, moreover, core holding means 531*h* according to a second modification shown in FIG. 48 may be used. The core holding means 531*h* comprises first and second core grasping members 531*i* and 531*j*, which are connected to each other by means of a pair of gears 531*k* and are independently rotatable, a lever 531*m* fixed to the first core grasping member, and an actuator 531*n* (corresponding to the solenoid 531*f* of FIG. 46) for swinging the lever. When the actuator 531*m* is turned on, the lever 531*m* rotates in the counterclockwise direction to a rotational position indicated by full line, so that the core grasping members 531*i* and 531*j* rotate in the counterclockwise and clockwise directions, respectively, thereby grasping the cores (not shown). When the actuator is turned off, on the other hand, the two core grasping members open, as indicated by dashed lines, thereby releasing the cores.

Figure 49:
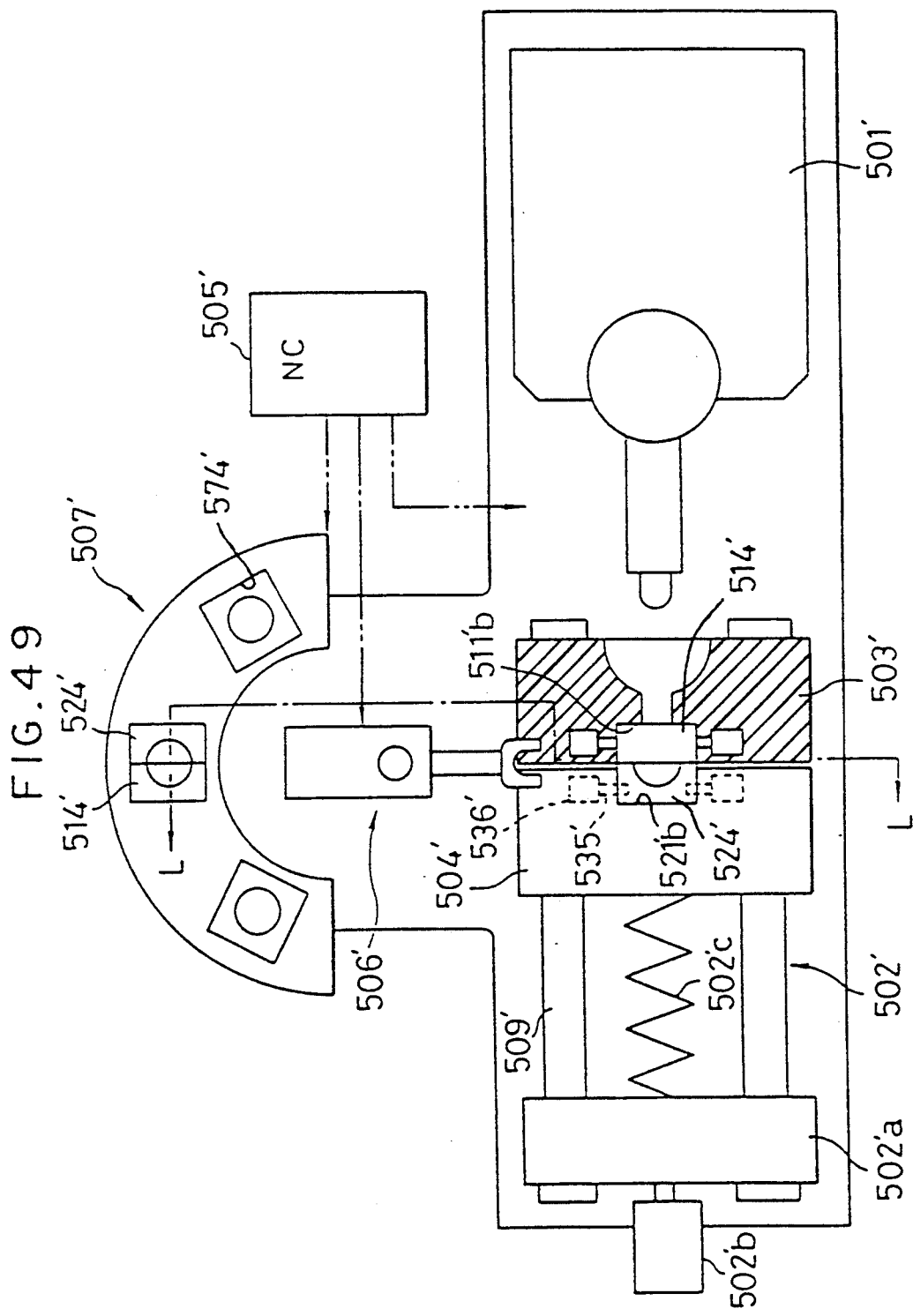
FIG. 49 is a schematic plan view, partially in section, showing an injection molding machine according to a third modification of the fifth embodiment.
Figure 50:
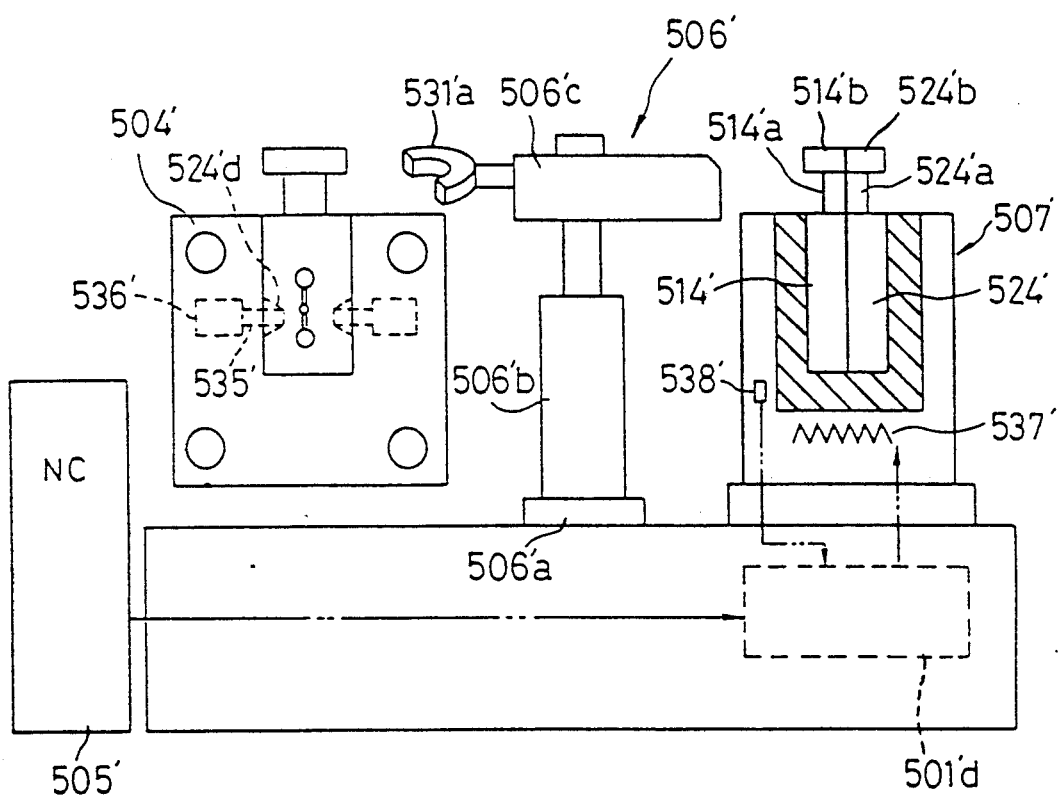
FIG. 50 is a fragmentary view taken in the direction of the arrow along line L—L of FIG. 49.

FIGS. 49 and 50 show an injection molding machine according to a third modification of the fifth embodiment. This modification is characterized mainly in that a pair of cores are moved in the height direction of a mold when the paired cores are attached to or detached from the mold.

In this injection molding machine, a movable platen 504' of a mold clamping section 502', which is arranged facing an injection section 501', is fixed to a ball nut (not shown) threadedly engaged with a ball screw 502'*c* which is rotated by means of a servomotor 502'*b* for mold clamping fixed to a rear platen 502'*a*. The movable platen 504' reciprocates between the rear platen 502'*a* and a stationary platen 503' along tie bars 509' as a motor 502'*b*, which operates under the control of an NC device 505', rotates forwardly and reversely.

First and second matrixes (not shown), which are formed integrally with the platens 503' and 504', respectively, are formed, respectively, with core mounting recesses 511'*b* and 521'*b* which, each having a rectangular horizontal section, open on the top and inner end faces thereof. First and second cores 514' and 524', which are adapted to be removably fitted in the two recesses, individually, are formed having a rectangular horizontal section each, and are joined integrally with each other when the cores are attached to or detached from the platens and when they are transported between the mold clamping section 502' and a core stocker 507'. To attain this, engaging holes (not shown) are formed in one of the cores, and the other core has engaging pins (not shown) adapted to be removably fitted in the engaging holes, for example. Also, a neck portion 514'*a* having a semicircular horizontal section and a flange portion 514'*b* having a semicircular horizontal section are formed on the top face of the first core 514', and the second core has a neck portion 524'*a* and a flange portion 524'*b* arranged in like manner. Arranged in the movable platen 504', moreover, are two core clamping devices which are each composed of a solenoid 536' and a plunger 535' driven by means of the solenoid. The plungers 535' are fitted in their corresponding engaging holes 524'*d* which are formed individually on the opposite side faces of the second core 524', which is attached to the core mounting recess 521'*b*, thereby holding the cores. Similar clamping devices are also arranged in the stationary platen 503'.

A core stocker 507' with an arcuate plane shape is located beside the mold clamping section 502', and each of a plurality of storage holes 574' of the core stocker 507' is provided with a heater 537' and a thermocouple 538', which are connected to the NC device 505' through a switch and a temperature transducer, which are collectively indicated by a block 501'*d*. A core changer 506', which is interposed between the mold clamping section 502' and the core stocker 507', is formed of a cylindrical-coordinate robot which operates under the control of the NC device 505', and comprises a base 506'*a*, a first actuator 506'*b* turnable with respect to the base, and a second actuator 506'*c* fixed to the distal end of a first actuator piston which is movable in the height direction with respect to the body of the first actuator. A U-shaped hand (core holding member) 531'*a* is attached to the distal end of a second actuator piston which can advance and retreat with respect to the body of the second actuator.

The following is a description of a core replacing operation according to the third modification.

When a core replacement command is manually entered in the NC device 505' or read out from a program, core replacement is executed under the control of the NC device. More specifically, the movable platen 504' is first located in a mold touch position such that the respective parting faces of the first and second cores 514' and 524' abut against each other, whereby the two cores are joined together. Then, the four solenoids 536' of the core clamping devices are activated so that the four plungers 535' are disengaged individually from the engaging holes (two on the second core side are denoted by 524'*d*) of the two cores, and the cores are unfastened from the platens 503' and 504'. Subsequently, the movable platen 504' retreats from the mold touch position, so that the core pair is loosely housed in the core mounting recesses 511'*b* and 521'*b*, and the two cores are prevented from being separated from each other when the core pair is disengaged from the two recesses.

In this state, the second actuator 506'*c* of the core changer 506' is driven so that the second actuator piston advances, and the hand 531'*a* is fitted on the neck portions 514'*a* and 524'*a* of the core pair. Then, the first actuator 506'*b* is driven so that the second actuator 506'*c* and the hand 531'*a* move up integrally with the first actuator piston, whereby the paired cores 514' and 524', engaged with the hand on the respective bottom faces of the flange portions 514'b and 524'b, are drawn out upward from the core mounting recesses 511'b and 521'b, respectively. Further, the core changer 506' turns around the axis of the base to position the core pair right over the desired storage hole 574' of the core stocker 507'. Furthermore, the first actuator 506'b is driven so that the second actuator, hand, and core pair move down integrally with the first actuator piston, whereby the core pair is fitted into the storage hole. Thus, the paired cores are stored in a joined manner in the core stocker. When no cores are attached to the matrixes, the above-described operations for the core removal and the storage of the cores in the core stocker are omitted.

After the cores are stored, the second actuator piston of the core changer 506' retreats, and the core changer then turns around its axis so that the hand 531'a is directed to the storage hole 574' stored with the paired cores 514' and 524' to be mounted next. Then, the second actuator piston advances, and the hand 531'a is fitted on the neck portions 514'a and 524'a of the core pair. Then, the second actuator 506'c and the hand 531'a move up integrally with the first actuator piston, whereby the paired cores 514' and 524' are drawn out from the storage hole 574'. Further, the core changer 506' turns around its axis to position the core pair right over the core mounting recesses 511'b and 521'b, while the movable platen 504' is located in a move position just short of the mold touch position. Then, the second actuator, hand, and core pair move down integrally with the first actuator piston, whereby the core pair is fitted into the core mounting recesses through the top opening faces thereof. Also, the first actuator piston retreats to its original position. Then, after the movable platen 504' is located in the mold touch position, the plungers 535' of the core clamping devices are fitted individually into the engaging holes of the cores. As a result, the two cores are fixed individually to the platens 503' and 504', whereupon the core replacement ends.

The fifth embodiment may be further modified. In the fifth embodiment, for example, the core changer having the rotating arm which can move straight in the axial and radial directions of the mold is located between the mold and the core stocker so that the rotating arm is rotated between the mold and the core stocker. Alternatively, however, the core changer having the rotating arm which can move straight in the axial and radial directions of the mold may be located on the opposite side of the core stocker to the mold so that the attachment and detachment of the cores to and from the matrixes and the transportation of the cores between the mold and the core stocker are achieved by moving the arm in a straight line.

The following is a description of a sixth embodiment of the present invention. This embodiment is designed mainly for automatic core replacement in a vertical injection molding machine.

Figure 51:
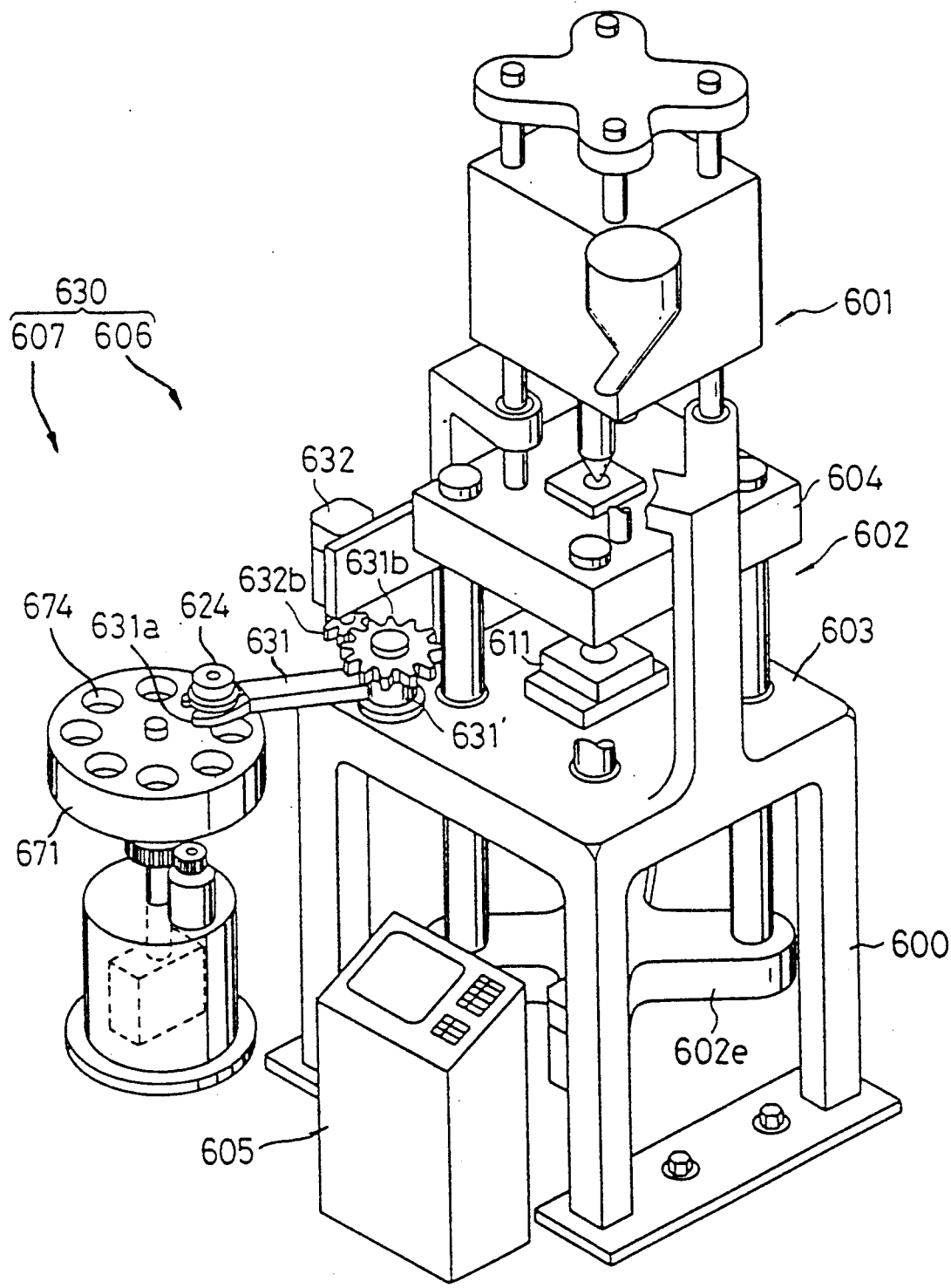
FIG. 51 is a perspective view showing a vertical injection molding machine according to a sixth embodiment of the present invention.
Figure 52:
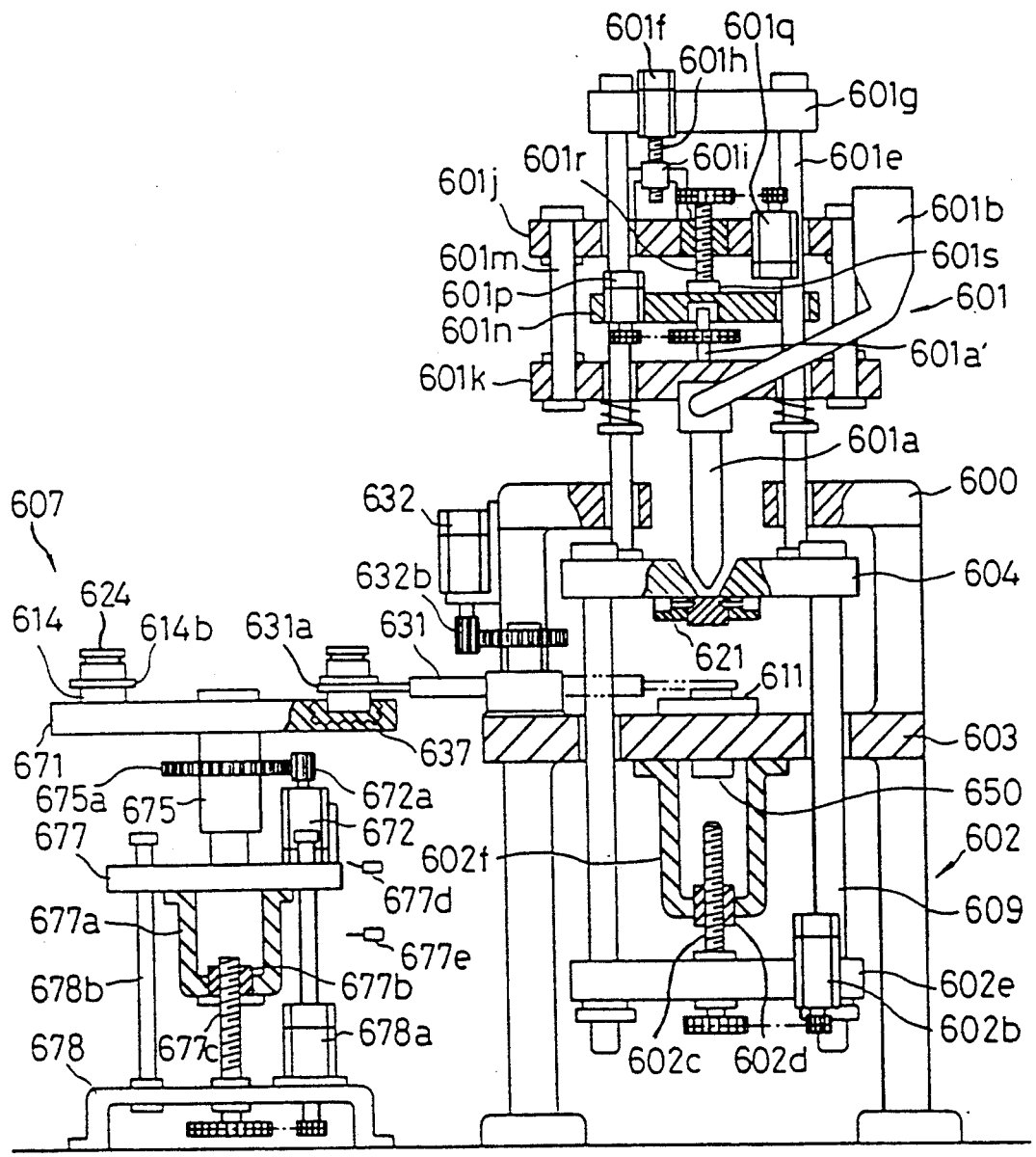
FIG. 52 is a front view, partially in section, showing the injection molding machine of FIG. 51.

Referring to FIGS. 51 and 52, the vertical injection molding machine comprises an injection section 601, a mold clamping section 602, and a core changing section 630, which individually operate under the control of an NC device 605. The NC device 605 is constructed in the same manner as the NC device 405 shown in FIG. 20, and its detailed illustration and description are omitted herein.

The mold clamping section 602 comprises a movable platen (first platen) 604, a stationary platen (second platen) 603 fixed to a machine frame 600 of the molding machine, and a third platen 602e connected to the movable platen 604 by means of four tie bars 609 which extend penetrating the stationary platen 603. The stationary and movable platens are removably fitted, respectively, with first and second matrixes 611 and 621 which are common to first and second cores 614 and 624 of a plurality of types corresponding to various molded piece shapes. A servomotor 602b for mold clamping is fixed to the third platen 602e, a ball nut 602d is fixed to the stationary platen 603 by means of a frame 602f, and a ball screw 602c, which is threadedly engaged with the ball nut 602d, is operatively connected to the motor 602b by means of a transmission mechanism. When the ball screw 602c moves along the ball nut 602d as the servomotor 602b rotates, the movable platen 604 moves integrally with the ball screw 602c and the third platen 602e, in the height direction of the molding machine, thereby approaching or receding from the stationary platen 603 to close or open a mold.

The injection section 601 is fixed to the movable platen 604 of the mold clamping section 602 by means of four guide rods 601e, which extend parallel to the tie bars 609 of the mold clamping section 602, penetrating the top wall of the machine frame 600, and is movable integrally with the mold clamping section 602 in the height direction of the molding machine. A base plate 601g, which is fixedly fitted with a servomotor 601f for nozzle touch, is fixed to the respective upper ends of the guide rods 601e, and upper and lower plates (first and third plates) 601i and 601k, which are connected to each other by means of four tie bars 601m, are supported on the base plate 601g by means of a ball screw 601h, which is connected to the output shaft of the motor 601f, and a ball screw 601i threadedly engaged with the ball screw. Also, a heating cylinder 601a, which has an injection screw 601a' built-in, is fixed to the lower plate 601k, and a hopper 601b for supplying a molding material is fixed to the upper plate 601i. When the ball screw 601h rotates as the servomotor 601f rotates, the heating cylinder 601a moves integrally with the upper and lower plates 601j and 601k, along the guide rods 601e which extend penetrating the upper and lower plates and a pusher plate (second plate) 601n disposed between the two plates, so that a nozzle at the distal end of the heating cylinder approaches or recedes from the movable platen 604 of the mold clamping section 602.

A ball nut 601s is fixed to the pusher plate 601n, and a ball screw 601r, which is threadedly engaged with this ball nut, is connected through a transmission mechanism to a servomotor 601q for injection, which is fixed to the upper plate 601j. As the servomotor 601q rotates, the injection screw 601a' is driven integrally with the ball nut 601s and the pusher plate 601n, in the injection direction along the ball screw 601r. Further, the injection screw 601a' is connected through a transmission mechanism to a servomotor 601p for metering, which is fixed to the pusher plate 601n, and is driven to rotate by means of this motor.

A core stocker 607 of the core changing section 630 comprises a rotating table 671, and a plurality of storage holes 674 for individually storing a plurality of sets of first and second cores 614 and 624 are formed in the upper surface of the rotating table, arranged at regular intervals in the circumferential direction. When a core pair is stored in one of the storage holes 674, the lower half of the first core 614 is fitted in the storage hole 674, while a flange portion 614b, which is provided on the parting-surface side of the first core 614 and utilized for core replacement, and the second core 624, which is joined integrally with the first core 614, are located outside the storage hole 674. Moreover, a heater 637 for core temperature control and a thermocouple (not shown) are arranged in each of the storage holes.

The rotating table 671 is supported on a base 678 by means of a lift plate 677 rotatably supporting a support shaft 675 of the rotating table, a ball nut 677b attached to a frame 677a, which is fixed to the lift plate, and a ball screw 677c threadedly engaged with the nut. When the ball screw 677c, which is connected through a transmission mechanism to a lift motor 678a fixed to the base 678, rotates as the motor rotates, the rotating table 671 moves in the height direction, along with the lift plate 677 which is movable integrally with the ball nut 677b along guide rods 678b. Numerals 677d and 677e individually denote limit switches for detecting the upper and lower limit move positions of the lift plate 677, respectively. Further, the rotating table 671 is operatively connected to a motor 672 for core selection, such as a stepping motor, which is fixed to the lift plate 677, by means of a gear 675 mounted on the table support shaft 675 and a gear 672a in mesh with the gear 675a, whereby the storage hole 674 stored with the desired core pair can be located in the core delivery position.

Figure 53:
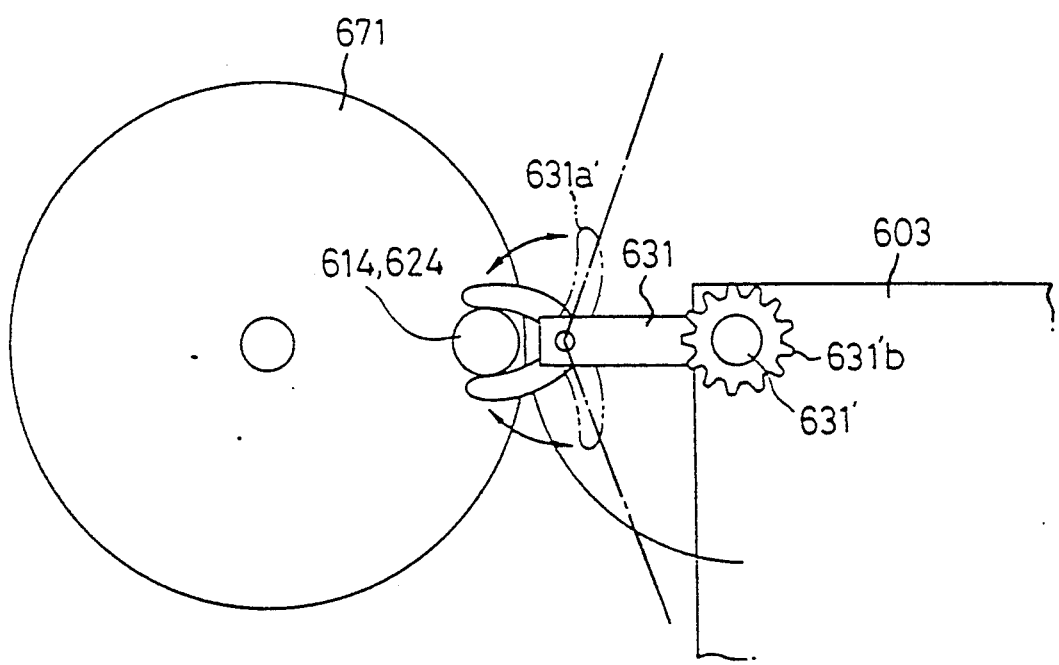
FIG. 53 is a schematic plan view showing a hand of a core changer shown in FIG. 51 and its peripheral elements.

A core changer 606, which is disposed between the core stocker 607 and the mold clamping section 602, comprises a rotating arm 631, having a hand 631a attached to the distal end thereof, and a rotating shaft 631' fixed to the proximal end of the rotating arm and rotatably supported by means of the stationary platen 603. The rotating arm 631' is connected to the output shaft of a servomotor 632 for rotating arm drive by means of a gear 631'b, fixed to the upper end of the arm, and a gear 632b in mesh with the gear 631'b. When the motor 632 rotates, the rotating arm horizontally turns around the rotating shaft 631', between the core delivery position opposed to the core stocker 607 and the core attachment/detachment position opposed to the matrixes. As shown in FIGS. 51 and 53, the hand 631a has two swingable grasping members 631a' which is driven by means of a solenoid, and can releasably grasp that portion of the first core 614 which is situated below the flange portion 614b. When the hand is opened, the angle between the two grasping members can be 180° or more.

The core changing section 630 further comprises core locking means (FIGS. 54 and 55) for maintaining the core attachment state in the matrixes. Arranged in the first matrix 611, more specifically, are two clamping devices which are each composed of a solenoid 636 and a plunger 635 driven by means of the solenoid. The plungers 635 are fitted in their corresponding engaging holes 624d which are formed individually in the opposite side faces of the core 624, which is attached to a core mounting recess 611b, thereby holding the cores. Arranged in the second matrix 621 are similar core clamping devices which, each composed of a solenoid 636' and a plunger 635', constitute the core locking means in conjunction with the core clamping devices on the first matrix side.

Figure 55:
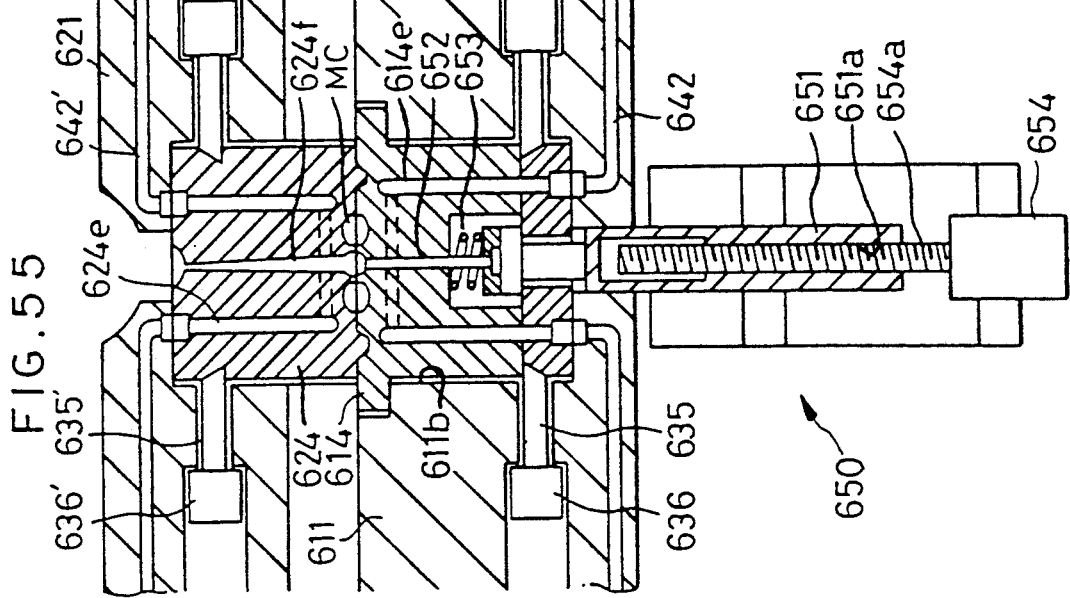
FIG. 55 is a partial enlarged sectional view showing a matrix pair and a core pair attached thereto.
Figure 54:
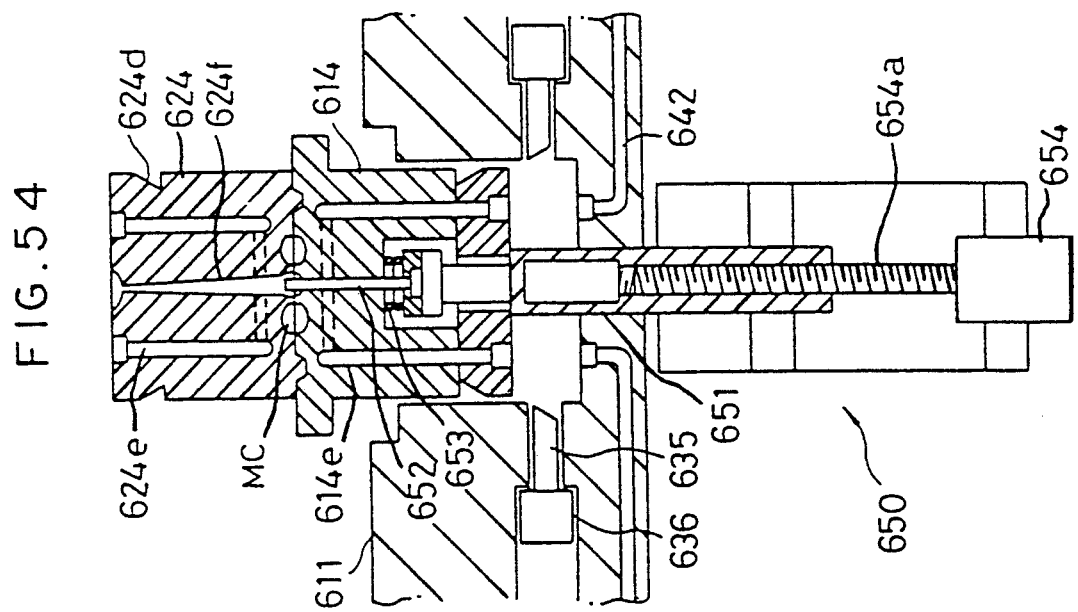
FIG. 54 is a partial enlarged sectional view illustrating an operation for detaching a core pair from a stationary-side matrix.
Figure 56A:
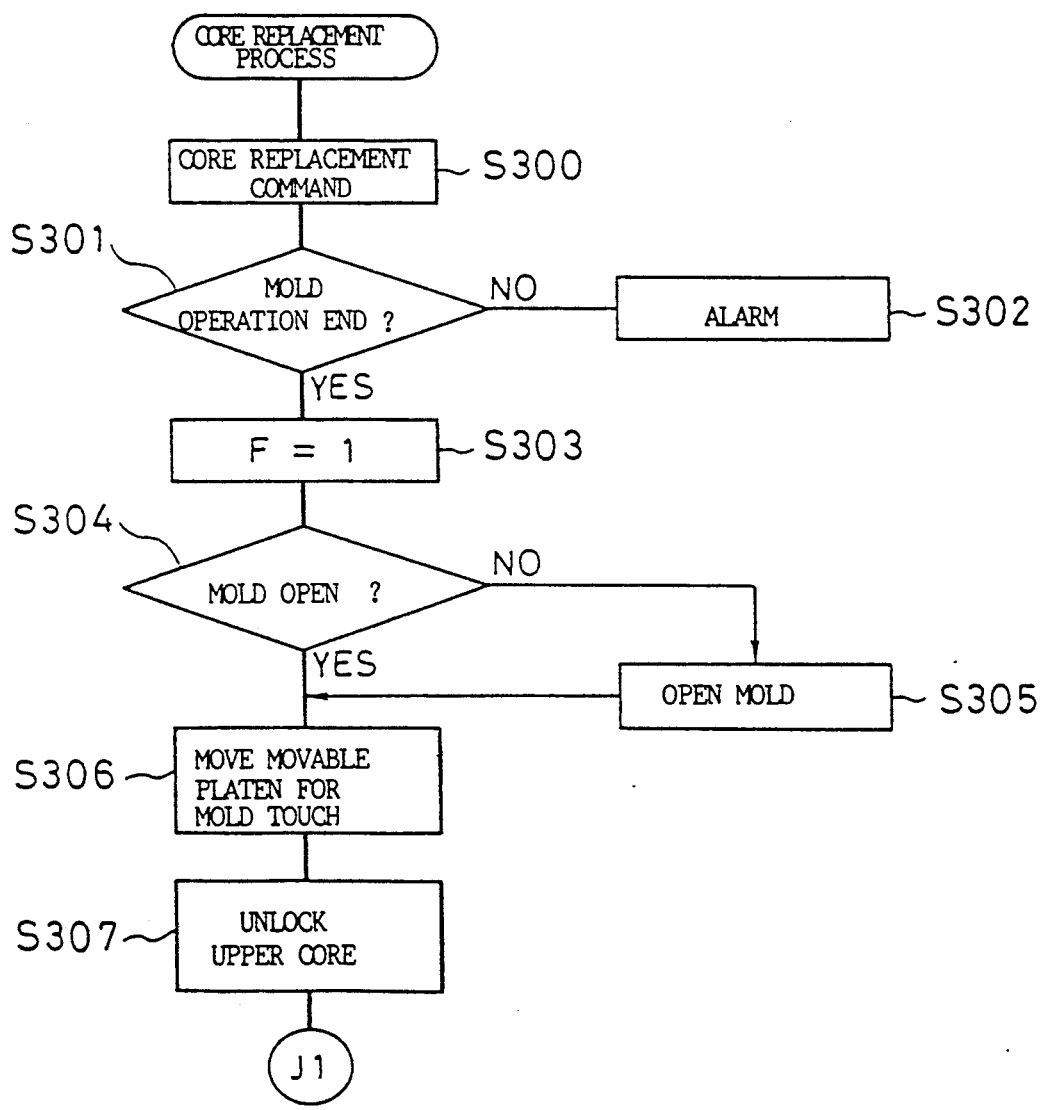
FIGS. 56A to 56D are flow charts showing a core replacing operation of the vertical injection molding machine.
Figure 56B:
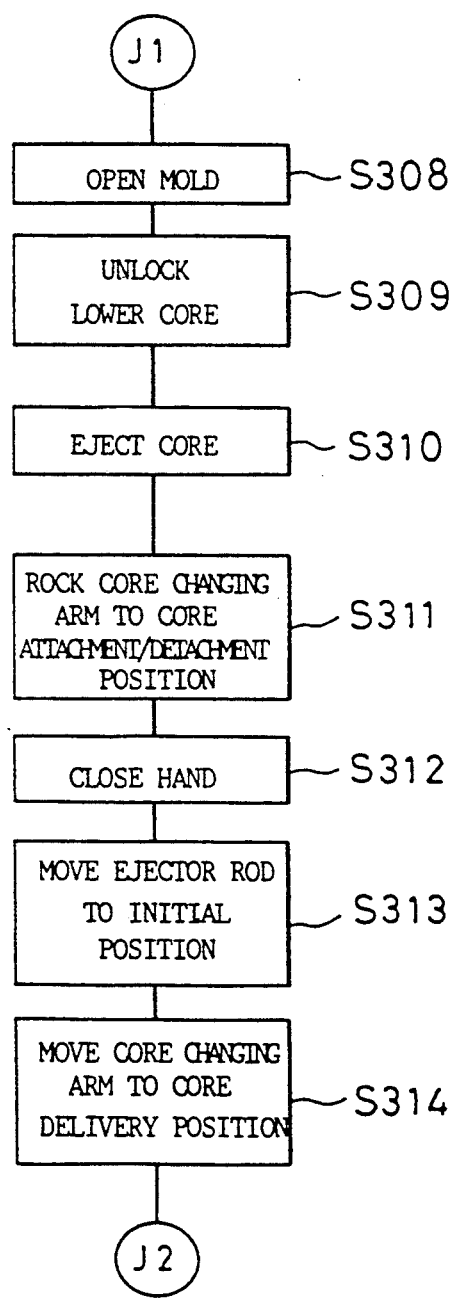
Figure 56C:
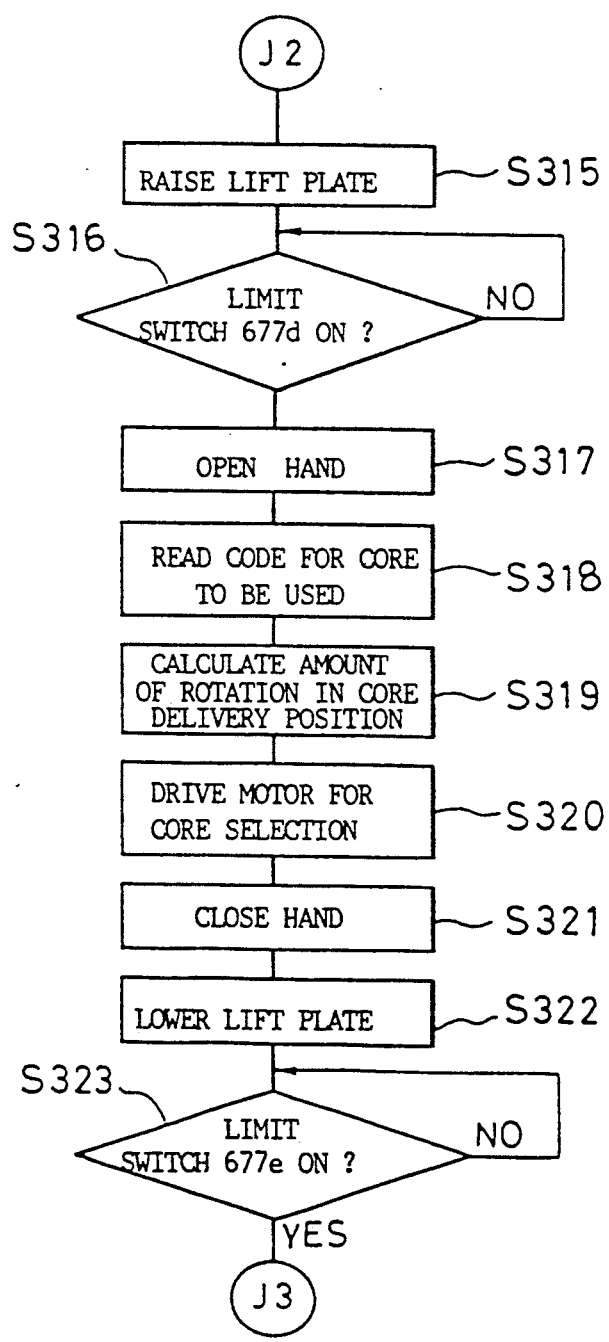
Figure 56D:
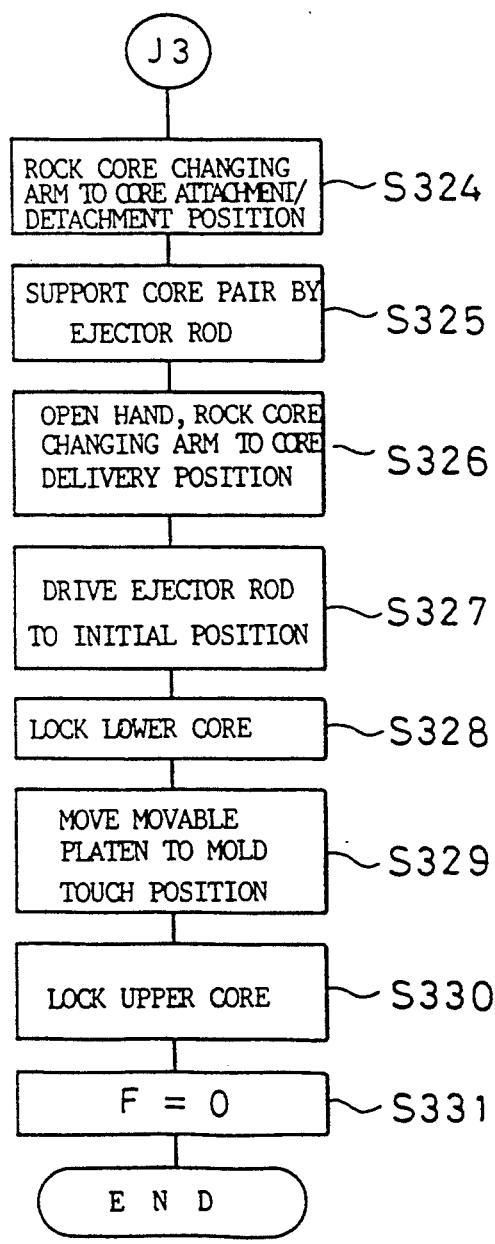

Referring to FIGS. 54 and 55, a product/core ejector 650, which corresponds to the element 450 shown in FIG. 29, is disposed on the central portion of the bottom face of the first matrix 611. The ejector 650 comprises a hollow cylindrical ejector rod 651, extending through the first matrix 611 and capable of projecting into the core mounting recess 611b, and an ejector pin 652 extending through the first core 614 and capable of projecting into a molding cavity MC. The ejector pin is urged toward the ejector rod by means of a return spring 653. The output shaft of a through-type servomotor 654, which is fixed to that end face of the stationary platen 603 on the side remoter from the mold, is connected with a ball screw 654a which is threadedly engaged with a ball nut 651a arranged on the inner peripheral surface of the motor-side half of the ejector rod 651. When the motor 654 rotates, the ejector rod 651 axially moves toward the mold along the ball screw 654a, thereby causing the ejector pin 652 to eject a product from the molding cavity. When the motor further rotates, the ejector rod 651 further axially moves to disengage the first core 614 from the first matrix 611. In FIGS. 54 and 55, reference numeral 624f denotes a resin passage.

For mold temperature control, the mold is formed with temperature control fluid passages similar to the temperature control fluid passages shown in FIGS. 21 and 37. More specifically, the first matrix 611 and the first core 614 are formed with temperature control fluid passages 642 and 614e, respectively, as shown in FIGS. 54 and 55. Likewise, the second matrix 621 and the second core 624 are formed with temperature control fluid passages 642' and 624e, respectively. When the first and second cores are attached to the first and second matrixes, respectively, the passages 614e and 624e communicate with the passages 642 and 642', respectively, and are connected to a mold temperature controller (not shown) by means of the passages 642 and 642' and temperature control fluid passages (not shown) which are formed individually in the stationary and movable platens 603 and 604 so as to communicate with the passages 642 and 642'.

The following is a description of the general operation of the vertical injection molding machine according to the sixth embodiment.

The first and second cores 614 and 624, having undergone preliminary temperature control, are attached, respectively, to the first and second matrixes 614 and 624, which are mounted on the stationary and movable platens 603 and 604 of the mold clamping section 602 of the vertical injection molding machine, under the control of the NC device 605, and the rotating arm 631 of the core changer is retreated. Then, the nozzle touch motor 601f is driven to established a nozzle touch state, and injection molding cycles are then repeatedly executed.

In each molding cycle, the mold clamping motor 602b is first driven to move down the injection section 601 and the mold clamping section 602, and a mold closing completion state is established such that the first and second cores of the mold clamping section 602 are joined to each other on their respective parting faces. In the meantime, the metering motor 601p is driven with the output torque of the injection motor 601q controlled, and the molding material (resin) is melted under back pressure. Then, after a mold lockup state is established, the injection motor 601q is driven to advance the injection screw 601a' through the medium of the pusher plate 601n, thereby injecting the molten resin into the molding cavity MC. After the completion of dwell and cooling processes, moreover, the mold clamping motor 602b is reversely driven to open the mold, and the metering motor 601q is driven to effect metering. After the completion of the mold opening, the product/core ejector 650 is activated to eject the product from the molding cavity.

Figure 57:
FIG. 57 is a diagram showing a lookup table for core replacement.

Referring now to FIGS. 56A to 56D, a core replacing operation of the vertical injection molding machine will be described. This core replacing operation, like the one according to the fourth embodiment, is executed under the control of the NC device 605 which corresponds to the element of 405 of FIG. 20. FIG. 57 shows a lookup table Tb″ for core replacement corresponding to the table Tb of FIG. 33.

When a core replacement command and a core code indicative of the core pair to be used next are manually inputted through a CRT/MDI of the NC device 605, or when the core replacement command and the core code are read out from a program (Step S300), in order to replace a currently used pair of cores, e.g., paired cores 614-1 and 624-1 (suffix "1" will be omitted hereinafter), with another pair of cores, e.g., paired cores 614-2 and 624-2, suited for the next lot of products, a PMCCPU of the NC device 605 stores the core code, and then compares an actual molding cycle execution frequency, read out from a common RAM of the NC device, with a set frequency, thereby determining whether or not a predetermined number of products corresponding to the paired cores 614-1 and 624-1 have already been manufactured (Step S301).

If the molding cycle is not expected to be terminated, the PMCCPU gives an alarm to accelerate cancellation of the core replacement command (Step S302). If the molding cycle ought to be terminated, on the other hand, the PMCCPU sets a flag F to "1," which is indicative of the allowance of the core replacement process (Step S303), and then determines whether or not a mold open state is established, by an actual rotational position of the mold clamping motor 602b read from the common RAM (Step S304). If the mold open state is not established yet, the PMCCPU delivers a move command for locating the movable platen 604 in a mold opening completion position to an NCCPU of the NC device 605 through the common RAM (Step S305). In response to this move command, the NCCPU distributes pulses to the mold clamping motor 602b, thereby causing the movable platen to move up. Thereafter, if it is concluded, on the basis of a signal indicative of the actual rotational position of the motor from a position sensor attached to the servomotor 602b, that the movable platen has reached an in-position range associated with the mold opening completion position, a mold opening completion signal is delivered from the NCCPU to the PMCCPU via the common RAM. In the description to follow, signal transfer between the two CPUs and motor drive control, executed in association with the same motor control as the aforesaid motor control, by means of the NCCPU which operates in response to the move command from the PMCCPU, will be explained in brief.

Figure 58A:
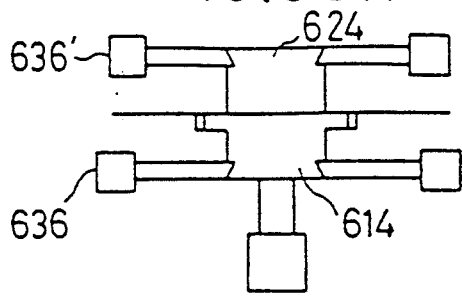
FIGS. 58A to 58G are diagrams for illustrating a series of processes of core replacing operation.
Figure 58B:
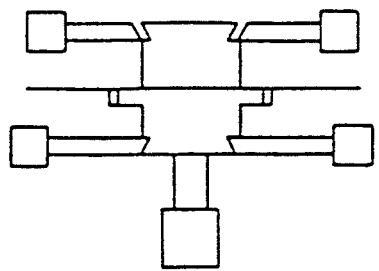
Figure 58C:
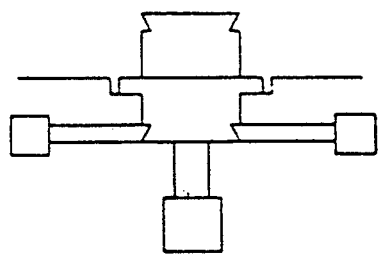

Then, the movable platen 604 is moved down to a mold touch position (Step S306), and the first and second cores 614 and 624 are joined together, as shown in FIG. 58A. In response to a mold touch completion signal delivered from the NCCPU, the PMCCPU causes an output circuit of the NC device 605 to turn off the solenoid 636′ of the core locking means (Step S307), thereby releasing the second core 624 in the second mold 621 from its locked state, as shown in FIG. 58B. When a limit switch output signal indicative of the completion of the retreat of the plunger 635′ corresponding to the solenoid 636′ is supplied to the NC device 605 through an input circuit of the NC device, at the time of canceling the locked state, the PMCCPU delivers a mold opening operation command to the NCCPU (Step S308). As a result, the movable platen 604 moves up, while the second core 624, joined with the first core 614, is disengaged from the second matrix 621, which is attached to the movable platen, and is supported together with the first core by means of the first matrix 611 which is attached to the stationary platen 603, as shown in FIG. 58C.

Figure 58D:
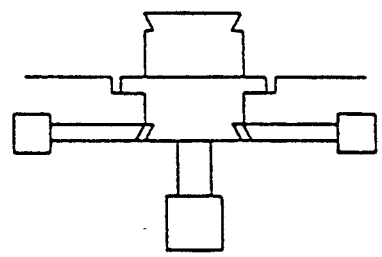
Figure 58E:
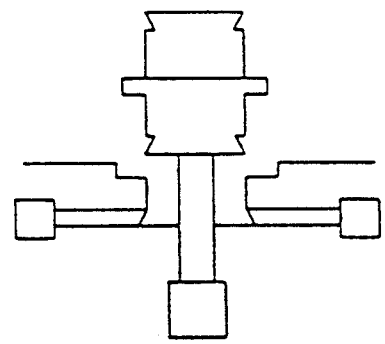

In response to a mold opening completion signal delivered thereafter, the PMCCPU causes the output circuit to turn off the solenoid 636 of the core locking means (Step S309), thereby releasing the first core 614 in the first mold 611 from its locked state, as shown in FIG. 58D. When a limit switch output signal indicative of the completion of the retreat of the plunger 635 is supplied to the NC device through the input circuit, at the time of canceling the locked state, the PMCCPU delivers a core ejection command to the product/core ejector 650, since the flag F is set to "1" indicative of the core replacement (Step S310). In response to this, the servomotor 654 of the ejector 650 operates to its second stage, whereby the first core is pushed out upward from the first matrix 611, and the paired cores 614 and 624 are located in the core attachment/detachment position where the hand 631a of the core changing arm 631 can grasp the core pair (FIG. 58E).

Figure 58F:
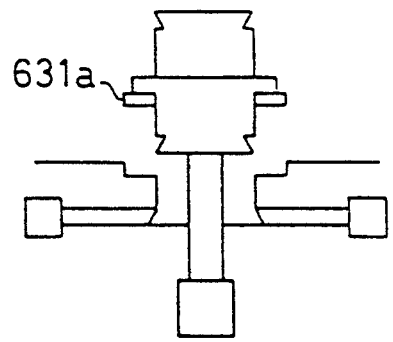

In response to a core ejecting operation completion signal delivered thereafter, moreover, the PMCCPU delivers a command for moving the hand 631a from the core delivery position indicated by full line in FIG. 52 to the core attachment/detachment position indicated by broken line in FIG. 52 (Step S311). As the servomotor 672 for core replacement rotates, therefore, the core changing arm 631 horizontally turns from the core delivery position to the core attachment/detachment position. At this time, the two grasping members 631a′ of the hand 631a are open at an angle of 180° or more, so that the hand can never run against the core pair. In the core attachment/detachment position, the hand 631a is closed to grasp the core pair, as shown in FIG. 58F (Step S312). Then, the servomotor 654 for core ejection is reversely driven so that the ejector rod 651 moves down to its initial position (Step S313), and the distal end face of the ejector rod leaves the bottom face of the first core 614, and is retreated from core mounting recess 611b of the first matrix 611.

Figure 58G:
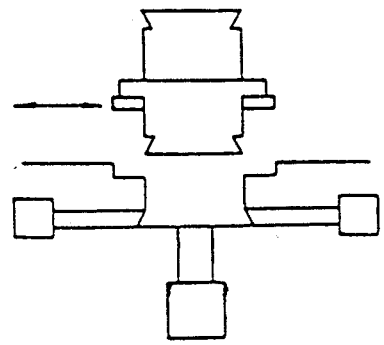

In response to a signal indicative of the completion of the movement of the ejector rod from the initial position, the core changing hand 631a turns from the core attachment/detachment position on the side of the mold clamping section 602 to the core delivery position on the side of the core stocker 607, under the control of the PMCCPU. At this time, the paired cores 614 and 624 are transported integrally with the hand toward the core delivery position in a manner such that they are supported by means of the hand which is in engagement with the bottom face of the first core flange portion 614b (FIG. 58G). When the completion of the location of the hand 631a in the core delivery position is ascertained, thereafter, the lift motor 678a is driven so that the limit switch 677d is activated (Steps S314 to S316), and the rotating table 671 moves up integrally with the lift plate 677. After the core pair removed from the mold clamping section 602 in the present cycle is delivered from the rotating table, the rotating table 671 is kept in the rotational position at the point of time of this core delivery. As the rotating table moves up, therefore, the paired cores 614 and 624 grasped by means of the hand 631a are fitted into the original storage hole 674 corresponding to this core pair. When a limit switch output delivered when the limit switch 677d is activated is applied to the NC device 605 through the input circuit of the NC device, the hand 631a of the core changing arm opens under the control of the PMCCPU (Step S317), and the core pair is disengaged from the grasping members 631a' and stored in the storage hole 674.

After the used core pair is stored in the core stocker 607 in this manner, the PMCCPU reads out a core code which is indicative of selected paired cores 614-2 and 624-2 (suffix "2" will be omitted hereinafter) stored in Step S300 and expected to be used next (Step S318), and reads out a target rotational position $Q_2$ ($Q_i$ (i=1 to 7) in general) of the servomotor 672 for rotating table drive, which corresponds to the core code, from the table Tb" of FIG. 57. Then, the PMCCPU calculates the amount of rotation of the servomotor 672 required for the location of the selected paired cores 614 and 624 in the core delivery position (Step S319), and loads the calculated rotation amount into the common RAM and also delivers it to the NCCPU. In response to this, the servomotor 672 is driven under the control of the NCCPU, so that the rotating table 671 rotates to locate the selected paired cores 614 and 624 in the core delivery position (Step S320). In response to a signal from the NCCPU, indicative of the completion of the rotatory movement of the rotating table, the hand 631a of the core changer is closed to hold the selected core pair, under the control of the PMCCPU (Step S321). Subsequently, in response to a lift plate down command from the PMCCPU, the lift motor 678a operates under the control of the NCCPU, so that the rotating table 671 moves down integrally with the lift plate 677. In the meantime, the PMCCPU determines whether or not the limit switch 677e is turned on (Step S323).

When the on-operation of the limit switch is ascertained, that is, when it is concluded that the selected paired cores 614 and 624 are disengaged from the storage hole 674, a command for the movement of the hand from the core delivery position to the core attachment-/detachment position is delivered from the PMCCPU to the NCCPU (Step S324), and the motor 632 for core replacement is driven to turn the core changing arm 631, under the control of the NCCPU, so that the core pair grasped by means of the hand 631a is transported from the core delivery position on the side of the core stocker 607 to the core attachment/detachment position on the side of the mold clamping section 602 (58G). Then, the motor 654 for core ejection forwardly rotates until the distal end face of the ejector rod 651 abuts against the bottom face of the core pair so that the core pair is supported by means of the ejector rod (Step S325 and FIG. 58F). After the hand 631a opens to be disengaged from the core pair (FIG. 58E), moreover, the core changing arm 631 returns from the core attachment/detachment position to the core delivery position (Step S326).

Then, as the ejector rod 651 moves back toward its initial position, the first core 614 of the core pair is gradually fitted into the core mounting recess of the first matrix 611 (Step S327 and FIG. 58D). When the arrival of the ejector rod at the initial position is ascertained, the core 614 is locked to the matrix 611 (Step S328 and FIG. 58C). After the arrival of the core changing arm 631 at the core delivery position is ascertained, moreover, the movable platen 604 is moved down to the mold touch position (Step S329 and FIG. 58B). For this platen movement, the mold touch position, which is stored in the common RAM on completion of mold thickness adjustment previously executed with the first and matrixes mounted in position, is read out from the common RAM. Since the first and second matrixes are common to the various core pairs in the core stocker, and all parts of the various core pairs except their respective cavity defining surfaces have the same dimensions and shapes, so the mold touch position need not be changed depending on the type of the cores. When the second core 624 of the core pare are fitted in the core mounting recess of the second matrix 621 attached to the movable platen as the movable platen moves down, the core 624 is locked to the matrix 621, whereupon the core replacement is finished (Step S3330 and FIG. 58A). Further, the flag F is reset to "0" which is indicative of the end of the core replacement, whereupon the core replacement process ends (Step S331). If the respective positions of the first and second cores in the core mounting recesses of the first and second matrixes are deviated from predetermined mounting positions, the positional deviation is removed when the two cores are locked individually to the two matrixes.

In simply storing the core stocker with the core pair removed from the matrix pair, a process for attaching a new core pair to the matrix pair is unnecessary, so that it is necessary only that the processes of Steps S300 to S317 be executed. In simply attaching the new core pair to the matrix pair, moreover, a process for storing the core stocker with the used core pair is unnecessary, so that it is necessary only that the processes of Steps S303 to S305 be executed after the execution of the processes of Steps S318 and S319, and the processes of Steps S320 to S331 be then executed.

Figure 59:
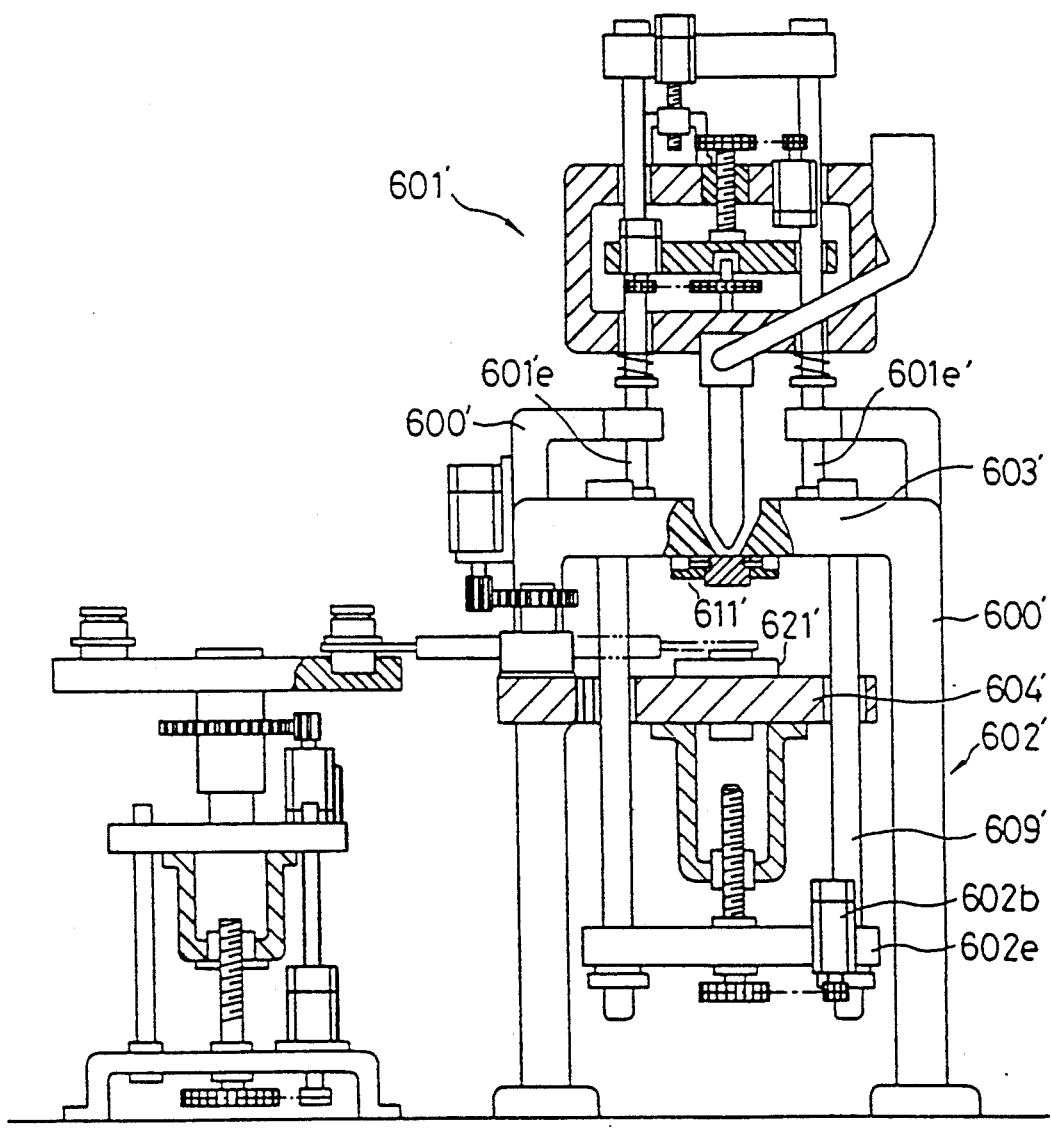
FIG. 59 is a schematic front view showing a vertical injection molding machine according to a modification of the sixth embodiment.
Figure 60:
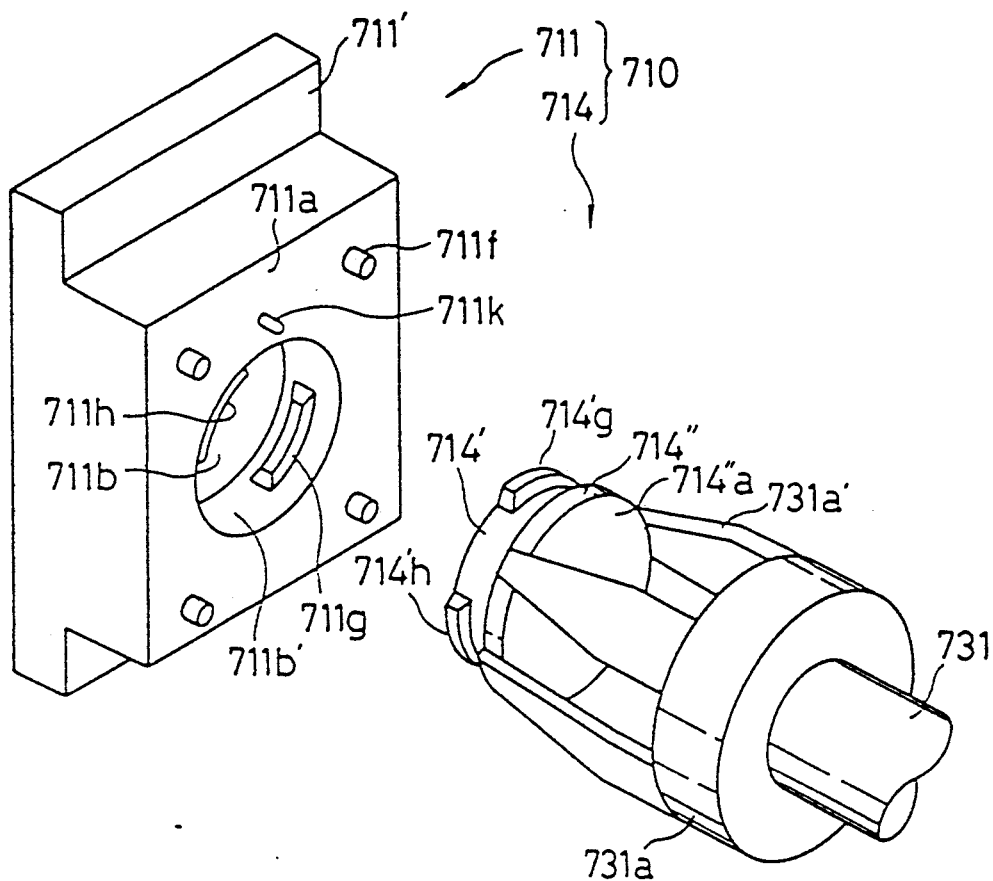
FIG. 60 is a perspective view illustrating an operation for attaching a core to a stationary-side matrix by means of a core changer according to a seventh embodiment of the present invention.
Figure 61:
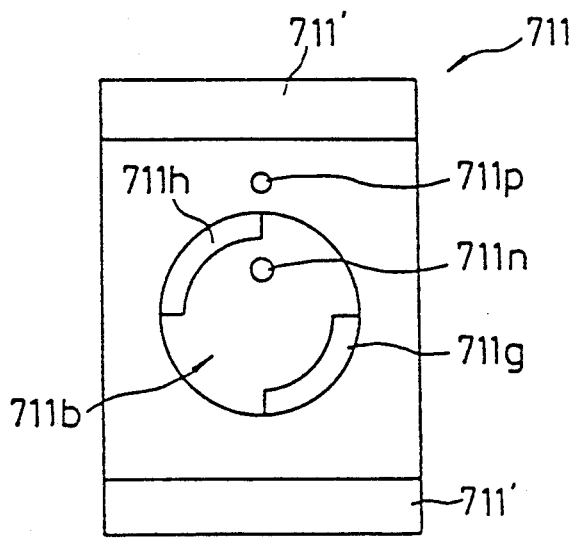
FIG. 61 is an end view of the matrix shown in FIG. 60.
Figure 62A:
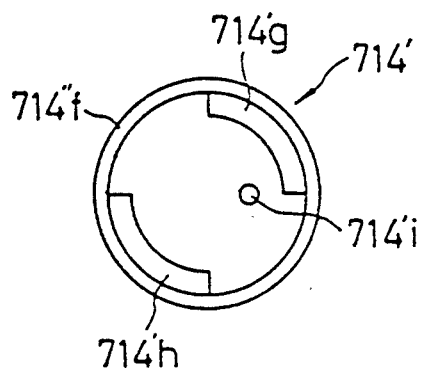
FIGS. 62A and 62B are an end view and a side view, respectively, of the core shown in FIG. 60.
Figure 62B:
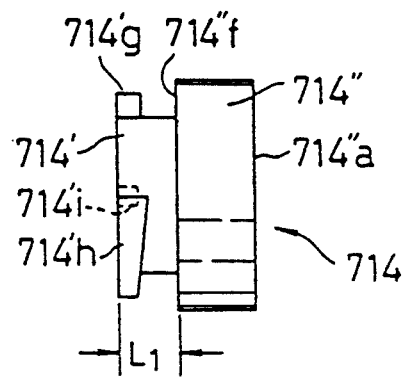
Figure 63:
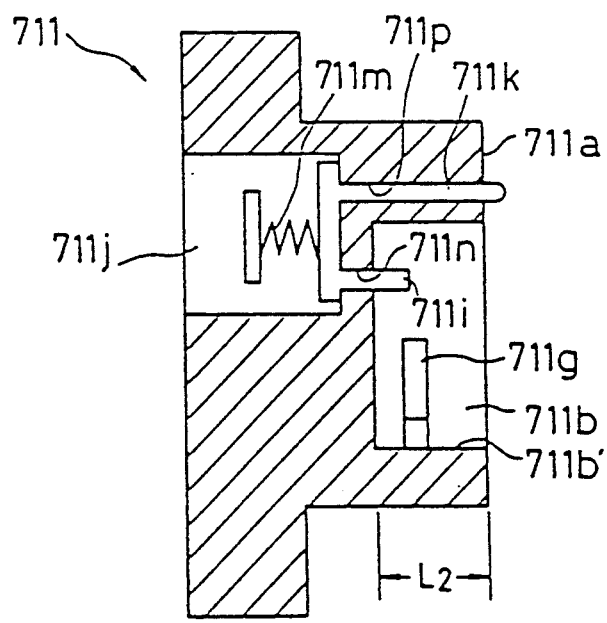
FIG. 63 is a longitudinal sectional view corresponding to FIG. 60.
Figure 64:
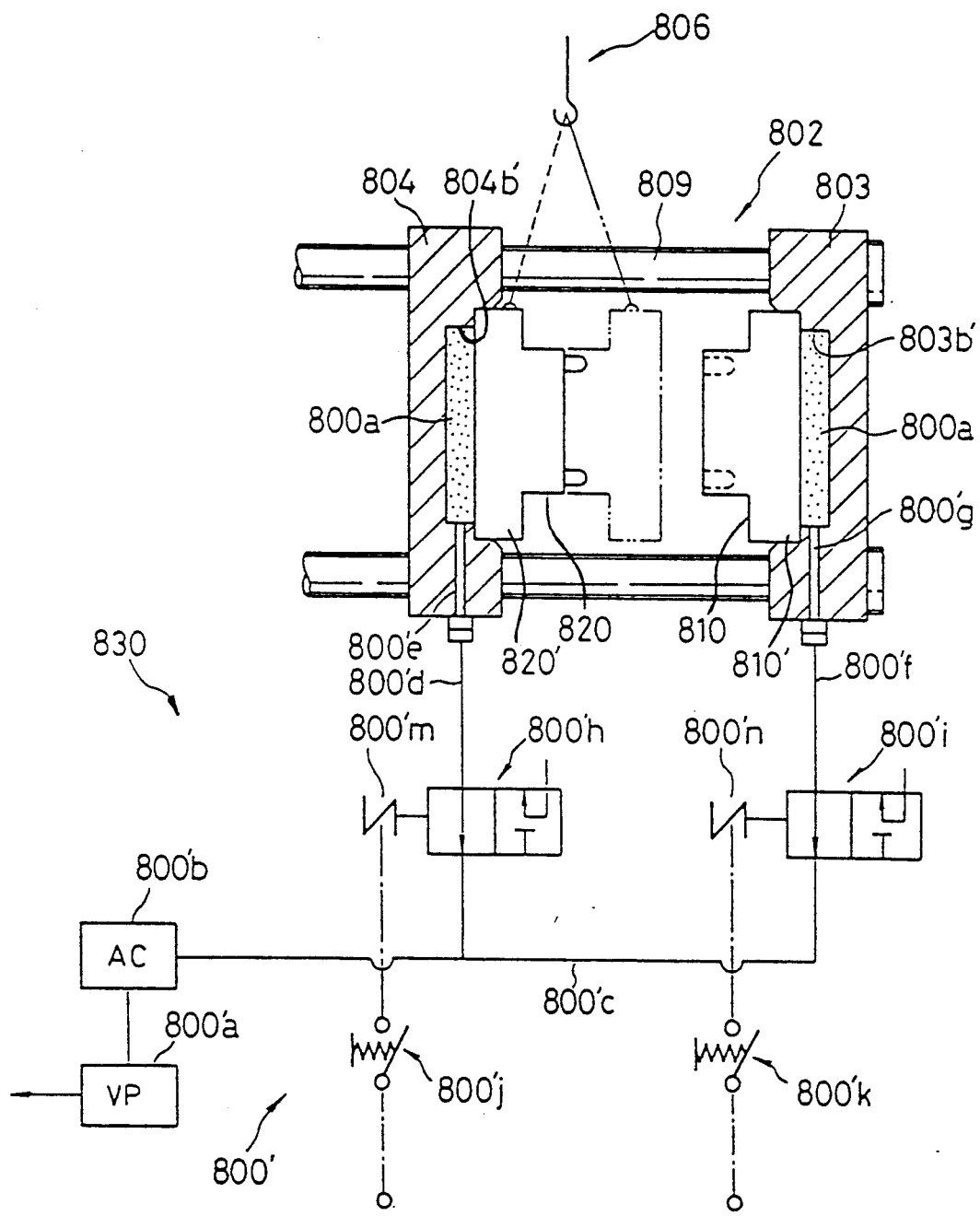
FIG. 64 is a schematic view, partially in longitudinal section, showing a mold clamping section and a mold replacing section according to an eighth embodiment of the present invention.

FIG. 59 shows a vertical injection molding machine according to a modification of the sixth embodiment. This modification differs from the sixth embodiment, in which the injection section is moved integrally with the other elements of the mold clamping section than the stationary platen, such as the movable platen and the like, when the other mold clamping section elements are moved with respect to the stationary platen, in that only the mold clamping section elements are moved with respect to the stationary platen, whereby load on the mold clamping motor is reduced.

In the modification, four guide rods 601'e for supporting an injection section 601' is connected to a machine frame 600'. Also, a movable platen 604' of a mold clamping section 602' is located below a stationary platen 603', and the respective upper ends of the four tie bars 609' are fixed to the stationary platen 603' which is integral with the machine frame 600'. In FIG. 59, reference numerals 611' and 621' denote first and second molds, respectively, which are attached to the stationary and movable platens, respectively. During a core replacing operation, the movable platen 604' is located in the same height-direction position as the stationary platen 603 of the sixth embodiment.

The sixth embodiment may be further modified. In the sixth embodiment, for example, errors in the platen positions are removed by executing the processes of Steps S304 and S305, in which the mold touch operation is started after the movable platen is temporarily located in the mold opening completion position, and making the movable platen position at the start of the mold touch operation in the core replacement process identical with that in the mold thickness adjustment process. However, these two steps are not essential. Although the matrixes are removable from the platens in the sixth embodiment, moreover, the matrixes may be formed integrally with the platens.

Referring now to FIGS. 60 to 63, a seventh embodiment of the present invention will be described.

The present embodiment is characterized in that individual core halves (hereinafter referred to as cores) are independently attached to matrix halves (hereinafter referred to as matrixes) in a non-contact manner such that they are separated from each other, and in that the cores are subjected to a rotatory force when they are attached to the matrixes.

A stationary-side mold half (hereinafter referred to as mold) 710, which constitutes one mold in conjunction with a movable-side mold half (not shown), is composed of a matrix 711 and a core 714 adapted to be removable fitted in a bottomed core mounting recess 711b, which is formed in the center of the core-side end face of the matrix.

The matrix 711 has clamp portions 711' formed integrally on the stationary-platen side of the top and bottom faces thereof and used for the attachment of the matrix 711 to a stationary platen (not shown). Four positioning pins 711f are formed around the core mounting recess 711b, on a core-side end face 711a of the matrix 711. The positioning pins 711f can be removably fitted into positioning pin holes (not shown), individually, which are formed in the core-side end face of the movable-side mold half (not shown). A cylindrical surface 711b' of the matrix 711, which defines the core mounting recess 711b, is formed with a first internal thread projection 711g, which covers a near quarter of the circumference of an internal thread for one pitch, and a second internal thread projection 711h, which covers another near quarter of the circumference of the same internal thread. Each projection is situated in an intermediate position on the recess defining surface 711b' with respect to the matrix thickness direction. Notches, each corresponding to the near quarter of the circumference of the internal thread, are formed individually between first facing ends of the two internal thread projections 711g and 711h and between the other facing ends.

Arranged in a bottomed cylindrical hole 711j (FIG. 63), which is bored in that end face of the matrix 711 on the opposite side thereof to the core, are a positioning pin 711i for holding in position the core 714 fitted in the core mounting recess 711b, a release rod 711k formed integrally with the positioning pin, and a spring 711m for urging the pin and the rod toward the core. The pin 711i and the rod 711k are connected to an actuator (not shown), and are retreated away from the core by means of the actuator, resisting the urging force of the spring 711m. The positioning pin 711i is passed through a hole 711n, whose opposite ends open individually into the core mounting recess 711b and the cylindrical hole 711j, and can project into the recess 711b. Further, the release rod 711k is passed through a hole 711p, whose opposite ends open individually into the cylindrical hole 711j and the core-side end face 711a of the matrix, and can project from the end face 711a.

The core 714 has a small-diameter portion 714', which can be removably fitted into the core mounting recess 711b of the matrix and whose axial length L1 is shorter than a recess depth L2, and a large-diameter portion 714" formed integrally therewith, and is in the form of a stepped cylinder as a whole. Formed on the outer peripheral surface of the small-diameter core portion 714' are a first external thread projection 714'g, which covers a near quarter of the circumference of an external thread for one pitch, and a second external thread projection 714'h, which covers another near quarter of the circumference of the same external thread. The two thread projections can be threadedly engaged with the internal thread projections 711g and 711h on the matrix side, individually. Notches, each corresponding to the near quarter of the circumference of the external thread, are formed individually between first facing ends of the two external thread projections 714'g and 714'h and between the other facing ends.

A pin hole 714'i is bored in the matrix-side end face of the small-diameter core portion 714' so as to be in alignment with the matrix-side positioning pin 711i. When the core is attached to the matrix, the positioning pin 711i is fitted into the pin hole 714'i. The large-diameter portion 714" includes a ring-shaped end face 714"f which abuts against the matrix end face 711a when the core is attached to the matrix, and the release rod 711k is adapted to abut against the ring-shaped end face 714"f. Further, a parting face 714"a of the large-diameter core portion 714" is formed with a cavity defining surface (not shown) which defines a molding cavity half.

The movable-side mold has substantially the same construction as the stationary-side mold 710, and description thereof is omitted.

A core changer of the present embodiment comprises a core changing arm 731, which is movable in a three-dimensional space under the control of an NC device (not shown), and a hand 731a which is attached to the distal end of the arm 731. The hand 731a has four grasping members 731a' for grasping the core 714, and is rotatable with respect to the arm 731.

The following is a description of a core replacing operation according to the present embodiment.

The desired core 714, taken out from a core stocker (not shown) by means of the core changer, is transported, by means of the core changer, to a core attachment/detachment position, where it faces the core mounting recess 711b of the matrix 711 attached to the stationary platen (not shown) of the injection molding machine in a mold open state. Then, the positioning pin 711i and the release rod 711k on the matrix side are driven away form the core, and the core changing arm 731 advances. Thereupon, the small-diameter portion 714' of the core grasped by means of the hand 731a is fitted into the core mounting recess 711b, and the external thread projections 714'g and 714'h of the core engage the internal thread projections 711g and 711h of the matrix, respectively. Subsequently, when the hand 731a is rotated in a predetermined rotating direction around the axis of the arm 731, the core 714 further advances with the external thread projections 714'g and 714'h threadedly engaged with the internal thread projections 711g and 711h, and the ring-shaped end face 714"f of the large-diameter core portion engages the matrix end face 711a. When the matrix-side actuator is then de-energized, the positioning pin (stopper) 711i is driven toward the core by means of the spring 711m, and is fitted into the pin hole 714'i to nonrotatably hold the core 714 in position, whereupon the attachment of the core 714 to the stationary-side matrix 711 is completed. Also, a core is attached to a movable-side matrix in like manner. At the time of mold clamping in an injection molding cycle, the ring-shaped core end face 714″f and the matrix end face 711a function as load bearing surfaces in the stationary-side mold, thereby preventing the stationary-side mold from being deformed or damaged.

In removing the core 714 from the matrix 711, the core changer is driven to grasp the core by means of the hand 731a, and thereafter, the matrix-side actuator is energized to disengage the positioning pin 711i from the pin hole 714′i, thereby making the core 714 rotatable, and the had 731a is then reversely driven. Thereupon, the external thread projection of the rod, threadedly engaged with the internal thread projection of the matrix, moves in the circumferential direction along the internal thread projection, so that the core retreats away from the matrix, and is disengaged from the core mounting recess. Then, the actuator is deenergized, and the core removed from the matrix is stored in the core stocker (not shown).

The seventh embodiment may be variously modified. For example, the small-diameter core portion may be designed so that its distal end face abuts against the recess defining surface of the matrix corresponding to the bottom face of the core mounting recess the moment the ring-shaped core end face engages the matrix end face as the core is attached to the matrix. Also, the positioning pins on the matrix side may be arranged so that they can be removably fitted on the peripheral surface of the small-diameter core portion. The large-diameter core portion may be formed having a polygonal profile so that the core can be easily grasped by means of the robot hand. Further, the matrix can be formed integrally with the platen.

Referring now to FIGS. 64 to 67, an eighth embodiment of the present invention will be described. This embodiment is designed for easy mold replacement utilizing negative pressure.

In an injection molding machine of the eighth embodiment, the operation of a mold changing section 830 (mentioned later) is controlled by means of an NC device (not shown), whereby a first mold 810 is attached to or detached from a stationary platen 803, and a second mold 820 is attached to or detached from a movable platen 804, which can move toward and away from the stationary platen along tie bars 809.

Figure 65:
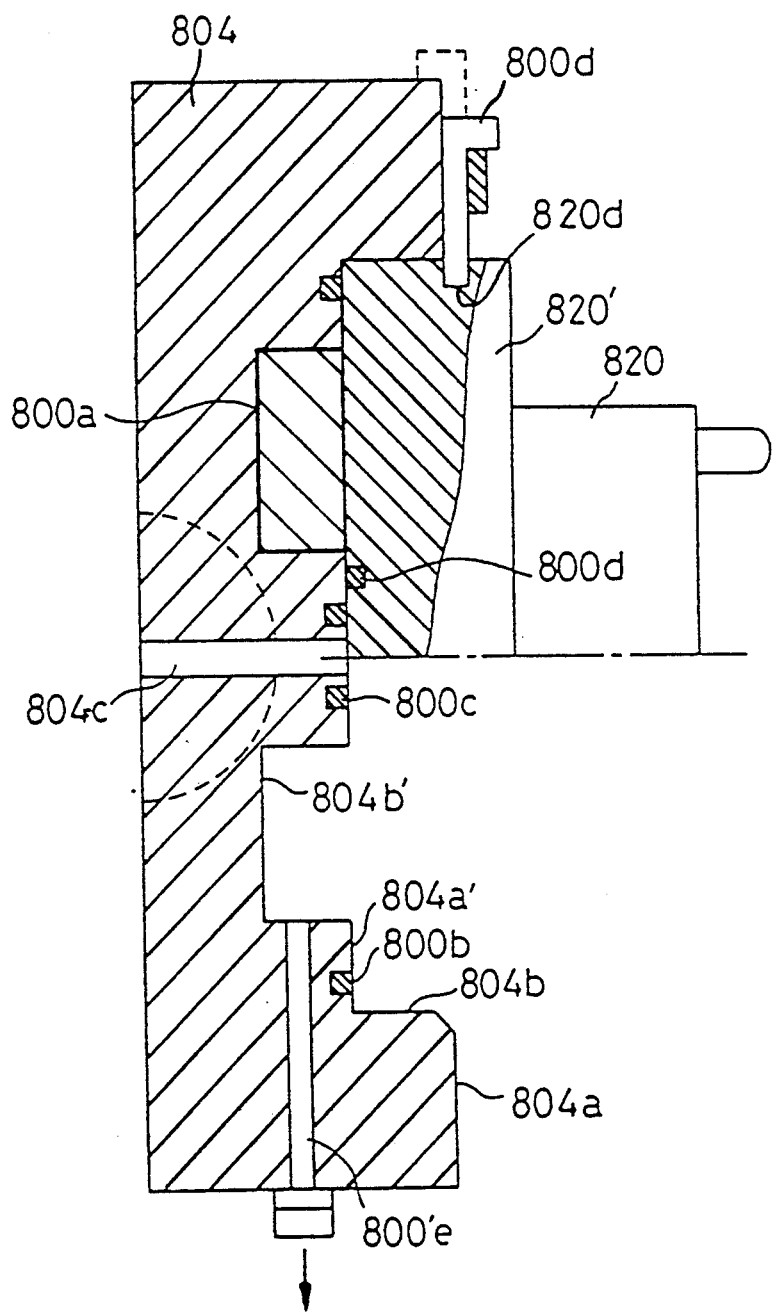
FIG. 65 is a longitudinal sectional front view showing a movable platen and a mold shown in FIG. 64.
Figure 66:
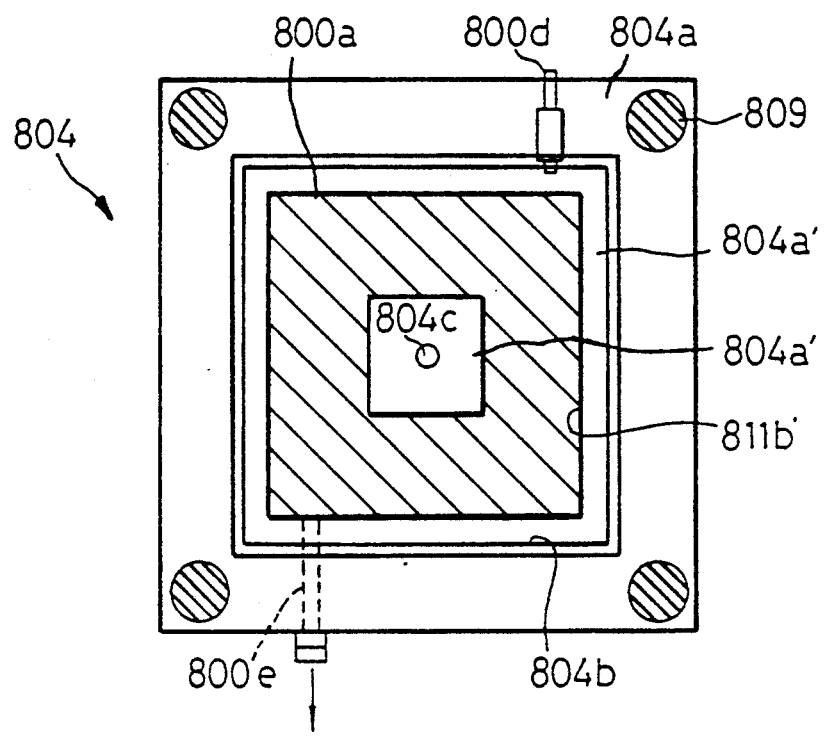
FIG. 66 is an end view showing the movable platen and the mold.

As shown in FIG. 65, a mold mounting recess 804b with a rectangular front-view shape is formed in a mold-side end face 804a of the movable platen 804, the mold 820, having a movable-platen-side half of its clamp portion 820′ fitted in the recess 804b, is supported by means of a recess defining surface 804a′ of the movable platen end face 804a which corresponds to the bottom face of the mold mounting recess, and the mold 820 thus mounted in the recess 804b is anchored to the movable platen by means of a retaining pin 800d of a mold clamping device, which is fitted into a pin hole 820d formed in the top face of the mold.

Further, an annular groove 804b′ with a rectangular front-view shape is formed on the recess defining surface 804a′ of the movable platen 804, and a solid air-permeable member 800a is buried in the annular groove 804b′ so that its outer surface is flush with the recess defining surface 804a′ of the movable platen. The air-permeable member 800a is formed of a honeycomb material or porous sintered alloy, comprising a large number of cells communicating one another by means of through holes formed in a cell wall, for example. An ejector pin passage hole 804c is bored through the movable platen 804 along the axis of this platen. Buried in the recess defining surface 804a′ of the movable platen 804, moreover, are a first ring-shaped seal member 800b, which surrounds the annular groove 804b′, outside the annular groove with respect to the radial direction, and a second ring-shaped seal member 800c, which surrounds the ejector pin passage hole 804c, inside the annular groove 804b′ and outside the passage hole, with respect to the radial direction. Buried in the movable-platen-side end face of the mold 820, furthermore, is a third ring-shaped seal member 800d which is located inside the annular groove 804b′ and outside the second ring-shaped seal member 800c, with respect to the radial direction.

Like the movable platen 804, the stationary platen 803 is formed with a mold mounting recess, annular groove (not shown), etc. In place of the ejector pin passage hole 804c, however, a sprue hole (not shown) is formed in the stationary platen 803. Moreover, the first mold 810, which is attached to the stationary platen, is constructed in the same manner as the second mold 820.

The mold changing section 830 comprises a mold changer 806 (diagrammatically shown in FIG. 64) for transporting the molds 810 and 820 between a mold clamping section 820 of the injection molding machine and a mold stocker (not shown), and a negative pressure supply system 800′ for supplying or cutting off the supply of negative pressure in order to maintain or cancel a mold attachment state in the stationary and movable platens 803 and 804.

The negative pressure supply system 800′ includes a vacuum pump 800′a and an accumulator 800′b connected thereto. On the one side, the accumulator communicates with the annular groove 804′c, a second duct 800′d communicating therewith, and a through hole 800′e formed in the movable platen and opening into the second duct and the annular groove 804b′. On the other side, the accumulator communicates with an annular groove 803b′ of the stationary platen by means of the first duct 800′c, a third duct 800′f communicating therewith, and a through hole 800′g formed in the stationary platen and opening into the third duct and the annular groove 803b′. First and second rotary solenoid-operated selector valves 800′h and 800′i are arranged in the middle of the second and third ducts 800′d and 800′f, respectively. The two solenoid-operated valves 800′h and 800′i are driven, respectively, by means of first and second solenoids 800′m and 800′n which are activated when first and second push-button switches 800′j and 800′k are closed, respectively, whereby the negative pressure supply to the annular grooves 804b′ and 803b′ through the second and third ducts is allowed or prevented.

The following is a description of the operation of the mold changing section of the eighth embodiment.

First, the joined first and second molds 810 and 820 are transported toward the mold clamping section 802 in a mold open state by means of the mold changer 806. The transportation position of the mold pair and the move position of the movable platen 804 are adjusted by means of the mold changer 806, whereby the clamp portion 820′ of the second mold 820 is fitted into the mold mounting recess 804b of the movable platen. Then, the first push-button switch 800′j is temporarily closed to set the first solenoid-operated valve 800′h to the negative pressure supply side. As a result, the annular groove 804b′ of the movable platen communicates with the vacuum pump 800′a, so that a negative pressure is produced in the annular groove, and the clamp portion 820' of the mold is sucked into the annular groove 804b' by means of the negative pressure. Thus, the clamp portion 820' is brought intimately into contact with the mold mounting recess 804b of the movable platen in a manner such that its inner end abuts against the recess defining surface 804a' of the movable platen.

Then, the movable platen is advanced to a mold touch position, and a clamp portion 810' of the first mold 810 is fitted into a mold mounting recess 803b of the stationary platen. Then, the second push-button switch 800'k is closed to produce a negative pressure in the annular groove 803b' of the stationary platen by means of a second solenoid-operated valve 800'i, and the clamp portion 810' is brought intimately into contact with the mold mounting recess 803b.

Further, the mold clamping device is driven to cause its retaining pin 800d to be fitted into the pin hole 820d of the second mold 820, and to cause a similar retaining pin to be fitted into a similar pin hole of the first mold 810. By doing this, the two molds are unremovably attached to the stationary and movable platens 803 and 804, individually. Then, the mold changer 806 is retreated, whereupon the mold attachment ends. At the time of mold clamping in an injection molding cycle, the second mold 820 is supported by means of the recess defining surface 804a' and the air-permeable member 800a, so that the mold can be prevented from being deformed. The same applies to the first mold.

In removing the molds 810 and 820 attached to the mold clamping section 802, both the molds are supported by means of the core changer 806 after moving the movable platen 804 to the mold touch position, and the retaining pins of the mold clamping device are then disengaged individually from the pin holes of the two molds. Then, the second push-button switch 800'k is temporarily closed to cut off the negative pressure supply through the second solenoid-operated valve 800'i, thereby making the pressure inside the annular groove 803b' of the stationary platen equal to atmospheric pressure. Also, the movable platen 804 is retreated, and the mold changer 806 is driven to disengage the first mold 810 from the stationary platen 803. The, the first push-button switch 800'j is closed to make the pressure inside the annular groove 804b' equal to atmospheric pressure. Thereafter, the movable platen 804 is retreated with the mold changer 806 kept stationary, so that the second mold 820 is disengaged from the movable platen.

Figure 67:
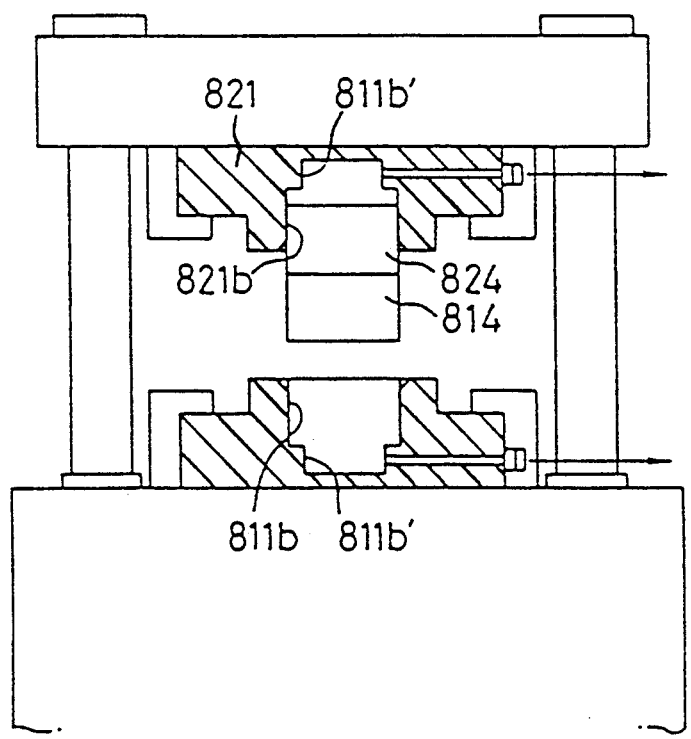
FIG. 67 is a front view, partially in longitudinal section, showing a mold replacing section according to a modification of the eighth embodiment.

FIG. 67 shows a mold changing section according to a modification of the eight embodiment, which is applied to a vertical injection molding machine using a mold composed of matrixes and cores. In this drawing, reference numerals 811b and 821b denote, respectively, core mounting recesses formed in first and second cores 811 and 821, which are attached to stationary and movable platens, respectively. Reference numerals 811b' and 821b' denote, respectively, negative pressure generating recesses (corresponding to the annular grooves of the eighth embodiment) formed individually in the two matrixes. No air-permeable members are arranged in the recesses 811b' and 821b'. Preferably, a core changer used is a robot (not shown) which has a horizontally turnable arm with a hand on the distal end thereof for grasping the cores. In replacing the cores, the two cores are attached to and detached from the core mounting recesses in a manner such that they are joined together.

The eighth embodiment may be further modified. For example, the retaining pins and pin holes for anchoring the mold to the platens are not essential elements. In order to prevent the negative pressure supply from being unexpectedly cut off, moreover, the push-button switches and the solenoid-operated valves may be furnished individually with safety devices.

Referring now to FIGS. 68, 69, and 70A to 70D, a ninth embodiment of the present invention will be described. This embodiment is intended to effect mold replacement speedily and easily by utilizing electromagnetic force and to reduce the number of parts of a mold changing section, thereby facilitating the manufacture and maintenance of the mold changing section.

Figure 68:
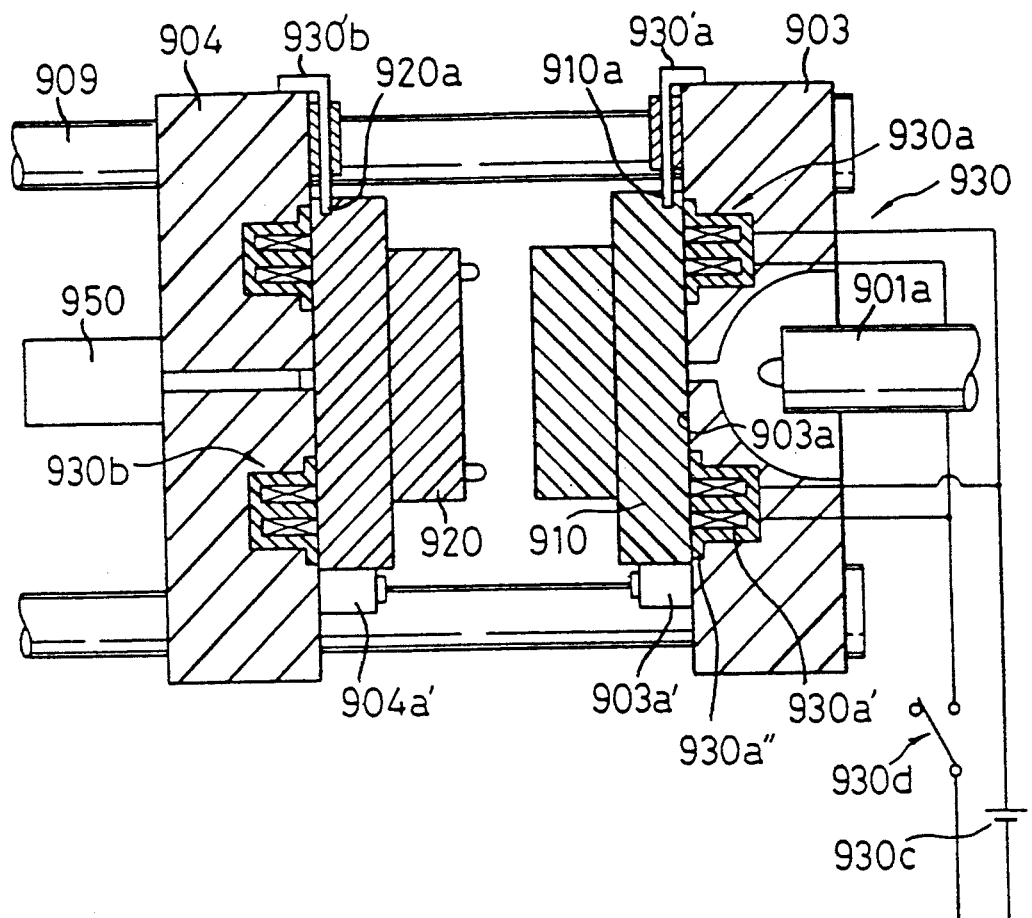
FIG. 68 is a plan view, partially in section, showing a mold clamping section and a mold replacing section according to a ninth embodiment of the present invention.
Figure 69:
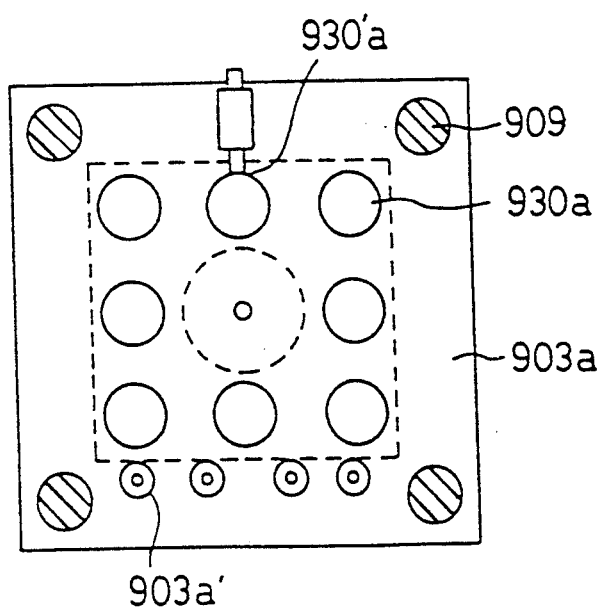
FIG. 69 is an end view of a stationary platen shown in FIG. 68.

In an injection molding machine of the ninth embodiment, the operation of a mold changing section 930 (mentioned later) is controlled by means of an NC device (not shown), whereby a first mold 910 is attached to or detached from a stationary platen 903, and a second mold 920 is attached to or detached from a movable platen 904, which can move toward and away from the stationary platen along tie bars 909. In FIG. 68, reference numerals 901a and 950 denote a heating cylinder and a product ejector, respectively.

The mold changing section 930 comprises electromagnets 930a of a first group buried in the stationary platen 903 and electromagnets 930b of a second group buried in the movable platen 904. Exciting windings 930a' of the first-group electromagnets are connected in parallel with one another to a first power source 930c for energizing the first-group electromagnets through a first power switch 930d, which is common to the individual exciting windings. Likewise, exciting windings 930b' of the second-group electromagnets are connected in parallel with one another to a second power source (not shown) for energizing the second-group electromagnets through a common second power switch 930e (FIGS. 70A to 70D).

The first-group electromagnets 930a, e.g., eight in number, are arranged at regular intervals in the circumferential direction, on the peripheral edge portion of a mold mounting region (indicated by broken line in FIG. 69) of the stationary platen 903, in a manner such that the end face of a yoke 930a" of each electromagnet is flush with a mold mounting surface 903a of the stationary platen. In order to enable mold opening, resisting a bonding force which acts between the first and second molds 910 and 920, moreover, the nine electromagnets, which constitute each of the electromagnet group 930a and 930b, generate, in cooperation with one another, an electromagnetic force not smaller than 10% of a mold clamping force which takes a value of 1,000 to 2,000 kg, depending on the type of the injection molding machine.

The mold changing section 930 is provided with a safety device 930' for preventing the molds from falling in case the electromagnet groups are unexpectedly de-energized so that the electromagnetic force ceases to exist. This safety device includes retaining pins 930'a and 930'b adapted to be removably fitted in pin holes 910a and 920a, respectively, which are formed individually in the respective top faces of the first and second molds 910 and 920. In cooperation with first and second supporting roller groups 903a' and 904a' mounted individually on the respective lower end portions of the mold mounting surfaces 903a and 904 of the stationary and movable platens, the two retaining pins support the first and second molds 910 and 920 so that the molds cannot be disengaged from the stationary and movable platens, individually.

Referring now to FIGS. 70A to 70D, the operation of the mold changing section of the ninth embodiment will be described.

Figure 70A:
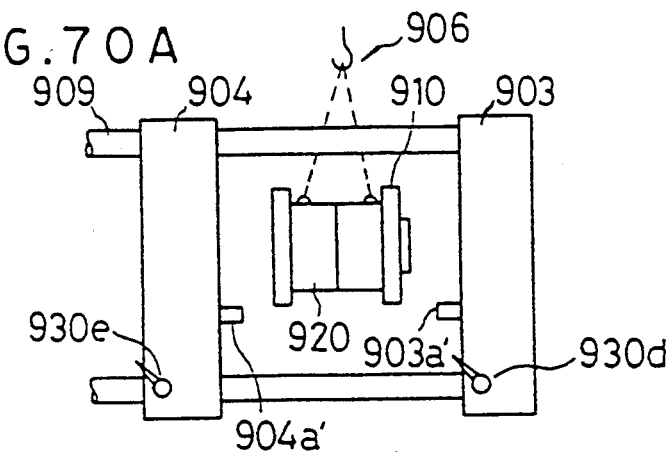
FIGS. 70A to 70D are diagrams for illustrating the operation of the mold replacing section of the ninth embodiment.
Figure 70B:
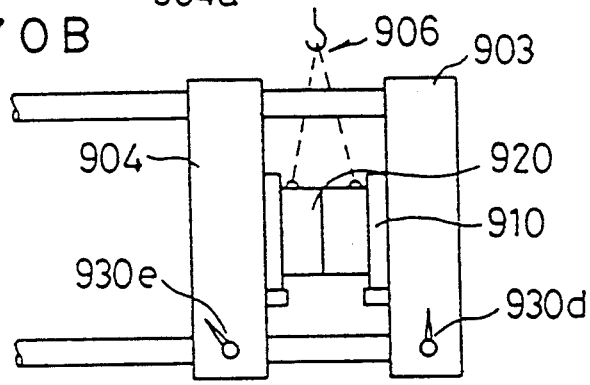
Figure 70C:
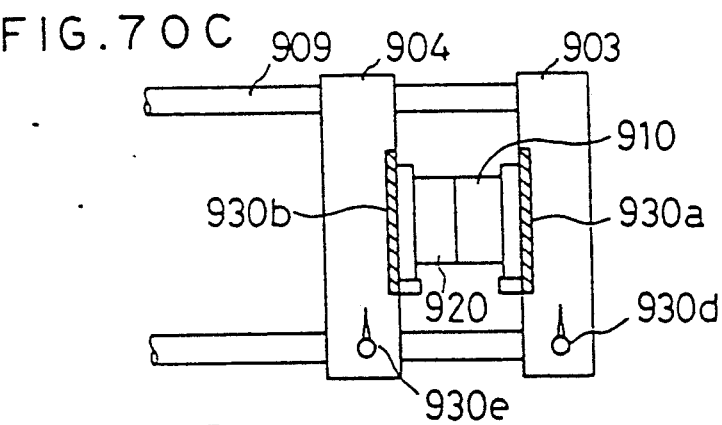
Figure 70D:
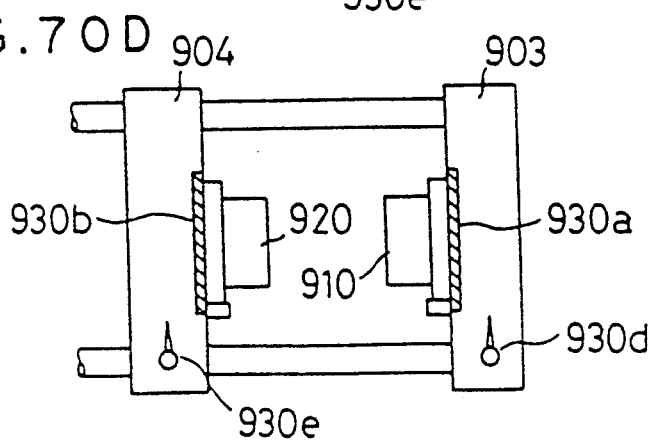

First, the joined first and second molds 910 and 920 are transported between the stationary and movable platens 903 and 904 in a mold open state by means of a mold changer 906 diagrammatically shown in FIG. 70 (FIG. 70A). Then, the movable platen is advanced to a mold replacement position, so that the two molds are supported individually by means of the first and second supporting roller groups 903a' and 904a' (FIG. 70B). After the movable platen is moved to a mold touch position, moreover, the first and second power switches 930d and 930e are closed to energize the electromagnets 930a and 930b of the first and second groups, whereby the first and second molds 910 and 920 are electromagnetically attracted to the stationary and movable platen sides, respectively, and are fixed individually on the two platens (FIG. 70C). Further, the retaining pins 930'a and 930'b of the safety device 930' are fitted into the pin holes 910a and 920b of the two molds, respectively, and the mold changer 906 is retreated, whereupon the mold attachment ends. FIG. 70D shows the mold open state.

In removing the molds 910 and 920, both the molds are supported by means of the core changer 906 after moving the movable platen 904 to the mold touch position, and the retaining pins are then disengaged individually from the pin holes of the two molds. Then, the first power switch 930d is opened to deenergize the electromagnets 930a of the first group, so that the molds 910 and 920 are allowed to be removed, and are delivered from a mold clamping section 902 by means of the mold changer 906.

Figure 71:
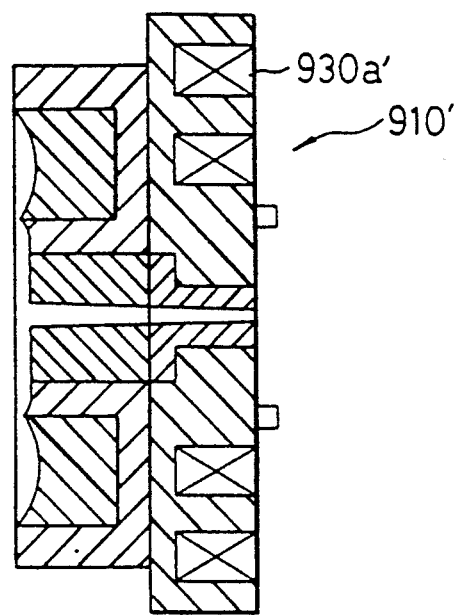
FIG. 71 is a sectional view showing a mold according to a first modification of the ninth embodiment.

FIG. 71 shows a first modification of the ninth embodiment. This modification differs from the ninth embodiment in that electromagnet groups are buried not in the platens but in the molds. In FIG. 71, reference numeral 910' denotes a first mold in which an electromagnet group 930a' is buried. Likewise, another electromagnet group (not shown) is buried in a second mold.

Figure 72:
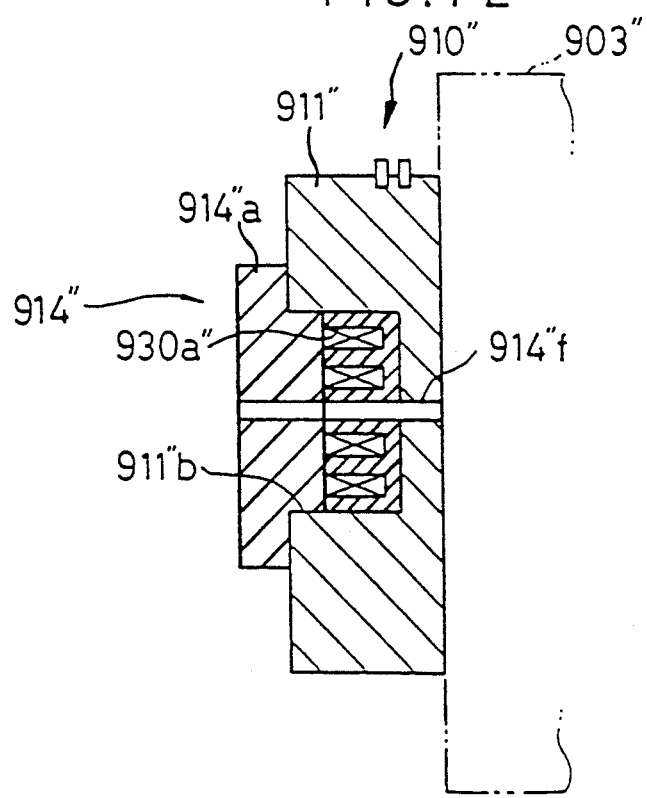
FIG. 72 is a sectional view showing a mold according to a second modification of the ninth embodiment.

FIG. 72 shows a core changing section according to a second modification, which is mounted in an injection molding machine using molds composed of matrixes and cores. In FIG. 72, a first mold 910" is composed of a matrix 911" attached to a stationary platen 903" and a core 914" attached thereto, and an electromagnet group 930a" is buried in the matrix 911". When the electromagnet group 930"a is energized, the core 914" is electromagnetically attracted to the matrix, and the respective facing end faces of a flange portion 914"a of the core and the matrix 911" abut against each other. Thus, the core 914" is prevented from running against the electromagnet group 930a" which is arranged in close vicinity to the bottom face of a core mounting recess 911"b of the matrix, so that the electromagnet group can be prevented from being damaged. In FIG. 72, reference numeral 914"f denotes a resin passage. Likewise, another electromagnet group (not shown) is buried in a matrix of a second mold which is attached to a movable platen. In place of the resin passage 914"f, moreover, an ejector pin guide hole is bored through the second mold.

The ninth embodiment may be further modified. For example, the construction, number, and layout of the electromagnets constituting the electromagnet groups and the procedure of mold attachment and detachment are not limited to the ones described in connection with the ninth embodiment and the first and second modifications thereof.

We claim:

1. An injection molding machine comprising:
   mold clamping means including a stationary platen removably fitted with a first mold half, and a movable platen removably fitted with a second mold half, the first and second mold halves being used to form a mold;
   a plurality of mold elements constituting at least a part of the mold;
   mold storage means for storing said mold elements in a reciprocally deliverably manner;
   mold changing means for delivering a selected one of said mold elements from said mold storage means, transporting the mold element thus delivered to said mold clamping means, for removing the mold element attached to said mold clamping means from said mold clamping means, and for transporting the mold element thus removed to said mold storage means to store the element in said mold storage means, said mold changing means being disposed between said mold clamping means and said mold storage means and including a multi-joint robot having an arm composed of plural links and a chuck rotatably supported by the arm; and
   control means for controlling the operations of said mold changing means and said mold clamping means.

2. An injection molding machine according to claim 1, wherein said mold clamping means can be fitted with different types of molds, the first mold half of each of said different types of molds including a first matrix half removably attached to said stationary platen and a first core half removably attached to the first matrix half, and the second mold half of each of said different types of molds including a second matrix half, removably attached to said movable platen and constituting a matrix in conjunction with said first matrix half, and a second core half removably attached to the second matrix half and constituting a core in conjunction with said first core half.

3. An injection molding machine according to claim 2, wherein at least one of the matrixes of said different types of molds is used in common with at least two of said different types of molds, and at least two cores corresponding to said at least one of the matrixes individually define molding cavities of different shapes.

4. An injection molding machine according to claim 2, wherein each of said mold elements stored in said mold storage means is for use as the core formed of first and second core halves releasably joined together, and said mold changing means is capable of performing delivery of the core to and from said mold storage means, attaching and detaching said core to and from, respectively, said mold clamping means, and transporting the core between said mold storage means and said mold clamping means in a manner such that the first and second core halves of each said core are joined together.

5. An injection molding machine according to claim 4, wherein said first and second matrix halves individually have core mounting recesses in which said first and second core halves are removably fitted, an outer end of one of said core mounting recesses opens to an outer peripheral surface of one of the first and second matrix halves corresponding to said one of said core mounting recesses, and said mold changing means causes a corresponding one of said joined first and second core halves to be fitted into or removed from said one of said core mounting recesses through said outer open end of said one of said core mounting recesses.

6. An injection molding machine according to claim 4, wherein said first and second matrix halves individually having core mounting recesses in which said first and second core halves are removably fitted, respective upper ends of said core mounting recesses open individually to the respective upper surfaces of said first and second matrix halves, and said mold changing means causes said first and second core halves to be fitted into or removed from said core mounting recesses through the respective upper ends of said core mounting recesses.

7. An injection molding machine according to claim 4, wherein said first and second core halves are each formed in a shape of a truncated cone whose diameter on a side of said first and second matrixes is smaller than the diameter thereof on a side remoter from said first and second matrixes, said first and second matrix halves individually have core mounting recesses in which said first and second core halves are removably fitted, said core mounting recesses are each formed in the shape of a truncated cone corresponding in external shape to each said core half, and said first and second core halves fitted in said first and second core mounting recesses, respectively, are press-fitted into said core mounting recesses by causing said mold clamping means to perform mold clamping operation under the control of said control means.

8. An injection molding machine according to claim 7, further comprising:
 a core ejector having ejector rods capable of advancing into and retreating from respective core mounting recesses of said first and second matrix halves, individually, said core ejector driving the ejector rods toward said first and second core halves under the control of said control means, to eject said first and second core halves, press-fitted in said core mounting recesses, from said core mounting recesses.

9. An injection molding machine according to claim 2, wherein said mold elements are each formed of one of said first and second core halves, each of said first and second core halves having a projection formed over a first predetermined circumferential-direction region on the matrix-half-side outer peripheral surface thereof, said first and second matrix halves individually having core mounting recesses in which said first and second core halves are removably fitted, each of said first and second matrix halves having a projection formed in a second predetermined circumferential-direction region on a core mounting recess defining a peripheral surface thereof and engaging said projection formed on a corresponding one of said first and second core halves, and said mold changing means forwardly or reversely rotating each of said first and second core halves held thereby to establish or cancel unreleasable engagement between said projection of said first and second core halves and said projection of a corresponding one of said first and second matrix halves, thereby attaching or detaching at least one of said first and second core halves to or from said corresponding one of said first and second matrix halves.

10. An injection molding machine according to claim 9, wherein each of said first and second core halves has a load bearing surface adapted to engage the core-half-side end face of said corresponding one of said first and second matrix halves when each of said first and second core halves is further rotated in a predetermined rotating direction with said projection of one of said first and second core halves and said projection of said corresponding one of said first and second matrix halves in engagement with each other.

11. An injection molding machine according to claim 10, further comprising:
 stopper means operating under the control of said control means, said stopper means being adapted to keep each of said first and second core halves non-rotatable when the load bearing surface of said core half engages said end face of said corresponding one of said first and second matrix halves, and to allow each of said first and second core halves to rotate when said core half is removed from said corresponding one of said first and second matrix halves.

12. An injection molding machine according to claim 2, wherein said mold changing means includes a first electromagnet buried in one of the respective facing end portions of said first matrix half and said first core half, a second electromagnet buried in one of the respective facing end portions of said second matrix half and said second core half, and means for energizing and de-energizing said first and second electromagnets by operating under the control of said control means.

13. An injection molding machine according to claim 2, wherein each of said first and second matrix halves is formed with a first recess to receive a corresponding one of said first and second core halves and a second recess communicating with the first recess, and said mold changing means includes means for supplying negative pressure to each of said respective second recesses of said first and second matrix halves and means for allowing or preventing the negative pressure supply from said negative pressure supply means to each of said respective second recesses of said first and second matrix halves, under the control of said control means.

14. An injection molding machine according to claim 13, further comprising:
 solid air-permeable members arranged individually in said respective second recesses of said first and second matrix halves, a core-half-side end face of each said air-permeable member being flush with a bottom face of said first recess of a corresponding one of said first and second matrix halves.

15. An injection molding machine according to claim 2, further comprising:
 core locking means adapted to operate under the control of said control means, for releasably locking said first and second core halves to said first and second matrix halves, respectively.

16. An injection molding machine according to claim 4, further comprising:
 core ejecting means attached to one of said stationary and movable platens which is disposed in a lower position, with respect to a height direction of the injection molding machine, for moving a core ejector rod, under the control of said control means, in a core attachment/detachment position where a distal end face of said core ejector rod is situated above said one of said stationary and movable platens; and second core locking means adapted to operation under the control of said control means, for releasably locking said first and second core halves to said first and second matrix halves, respectively, and wherein said joined first and second core halves are attached to or detached from the distal end face of said core ejector rod in said core attachment/detachment position using said mold changing means.

17. An injection molding machine according to claim 16, wherein said mold clamping means is caused to perform a mold clamping operation to bring said joined first and second core halves intimately into contact with said first and second matrix halves, respectively, so that said first and second core halves are placed on the distal end face of said core ejector rod in said core attachment/detachment position using said mold changing means, said first and second core halves are then locked individually to said first and second matrix halves, and said mold clamping means is caused to perform a mold opening operation with an upper one of said first and second core halves in which the one of said first and second matrix halves corresponding thereto is unlocked, and thereafter, said core ejector rod is located in said core attachment/detachment position with the other one of said first and second core halves and the other one of said first and second matrix halves is unlocked, and said first and second core halves on the distal end face of said core ejector rod are taken out using said mold changing means.

18. An injection molding machine according to claim 1, wherein said mold clamping means can be fitted with different types of molds, the first mold half of each of said different types of molds including a first core half removably attached to said stationary platen, and the second mold half of each of said different types of molds including a second core half removably attached to said movable platen and constituting a core in conjunction with said first core half.

19. An injection molding machine according to claim 18, wherein each of said mold elements stored in said mold storage means is for use as the core formed of first and second core halves releasably joined together, and said mold changing means is capable of performing delivery of the core to and from said mold storage means, attaching and detaching said core to and from, respectively, said mold clamping means, and transporting the core between said mold storage means and said mold clamping means so that the first and second core halves of each said core are joined together.

20. An injection molding machine according to claim 19, wherein said stationary and movable platens individually have core mounting recesses in which said first and second core halves are removably fitted, respective upper ends of said core mounting recesses opening individually to respective upper surfaces of said stationary and movable platens, and said mold changing means causing said first and second core halves to be fitted into or removed from said core mounting recesses through the respective upper open ends of said core mounting recesses.

21. An injection molding machine according to claim 19, wherein said first and second core halves are each formed in a shape of a truncated cone whose diameter on a side of said stationary and movable platens is smaller than the diameter thereof on a side remoter from said stationary and movable platens, said stationary and removable platens individually having core mounting recesses in which said first and second core halves are removably fitted, said core mounting recesses each being formed in a shape of a truncated cone corresponding in external shape to each of said first and second core halves, and said first and second core halves being fitted in corresponding ones of said core mounting recesses, respectively, and being press-fitted into said core mounting recesses by causing said mold clamping means to perform a mold clamping operation.

22. An injection molding machine according to claim 21, further comprising:
a core ejector having ejector rods capable of advancing into and retreating from respective core mounting recesses of said stationary and movable platens, individually, said core ejector driving the ejector rods toward said first and second core halves under the control of said control means, to eject said first and second core halves, press-fitted individually in said core mounting recesses, from said core mounting recesses.

23. An injection molding machine according to claim 18, further comprising:
core locking means adapted to operate under the control of said control means, for releasably locking said first and second core halves to said stationary and movable platens, respectively.

24. An injection molding machine according to claim 18, wherein said mold changing means includes a first electromagnet buried in one of respective facing end portions of said stationary platen and said first core half, a second electromagnet buried in one of respective facing end portions of said movable platen and said second core half, and means for energizing and de-energizing said first and second electromagnets by operating under the control of said control means.

25. An injection molding machine according to claim 18, wherein each of said stationary and movable platens is formed with a first recess to receive a corresponding one of said first and second core halves and a second recess communicating with the first recess, and said mold changing means includes means for supplying negative pressure to each of said respective second recesses of said stationary and movable platens and means for allowing or preventing the negative pressure supply from said negative pressure supply means to each of said respective second recesses of said stationary and movable platens, under the control of said control means.

26. An injection molding machine according to claim 25, further comprising:
solid air-permeable members arranged individually in said respective second recesses of said stationary and movable platens, a core-half-side end face of each said air-permeable member being flush with a bottom face of said first recess of a corresponding one of said first and second platens.

27. An injection molding machine according to claim 1, wherein said mold storage means includes a storage section body, having a plurality of storage chambers for individually storing said mold elements and movable so that an optional one of said storage chambers is located in a delivery position, and drive means for moving said storage section body, said control means controls operation of said drive means so that a selected one of said storage chambers is located in said delivery position, and said mold changing means delivers the mold elements to and from the storage chamber located in said delivery position.

28. An injection molding machine according to claim 27, wherein said storage section body is rotatable around an axis thereof, and said drive means rotates said storage section body.

29. An injection molding machine according to claim 1, further comprising:
a heater; and
a temperature sensor arranged in at least one of said storage chambers of said mold storage means.

30. An injection molding machine according to claim 29, further comprising:
a heating cylinder, containing an injection screw and having at least one heating zone;
a second heater; and
a second temperature sensor arranged in said at least one heating zone, and said control means turns on and off said second heater in response to an output from the second temperature sensor.

31. An injection molding machine according to claim 2, further comprising:
an automatic cleaner having a nozzle capable of advancing and retreating with respect to said mold clamping means and adapted to operate under the control of said control means, said automatic cleaner jetting a cleaning fluid from said nozzle against said first and second core halves so that said nozzle is located between said first and second core halves separated from each other by a mold opening operation of said mold clamping means.

32. An injection molding machine according to claim 2, wherein said stationary platen includes first and third temperature control fluid passages, said first matrix half is formed with a second temperature control fluid passage adapted to communicate, at the opposite ends thereof, with said first and third temperature control fluid passages when said first matrix half is attached to said stationary platen, said movable platen is formed with fourth and sixth temperature control fluid passages, and said second matrix half is formed with a fifth temperature control fluid passage adapted to communicate, at the opposite ends thereof, with said fourth and sixth temperature control fluid passages when said second matrix half is attached to said movable platen, further comprising:
a temperature control fluid supply device for supplying temperature-controlled fluid;
duct means for connecting said temperature control fluid supply device to said first and third temperature control fluid passages, and connecting said temperature control fluid supply device to said fourth and sixth temperature control fluid passages; and
means for allowing or preventing temperature-controlled fluid through said duct means.

33. An injection molding machine according to claim 32, wherein said second and fourth temperature control fluid passages are arranged surrounding said first and second core halves.

34. An injection molding machine according to claim 18, further a temperature control fluid supply comprising:
device for supplying temperature-controlled fluid;
duct means for connecting said temperature control fluid supply device and a temperature control fluid passage formed in said stationary platen, and connecting said temperature control fluid supply device and a temperature control fluid passage formed in said movable platen; and
means for allowing or preventing the temperature-controlled fluid through said duct means.

35. An injection molding machine according to claim 34, wherein said temperature control fluid passages are arranged surrounding respective ones of said first and second core halves.

36. An injection molding machine according to claim 18, wherein said stationary platen is formed with first and third temperature control fluid passages, said first core half is formed with a second temperature control fluid passage adapted to communicate, at the opposite ends thereof, with said first and third temperature control fluid passages when said first core half is attached to said stationary platen, said movable platen is formed with fourth and sixth temperature control fluid passages, and said second core half is formed with a fifth temperature control fluid passage adapted to communicate, at the opposite ends thereof, with said fourth and sixth temperature control fluid passages when said second core half is attached to said movable platen, further comprising:
a temperature control fluid supply device for supplying the temperature-controlled fluid,
duct means for connecting said temperature control fluid supply device to said first and third temperature control fluid passages and connecting said temperature control fluid supply device to said fourth and sixth temperature control fluid passages; and
means for allowing or preventing the temperature-controlled fluid supply through said duct means.

37. An injection molding machine comprising:
a mold clamper including stationary and movable platens which can receive at least one selected mold element;
a mold storer having a storage section body with circularly arranged storage chambers storing mold elements, and having a driver coupled to the storage section body, which can rotate the storage section body so that the at least one selected mold element stored in at least one corresponding storage chamber, is provided at a delivery position of the mold storer; and
a mold changer arranged in proximity to the mold clamper and the mold storer, including a multi-joint robot having an arm including plural links and a chuck rotatably supported by the arm, which can deliver the at least one selected mold element from the delivery position to the mold clamper using the arm, and which can deliver the at least one selected mold element from the mold clamper to the delivery position using the arm.

* * * * *